(12) United States Patent
Li et al.

(10) Patent No.: US 11,018,800 B2
(45) Date of Patent: May 25, 2021

(54) INFORMATION TRANSMISSION METHOD AND USER EQUIPMENT

(71) Applicant: Huawei Technologies Co., Ltd., Shenzhen (CN)

(72) Inventors: Chao Li, Beijing (CN); Xingwei Zhang, Beijing (CN); Yinghua Sun, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/185,684

(22) Filed: Nov. 9, 2018

(65) Prior Publication Data

US 2019/0097751 A1 Mar. 28, 2019

Related U.S. Application Data

(63) Continuation of application No. PCT/CN2016/081926, filed on May 12, 2016.

(51) Int. Cl.
*H04L 1/00* (2006.01)
*H04W 56/00* (2009.01)
(Continued)

(52) U.S. Cl.
CPC ........ *H04L 1/0004* (2013.01); *H04J 13/0062* (2013.01); *H04L 1/0061* (2013.01);
(Continued)

(58) Field of Classification Search
None
See application file for complete search history.

(56) References Cited

U.S. PATENT DOCUMENTS 8,155,070 B2 * 4/2012 Lee ............... H04L 5/0055
370/329
8,942,277 B2 * 1/2015 Hoshino ............ H04L 1/0003
375/220
(Continued)

FOREIGN PATENT DOCUMENTS

CN 1515127 A 7/2004
CN 101795145 A 8/2010
(Continued)

OTHER PUBLICATIONS

"3rd Generation Partnership Project; Technical Specification Group Radio Access Network; Evolved Universal Terrestrial Radio Access (E-UTRA); Multiplexing and channel coding(Release 13)," 3GPP TS 36.212 V13.1.0, 3rd Generation Partnership Project, Valbonne, France (Mar. 2016).
(Continued)

*Primary Examiner* — Andrew C Oh
(74) *Attorney, Agent, or Firm* — Leydig, Voit & Mayer, Ltd.

(57) ABSTRACT

Embodiments of the present disclosure provide an information transmission method, including: determining, by a user equipment (UE), first speed information of the UE; determining, by the UE, a transmission manner of control information based on the first speed information; and sending, by the UE, the control information in the transmission manner over a first link. In the embodiments of the present disclosure, the UE may determine the transmission manner of the control information based on the first speed information. When the UE is high speed UE, an appropriate transmission manner can be selected for the high speed UE, thereby meeting a transmission requirement of the high speed UE and ensuring a transmission success rate.

18 Claims, 15 Drawing Sheets

(51) Int. Cl.
  *H04W 72/02* (2009.01)
  *H04L 5/00* (2006.01)
  *H04W 4/46* (2018.01)
  *H04J 13/00* (2011.01)
  *H04W 4/02* (2018.01)
  *H04W 72/04* (2009.01)

(52) U.S. Cl.
  CPC .......... *H04L 5/0007* (2013.01); *H04L 5/0042* (2013.01); *H04L 5/0044* (2013.01); *H04L 5/0048* (2013.01); *H04L 5/0087* (2013.01); *H04L 5/0094* (2013.01); *H04W 4/027* (2013.01); *H04W 4/46* (2018.02); *H04W 56/00* (2013.01); *H04W 56/0015* (2013.01); *H04W 56/0025* (2013.01); *H04W 56/0095* (2013.01); *H04W 72/02* (2013.01); *H04W 72/0406* (2013.01)

(56) References Cited

U.S. PATENT DOCUMENTS

| | | | | |
|---|---|---|---|---|
| 9,147,294 | B1 | 9/2015 | Weinfield | |
| 9,450,727 | B2* | 9/2016 | Nory | H04L 1/1854 |
| 9,686,712 | B2* | 6/2017 | Baek | H04W 72/1215 |
| 10,219,291 | B2* | 2/2019 | Pelletier | H04L 1/1822 |
| 2004/0013096 | A1* | 1/2004 | Marinier | H04L 1/0061 370/328 |
| 2005/0271031 | A1* | 12/2005 | Cho | H04W 72/1284 370/349 |
| 2009/0196204 | A1* | 8/2009 | Astely | H04L 1/1829 370/280 |
| 2011/0190996 | A1* | 8/2011 | Nedachi | F16D 48/066 701/67 |
| 2012/0028668 | A1* | 2/2012 | Lee | H04W 72/0486 455/509 |
| 2012/0082130 | A1* | 4/2012 | Xue | H04L 5/0094 370/330 |
| 2013/0182692 | A1 | 7/2013 | Dai et al. | |
| 2013/0223396 | A1* | 8/2013 | Han | H04W 72/0413 370/329 |
| 2013/0286882 | A1* | 10/2013 | Lim | H04W 52/0219 370/252 |
| 2014/0248901 | A1 | 9/2014 | Johnsson et al. | |
| 2014/0308954 | A1* | 10/2014 | Wang | H04W 36/165 455/436 |
| 2014/0348079 | A1* | 11/2014 | Turtinen | H04W 72/0406 370/329 |
| 2015/0055586 | A1* | 2/2015 | Barbieri | H04L 1/0052 370/329 |
| 2015/0078279 | A1 | 3/2015 | Ko et al. | |
| 2015/0124773 | A1* | 5/2015 | Wu | H04L 1/007 370/329 |
| 2015/0271840 | A1* | 9/2015 | Tavildar | H04L 1/00 370/329 |
| 2015/0271857 | A1* | 9/2015 | Ribeiro | H04W 72/12 370/329 |
| 2015/0289292 | A1* | 10/2015 | Sun | H04L 27/2646 370/329 |
| 2015/0334698 | A1* | 11/2015 | Park | H04L 5/0091 455/426.1 |
| 2015/0334721 | A1* | 11/2015 | Kim | H04W 72/02 370/330 |
| 2015/0341100 | A1* | 11/2015 | Kwak | H04B 7/0626 370/329 |
| 2016/0029331 | A1* | 1/2016 | Seo | H04L 27/2613 370/350 |
| 2016/0066357 | A1* | 3/2016 | Goldhamer | H04W 16/14 455/426.1 |
| 2016/0095058 | A1* | 3/2016 | Lee | H04W 40/34 370/311 |
| 2016/0112172 | A1* | 4/2016 | Seo | H04L 5/0053 370/329 |
| 2016/0128053 | A1* | 5/2016 | Wei | H04W 72/048 455/450 |
| 2016/0183276 | A1* | 6/2016 | Marinier | H04W 72/04 370/329 |
| 2016/0205525 | A1* | 7/2016 | Baghel | H04W 72/042 370/329 |
| 2016/0261757 | A1* | 9/2016 | Rajadurai | H04W 12/0403 |
| 2016/0262118 | A1* | 9/2016 | Kim | H04W 52/365 |
| 2016/0295624 | A1* | 10/2016 | Novlan | H04W 72/04 |
| 2016/0309460 | A1* | 10/2016 | Heo | H04L 5/0053 |
| 2016/0353507 | A1* | 12/2016 | Uemura | H04W 76/15 |
| 2017/0013578 | A1 | 1/2017 | Wei et al. | |
| 2017/0019910 | A1* | 1/2017 | Seo | H04W 76/10 |
| 2017/0027011 | A1 | 1/2017 | Chae et al. | |
| 2017/0041863 | A1* | 2/2017 | Martin | H04W 84/12 |
| 2017/0048829 | A1 | 2/2017 | Kim et al. | |
| 2017/0055240 | A1* | 2/2017 | Kim | H04W 76/27 |
| 2017/0079085 | A1* | 3/2017 | Yang | H04W 72/0446 |
| 2017/0141833 | A1* | 5/2017 | Kim | H04L 1/0029 |
| 2017/0142692 | A1* | 5/2017 | Kim | H04W 72/14 |
| 2017/0202009 | A1* | 7/2017 | Kim | H04W 72/1284 |
| 2017/0223706 | A1* | 8/2017 | Wang | H04W 72/1205 |
| 2017/0230959 | A1 | 8/2017 | Wu et al. | |
| 2017/0245313 | A1* | 8/2017 | Kim | H04L 1/1854 |
| 2017/0295601 | A1* | 10/2017 | Kim | H04W 72/0406 |
| 2018/0035329 | A1* | 2/2018 | Futaki | H04W 72/0446 |
| 2018/0063852 | A1* | 3/2018 | Kang | H04W 72/06 |
| 2018/0132091 | A1* | 5/2018 | Adachi | H04W 8/005 |
| 2018/0146500 | A1* | 5/2018 | Muraoka | H04W 24/02 |
| 2018/0249518 | A1* | 8/2018 | Nguyen | H04W 4/10 |
| 2019/0069260 | A1* | 2/2019 | Chae | G01S 5/0221 |
| 2019/0098542 | A1* | 3/2019 | Tang | H04W 76/23 |

FOREIGN PATENT DOCUMENTS

| | | |
|---|---|---|
| CN | 101958774 A | 1/2011 |
| CN | 101989970 A | 3/2011 |
| CN | 103501543 A | 1/2014 |
| CN | 103686895 A | 3/2014 |
| CN | 104811925 A | 7/2015 |
| CN | 104883728 A | 9/2015 |
| CN | 105280005 A | 1/2016 |
| CN | 105307216 A | 2/2016 |
| CN | 105337706 A | 2/2016 |
| CN | 105357716 A | 2/2016 |
| CN | 105451211 A | 3/2016 |
| WO | 2014054986 A1 | 4/2014 |
| WO | 2014182342 A1 | 11/2014 |
| WO | 2015137720 A1 | 9/2015 |
| WO | 2015163662 A1 | 10/2015 |

OTHER PUBLICATIONS

"3rd Generation Partnership Project; Technical Specification Group Radio Access Network; Evolved Universal Terrestrial Radio Access (E-UTRA);Radio Resource Control (RRC);Protocol specification (Release 13)," 3GPP TS 36.331 V13.1.0, 3rd Generation Partnership Project, Valbonne, France (Mar. 2016).

"3rd Generation Partnership Project; Technical Specification Group Radio Access Network; Evolved Universal Terrestrial Radio Access (E-UTRA); Physical layer procedures(Release 13)," 3GPP TS 36.213 V13.1.1, 3rd Generation Partnership Project, Valbonne, France (Mar. 2016).

"3rd Generation Partnership Project; Technical Specification Group Radio Access Network; Evolved Universal Terrestrial Radio Access (E-UTRA); Physical channels and modulation (Release 13)," 3GPP TS 36.211 V13.1.0, 3rd Generation Partnership Project, Valbonne, France (Mar. 2016).

"Considerations of DMRS Enhancement in the High Doppler Case for V2V Services based on LTE Sidelink," 3GPP TSG RAN WG1 Meeting #84 St Julian"s, Malta, R1-160663, 3rd Generation Partnership Project, Valbonne, France (Feb. 15-18, 2016).

"Further evaluation of DMRS for PSSCH/PSCCH," 3GPP TSG RAN WG1 Meeting #84bis Busan, Korea, R1-162118, 3rd Generation Partnership Project, Valbonne, France (Apr. 11-15, 2016).

(56) References Cited

OTHER PUBLICATIONS

"Discussion on Scheduling Assignment for PC5-based V2V," 3GPP TSG RAN WG1 Meeting #84bis, Busan, Korea, R1-162484, pp. 2-4, 3rd Generation Partnership Project, Valbonne, France (Apr. 11-15, 2016).
"Discussion on Scheduling Assignment for PC5-based V2V," 3GPP TSG RAN WG1 Meeting #84, St. Julian's, Malta, R1-160637, pp. 2-5, 3rd Generation Partnership Project, Valbonne, France (Feb. 15-19, 2016).
"Discussion on SA to Support Same Subframe Scheduling in V2V," 3GPP TSG RAN WG1#84bis, Busan, Korea, R1-162532, pp. 2-4, 3rd Generation Partnership Project, Valbonne, France (Apr. 11-15, 2016).
"Resource pool design for V2V," 3GPP TSG RAN WG1 Meeting #83, Anaheim, USA, R1-156428, pp. 1-8, 3rd Generation Partnership Project, Valbonne, France (Nov. 15-22, 2015).
"Motivation for RAN work on V2V in Rel-13," 3GPP TSG RAN Meeting #66 Maui, USA, RP-141918, pp. 1-7, 3rd Generation Partnership Project, Valbonne, France (Dec. 8-11, 2014).
KR/10-2020-702213, Office Action, dated Aug. 21, 2020.
CN/201680084652, Notice of Allowance, dated Sep. 16, 2020.
"Discussion on DM-RS enhancement for V2V," 3GPP TSG RAN WG1 #82bis, Malmo, Sweden, R1-155875, pp. 1-6, 3rd Generation Partnership Project, Valbonne, France (Oct. 5-9, 2015).
"Channel scrambling and DMRS design for D2D communication," 3GPP TSG RAN WG1 #76bis, Shenzhen, China, R1-141191, pp. 1-2, 3rd Generation Partnership Project, Valbonne, France (Mar. 31-Apr. 4, 2014).

\* cited by examiner

INFORMATION TRANSMISSION METHOD AND USER EQUIPMENT

CROSS-REFERENCE TO RELATED APPLICATIONS

This application is a continuation of International Application No. PCT/CN2016/081926, filed on May 12, 2016, the disclosure of which is hereby incorporated by reference in its entirety.

TECHNICAL FIELD

Embodiments of the present disclosure relate to the communications field, and more specifically, to an information transmission method and user equipment.

BACKGROUND

In recent years, as intelligent technologies develop, technologies such as intelligent transportation and unmanned driving have attracted increasing attention. An Internet of Vehicles technology and standard are crucial to advance the development of the industry. Vehicle to X (V2X) communication in the Internet of Vehicles technology includes vehicle to vehicle (V2V) communication, vehicle to infrastructure (V2I) communication, vehicle to pedestrian (V2P) communication, pedestrian to vehicle (P2V) communication, and the like. A basic problem in V2X communication is how to implement efficient communication between a vehicle and various devices in various complex environments, and particularly, how to improve communication reliability and reduce a communication delay.

It is recommended that 3rd Generation Partnership Project (3GPP) research the Internet of Vehicles based on an existing device to device (D2D) protocol. The existing D2D protocol is based on Long Term Evolution (LTE) uplink technologies, and a moving speed of no more than 200 km/h is supported in 2 GHz frequency. However, an Internet of Vehicles application requires a maximum moving speed up to 500 km/h in an intelligent transportation spectrum around 5.9 GHz. A maximum Doppler spread during vehicle moving is directly proportional to vehicle moving speed and a frequency used during vehicle communication. Therefore, the existing D2D protocol cannot meet a requirement of a higher moving speed, and particularly, a requirement of a higher moving speed in a higher frequency.

SUMMARY

Embodiments of the present disclosure provide an information transmission method, so as to meet a transmission requirement of fast moving UE.

According to a first aspect, an information transmission method is provided, including:

determining, by first UE, first speed information of the first UE;

determining, by the first UE, a transmission manner of control information based on the first speed information; and sending, by the first UE, the control information in the transmission manner over a first link.

In this embodiment of the present disclosure, the first UE may determine the transmission manner of the control information based on the first speed information. When the first UE is high speed UE, an appropriate transmission manner can be selected for the high speed UE, thereby meeting a transmission requirement of the high speed UE and ensuring a transmission success rate.

Optionally, the method may further include: sending, by the first UE, the first speed information to a first base station over a second link, where the first speed information includes a speed of the first UE or speed grade information of the first UE. The first base station may be a serving base station of the first UE.

The first UE may periodically send the first speed information to the first base station over the second link; or when a speed of the first UE changes, the first UE may send the first speed information to the first base station over the second link; or after receiving, from the first base station, an instruction of reporting speed information of the first UE, the first UE sends the first speed information to the first base station over the second link.

Optionally, if the first UE determines, based on the first speed information, that the first UE is a first type of UE, the transmission manner is a first transmission manner; or if the first UE determines, based on the first speed information, that the first UE is a second type of UE, the transmission manner is a second transmission manner. The first type of UE may be non-high speed UE, and the second type of UE is high speed UE.

Optionally, the first transmission manner includes a first transmission resource, and the second transmission manner includes a second transmission resource. The first transmission resource may be determined from a first resource set or a first resource subset of a first resource set, and the second transmission resource may be determined from a second resource set or a second resource subset of the second resource set.

Correspondingly, the determining, by the first UE, a transmission manner of control information based on the first speed information may include:

if the first UE determines, based on the first speed information, that the first UE is the first type of UE, determining the first transmission resource from the first resource set or from the first resource subset of the first resource set, where the first resource subset is predefined; or if the first UE determines, based on the first speed information, that the first UE is the second type of UE, determining the second transmission resource from the second resource set or from the second resource subset of the second resource set, where the second resource subset is predefined.

Optionally, before the determining a transmission manner of control information, the method further includes: obtaining, by the first UE, the first resource set and the second resource set. For example, the first resource set and the second resource set may be preconfigured.

Optionally, before the determining a transmission manner of control information, the method further includes: receiving, by the first UE over the second link, first indication information sent by the first base station, where the first indication information is used to indicate the first resource set and the second resource set.

The first resource set and the second resource set may be a same resource set; or the second resource set is a subset of the first resource set.

Optionally, in an example, if the first UE determines, based on the first speed information, that the first UE is the first type of UE, it is determined that the control information is carried on a first control channel; or if the first UE determines, based on the first speed information, that the first UE is the second type of UE, it is determined that the control information is carried on a second control channel.

The first control channel may be a first PSCCH, and the second control channel may be a second PSCCH.

Optionally, the control information includes the first speed information; and the sending, by the first UE, the control information in the transmission manner over a first link may include: sending, by the first UE, the first speed information to second UE in the transmission manner over the first link.

Optionally, in another example, a control channel carrying the control information may be a third control channel. For example, the third control channel is a PSBCH.

Optionally, the control information is used to indicate a service type, and the service type is a security type or a non-security type. Optionally, the control information indicates whether the first UE is a synchronization source, and/or the control information indicates an identifier of a synchronization source of the first UE.

The synchronization source of the first UE is the first base station, and the identifier of the synchronization source of the first UE may be a physical cell identifier of the first base station; or the synchronization source of the first UE is a global navigation satellite system GNSS, and the identifier of the synchronization source of the first UE may be a predefined identifier corresponding to the GNSS.

Optionally, the method may further include: sending, by the first UE, a synchronization signal over the first link. Optionally, the synchronization signal is used to indicate a service type, and the service type is a security type or a non-security type.

Optionally, the method may further include: determining, by the first UE, the synchronization source of the first UE.

The determining the synchronization source of the first UE includes: if the first UE determines, based on the first speed information, that the first UE is the first type of UE, determining the synchronization source according to preconfigured information, and if the preconfigured information indicates that the synchronization source is the GNSS, preferentially determining, by the processing unit, that the synchronization source is the GNSS; or if the first UE determines, based on the first speed information, that the first UE is the second type of UE, preferentially determining, by the first UE, that the synchronization source is the GNSS.

Specifically, if a GNSS signal is detected by the first UE, the first UE uses the GNSS as the synchronization source. If a GNSS signal is not detected by the first UE, the first UE determines that the synchronization source is the first base station or third UE. The first base station may be a serving base station of the first UE, and the third UE may be UE directly synchronized with the GNSS.

Optionally, that a GNSS signal is detected by the first UE includes: If a GNSS signal is not detected by the first UE, the first UE starts a timer and then the GNSS signal is detected within duration of the timer. That a GNSS signal is not detected by the first UE includes: If a GNSS signal is not detected by the first UE, the first UE starts a timer and the GNSS signal is still not detected within duration of the timer.

That a GNSS signal is detected includes: A GNSS signal whose signal strength is greater than or equal to a preset signal strength threshold is detected. That a GNSS signal is not detected includes: No GNSS signal is detected, or a GNSS signal whose signal strength is less than the preset signal strength threshold is detected.

Optionally, the method further includes: sending, by the first UE, data over the first link by using a fourth transmission resource. The fourth transmission resource is indicated by the control information.

Optionally, every K consecutive subcarriers located on a same symbol include a subcarrier used for transmitting the data, where K is a positive integer greater than or equal to 2.

Optionally, the control information further indicates a quantity of transmissions of the data and a time-frequency resource used for each transmission.

In an example, the quantity of transmissions of the data is more than one, a same frequency domain resource is used for each transmission of the data, and the fourth transmission resource includes the same frequency domain resource and a plurality of time domain resources that are in a one-to-one correspondence with the more than one transmission of the data.

In another example, the quantity of transmissions of the data is N, and the fourth transmission resource includes time-frequency resources used for M of the N transmissions, so that a receive end of the control information determines, based on the time-frequency resources used for the M transmissions that are included in the control information, time-frequency resources used for the N transmissions, where M<N, and M and N are positive integers.

Optionally, the sending, by the first UE, the data over the first link by using the fourth transmission resource includes: sending, by the first UE, the data and a first sequence over the first link by using the fourth transmission resource, where the first sequence is determined by removing a predefined second sequence from a ZC sequence set of a predefined length.

Optionally, in an embodiment, the control information and the data are located in a same subframe. The sending the control information includes: determining a first transmit power of the control information and a second transmit power of the data; if a sum of the first transmit power and the second transmit power is greater than a maximum transmit power, using a value obtained by multiplying the first transmit power by a first scaling value as a first power, and using a value obtained by multiplying the second transmit power by a second scaling value as a second power, so that a sum of the first power and the second power is less than or equal to the maximum transmit power; and sending the control information by using the first power and sending the data by using the second power.

The first scaling value and the second scaling value are equal or not equal.

Optionally, the method further includes: when the first UE is the second type of UE, sending, by the first UE, data of the first link to a second base station over the second link by using a fifth transmission resource. The second base station is a serving base station of a receive end of the data.

In this way, a base station can assist in completing data transmission of the first link from the first UE to the receive end, ensuring a transmission success rate of the high speed UE.

Optionally, before the sending data of the first link to a second base station over the second link, the method further includes: sending, by the first UE, resource request information to the first base station; and receiving, by the first UE, indication information of the fifth transmission resource that is sent by the first base station.

The resource request information is a speed-related scheduling request SR or buffer status report BSR. The speed-related information may be: speed indication information included in the SR or the BSR, or speed indication information of the first UE sent together with the SR or the BSR by the first UE. Optionally, the speed indication information may be a specific speed value of the first UE, or may be indication information indicating whether the first UE is in a high speed state. For example, if the first UE is in a connected mode, the first UE directly sends the SR or the BSR to the first base station. If the first UE is in an idle mode, the first UE switches to a connected mode and then sends the scheduling request or the BSR to the first base station.

In an example, if the receive end of the data is the second UE, and a serving base station of the second UE is the first base station, the first base station and the second base station are a same base station.

In another example, if the receive end of the data includes second UE and fourth UE, a serving base station of the second UE is the first base station, and a serving base station of the fourth UE is a third base station, the second base station includes the first base station and the third base station.

According to a second aspect, an information transmission method is provided, including:

determining, by first UE, first speed information of the first UE; and determining, by the first UE, a synchronization source of the first UE based on the first speed information.

Optionally, the first UE determines, based on the first speed information, that the first UE is a first type of UE, the first UE determines the synchronization source according to preconfigured information, and if the preconfigured information indicates that the synchronization source is a GNSS, the first UE preferentially determines that the synchronization source is the GNSS. If the first UE determines, based on the first speed information, that the first UE is a second type of UE, the first UE preferentially determines that the synchronization source is a GNSS.

Optionally, if a GNSS signal is detected by the first UE, the first UE uses the GNSS as the synchronization source. If a GNSS signal is not detected by the first UE, the first UE determines that the synchronization source is a first base station or second UE. The first base station is a serving base station of the first UE, and the second UE is UE directly synchronized with the GNSS.

Optionally, that a GNSS signal is detected by the first UE includes: If a GNSS signal is not detected by the first UE, the first UE starts a timer and then the GNSS signal is detected within duration of the timer. That a GNSS signal is not detected by the first UE includes: If a GNSS signal is not detected by the first UE, the first UE starts a timer and the GNSS signal is still not detected within duration of the timer.

In this way, it can be ensured that the first UE is synchronized with the GNSS as much as possible, thereby ensuring a communication success rate of the first UE that is used as high speed UE.

Optionally, that a GNSS signal is detected includes: A GNSS signal whose signal strength is greater than or equal to a preset strength threshold is detected. That a GNSS signal is not detected includes: No GNSS signal is detected, or a GNSS signal whose signal strength is less than the preset strength threshold is detected.

The preset strength threshold may be specified in a protocol, or may be preset on the first UE, or may be indicated by a serving base station of the first UE by using signaling.

According to a third aspect, an information transmission method is provided, including:

determining, by first user equipment UE, a quantity of transmissions of data scheduled based on control information, and determining a transmission manner of the control information based on the quantity of transmissions of the data; and sending, by the first UE, the control information in the transmission manner over a first link.

Optionally, the quantity of transmissions of the data may be determined by the first UE based on speed information of the first UE.

Optionally, when quantities of transmissions of the data are different, valid fields in the control information are different.

Optionally, the control information includes the quantity of transmissions of the data and indication information of a time-frequency resource used for each transmission of the data.

In an example, when the quantity of transmissions of the data is four, a first field in the control information and a second field in the control information include time-frequency resources used for two transmissions within the four transmissions.

In another example, the quantity of transmissions of the data is more than one, a same frequency domain resource is used for each transmission of the data, and the control information includes the same frequency domain resource and indication information of a plurality of time domain resources that are in a one-to-one correspondence with the more than one transmission of the data.

Optionally, the control information may further include indication information of a current quantity of transmissions, and/or the control information may further include speed indication information of the first UE.

Optionally, the method further includes: sending the data over the first link based on the control information. The control information may be carried on a physical sidelink control channel PSCCH, and the data may be carried on a physical sidelink shared channel PSSCH.

Optionally, the data is carried on a service channel, and the control information and the data are located in a same subframe. The sending the control information includes: determining a first transmit power of the control information and a second transmit power of the data; if a sum of the first transmit power and the second transmit power is greater than a maximum transmit power, using a value obtained by multiplying the first transmit power by a first scaling value as a first power, and using a value obtained by multiplying the second transmit power by a second scaling value as a second power, so that a sum of the first power and the second power is less than or equal to the maximum transmit power; and sending the control information by using the first power and sending the data by using the second power.

The first scaling value and the second scaling value are equal or not equal.

According to a fourth aspect, an information transmission method is provided, including:

receiving, by a first base station, speed information that is sent by at least one UE;

determining, by the first base station, a first resource set and a second resource set based on the speed information of the at least one UE; and sending, by the first base station, first indication information to the at least one UE over a second link, where the first indication information is used to indicate the first resource set and the second resource set.

In this way, the at least one UE can select a transmission resource used for a first link from the first resource set or the second resource set.

Optionally, the first base station may send the first indication information over the second link in a broadcast or multicast manner.

The first indication information is used to indicate that the first resource set is used for a first type of UE, and the second resource set is used for a second type of UE. In this case, if the first UE is the first type of UE, the first UE determines a first transmission resource from the first resource set or from a first resource subset of the first resource set based on the first indication information. If the first UE is the second type of UE, the first UE determines a second transmission resource from the second resource set or from a second resource subset of the second resource set based on the first indication information.

Optionally, the first indication information may further indicate a location of the first resource subset in the first resource set. The location may be a time domain location or a frequency domain location or a time-frequency location. Optionally, the first indication information may further indicate a location of the second resource subset in the second resource set. The location may be a time domain location or a frequency domain location or a time-frequency location.

Optionally, the first resource set and the second resource set are a same resource set.

Optionally, the second resource set is a subset of the first resource set. In this case, the first indication information may further indicate a location of the second resource subset in the first resource set. The location may be a time domain location or a frequency domain location or a time-frequency location.

Optionally, the first indication information may further indicate a preset speed threshold, so that the at least one UE determines whether the at least one UE is the first type of UE or the second type of UE.

Optionally, the method may include: receiving, by the first base station, resource request information that is sent by the first UE, and allocating, by the first base station, a resource to the first UE and sending indication information of a fifth transmission resource to the first UE. The resource request information may be a speed-related scheduling request SR or buffer status report BSR.

Further, the first base station may receive, over the second link, first-link data that is sent by the first UE by using the fifth transmission resource, and the first base station may send the first-link data to second UE. The second UE is a receive end of the first-link data.

According to a fifth aspect, user equipment is provided, where the UE is first UE and includes a processing unit and a sending unit. The processing unit is configured to determine first speed information of the first UE and is further configured to determine a transmission manner of control information based on the first speed information. The sending unit is configured to send, over a first link, the control information in the transmission manner that is determined by the processing unit. The first UE in the fifth aspect can implement the information transmission method executed by the first UE in the method in the first aspect.

According to a sixth aspect, user equipment is provided, where the UE is first UE and includes a receiver, a processor, and a transmitter. The processor is configured to determine first speed information of the first UE and is further configured to determine a transmission manner of control information based on the first speed information. The transmitter is configured to send, over a first link, the control information in the transmission manner that is determined by the processor. The first UE in the sixth aspect can implement the information transmission method executed by the first UE in the method in the first aspect.

According to a seventh aspect, a computer readable storage medium is provided, where the computer readable storage medium stores a program, and the program enables UE to execute any information transmission method in the first aspect and all implementations of the first aspect.

According to an eighth aspect, user equipment is provided, where the UE is first UE and includes a first determining unit and a second determining unit. The first determining unit is configured to determine first speed information of the first UE. The second determining unit is configured to determine a synchronization source of the first UE based on the first speed information that is determined by the first determining unit. The first UE in the eighth aspect can implement the information transmission method executed by the first UE in the method of the second aspect.

According to a ninth aspect, user equipment is provided, where the UE is first UE and includes a memory and a processor. The memory is configured to store code to be executed by the processor. The processor is configured to determine first speed information of the first UE, and determine a synchronization source of the first UE based on the first speed information. The first UE in the ninth aspect can implement the information transmission method executed by the first UE in the method in the second aspect.

According to a tenth aspect, a computer readable storage medium is provided, where the computer readable storage medium stores a program, and the program enables UE to execute any information transmission method in the second aspect and all implementations of the second aspect.

According to an eleventh aspect, user equipment is provided, where the UE is first UE and includes a processing unit and a sending unit. The processing unit is configured to determine a quantity of transmissions of data scheduled based on control information, and determine a transmission manner of the control information based on the quantity of transmissions of the data. The sending unit is configured to send the control information in the transmission manner over a first link. The first UE in the eleventh aspect can implement the information transmission method executed by the first UE in the method in the third aspect.

According to a twelfth aspect, user equipment is provided, where the UE is first UE and includes a memory, a processor, and a transmitter. The memory is configured to store code to be executed by the processor. The processor is configured to determine a quantity of transmissions of data scheduled based on control information, and determine a transmission manner of the control information based on the quantity of transmissions of the data. The transmitter is configured to send the control information in the transmission manner over a first link. The first UE in the twelfth aspect can implement the information transmission method executed by the first UE in the method in the third aspect.

According to a thirteenth aspect, a computer readable storage medium is provided, where the computer readable storage medium stores a program, and the program enables UE to execute any information transmission method in the third aspect and all implementations of the third aspect.

According to a fourteenth aspect, a base station is provided, where the base station is a first base station and includes a receiving unit, a processing unit, and a sending unit. The receiving unit is configured to receive speed information that is sent by at least one UE. The processing unit is configured to determine a first resource set and a second resource set based on the speed information of the at least one UE. The sending unit is configured to send first indication information to the at least one UE over a second link, where the first indication information is used to indicate the first resource set and the second resource set. The first base station in the fourteenth aspect can implement the information transmission method executed by the first base station in the method in the fourth aspect.

According to a fifteenth aspect, a base station is provided, where the base station is a first base station and includes a receiver, a processor, and a transmitter. The receiver is configured to receive speed information that is sent by at least one UE. The processor is configured to determine a first resource set and a second resource set based on the speed information of the at least one UE. The transmitter is configured to send first indication information to the at least one UE over a second link, where the first indication information is used to indicate the first resource set and the second resource set. The first base station in the fifteenth aspect can implement the information transmission method executed by the first base station in the method in the fourth aspect.

According to a sixteenth aspect, a computer readable storage medium is provided, where the computer readable storage medium stores a program, and the program enables a base station to execute any information transmission method in the fourth aspect and all implementations of the fourth aspect.

In the embodiments of the present disclosure, if the speed of the first UE is less than the preset speed threshold, or a speed grade of the first UE is lower than a preset speed grade threshold, the first UE is the first type of UE. If the speed of the first UE is greater than or equal to the preset speed threshold, or a speed grade of the first UE is higher than or equal to a preset speed grade threshold, the first UE is the second type of UE. The first type of UE may be non-high speed UE, and the second type of UE may be high speed UE.

In the foregoing embodiments, the transmission manner may include at least one of the following: a transmission resource used by the control information; a cyclic redundancy check CRC mask of the control information; a scrambling sequence of the control information; a demodulation reference signal used by a control channel carrying the control information; a size of a physical resource occupied for transmitting the control information; a modulation and coding scheme MCS used by the control information; and a quantity of transmissions of the control information.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
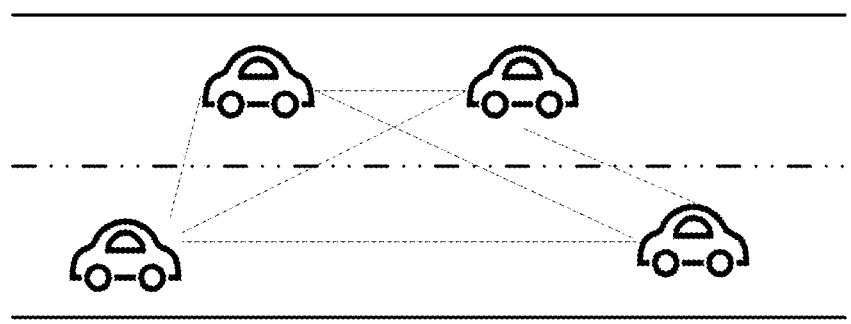
FIG. 1 is a schematic diagram of a V2V communication scenario according to an embodiment of the present disclosure.

FIG. 1 is a schematic diagram of a V2V communication scenario according to an embodiment of the present disclosure. FIG. 1 is a schematic diagram of communication between four vehicles in lanes.

In V2V communication, aided driving and self-driving can be implemented through wireless communication between a plurality of on-board units (OBU), effectively improving traffic efficiency, avoiding traffic accidents, and reducing a driving risk.

Figure 2:
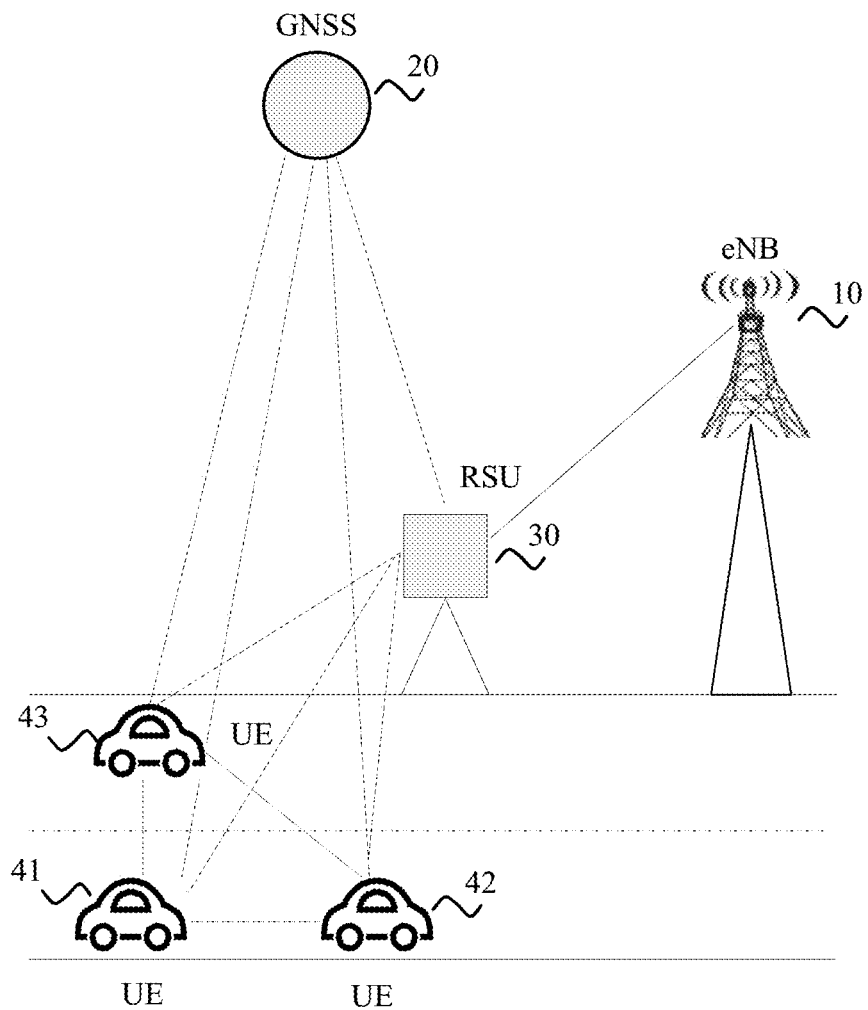
FIG. 2 is a schematic diagram of an application scenario according to an embodiment of the present disclosure.

FIG. 2 is a schematic diagram of an application scenario according to an embodiment of the present disclosure. FIG. 2 shows an evolved NodeB (eNB) 10, a roadside unit (RSU) 30, UE 41, UE 42, and UE 43. The RSU 30 can directly communicate with the eNB 10. The UE 41, the UE 42, and the UE 43 can directly communicate with the eNB 10, or communicate with the eNB 10 by using the RSU 30. FIG. 2 further shows a global navigation satellite system (GNSS) 20, which may be configured to provide information such as a location and a time to another network element.

The RSU 30 may be functionally a vehicular device function or an eNB function. The UE 41, the UE 42, and the UE 43 may be vehicular devices, and the vehicular devices may perform V2V communication with each other by using a sidelink. The vehicular device moves at a high speed along with a vehicle. For example, when the UE 41 and the UE 42 move in opposite directions, there is a maximum relative moving speed.

The devices shown in FIG. 2 may use a spectrum of a cellular link or use an intelligent transportation spectrum around 5.9 GHz to communicate with each other. A technology used for communication between the devices may be enhanced based on an LTE protocol or may be enhanced based on a D2D technology.

In the embodiments of the present disclosure, a sidelink (SL) may be a communication link between UEs, and is also referred to as a D2D link in D2D communication or a PC5 link in some other scenarios. In an Internet of Vehicles, the sidelink may also be referred to as a V2V link, a vehicle to infrastructure (V2I) link, a vehicle to pedestrian (V2P) link, or the like. The sidelink may send information in any one of the following manners: broadcast, unicast, and multicast. The sidelink may use a spectrum of a cellular link, for example, use an uplink spectrum of a cellular link, or may use a dedicated spectrum allocated for intelligent transportation. This is not limited in the present disclosure.

In the embodiments of the present disclosure, UE may also be referred to a terminal, and may include an OBU in a vehicle, or may include an RSU having a terminal function on a roadside or the like, or may include a mobile phone used by a pedestrian or the like.

A user equipment (UE) may be in a high-speed moving state. This raises a higher requirement for radio link transmission quality in V2X communication. How to ensure that control information and data information are correctly transmitted between UEs with no need to significantly increase complexity of a receiver is a key problem to be resolved in the present disclosure.

In an existing solution, a size of a physical sidelink control channel (PSCCH) used during transmission between UEs is one physical resource block (PRB). However, in the prior art, a maximum relative vehicle speed at the intelligent transportation spectrum around 5.9 GHz is 500 km/h, performance degrades greatly, and a coverage requirement of a transmission distance cannot be met. In addition, once demodulation performance of the PSCCH declines, a demodulation capability of a data channel scheduled by the PSCCH, that is, a physical sidelink shared channel (PSSCH) is correspondingly affected.

The following first describes some terms in the present disclosure simply.

First link: indicates a communication link between UEs. The first link may be a D2D link or a V2X link or a sidelink (SL) or the like. For example, the first link may be a link between the UE 41 and the UE 42 in FIG. 2 or may be a link between the RSU 30 and the UE 43 in FIG. 2. Communication over the first link may be performed based on any one of the following manners: unicast, multicast, and broadcast.

Second link: indicates a communication link between UE and a base station. The second link may be a cellular link. For example, the second link may be a link between the UE 41/UE 42/UE 43 and the base station 10 in FIG. 2 or may be a link between the RSU 30 and the eNB 10 in FIG. 2. Alternatively, if the RSU 30 in FIG. 2 is an RSU having a base station function, the second link may be a link between the UE 41/UE 42/UE 43 and the RSU 30.

In addition, "predefined" in the embodiments of the present disclosure may be specified in a protocol, or may be preconfigured, for example, may be preconfigured by using signaling. This is not limited in the present disclosure.

In the embodiments of the present disclosure, at least two types of UEs are defined, including a first type of UE and a second type of UE. A speed of the first type of UE is less than a preset speed threshold, and a speed of the second type of UE is greater than or equal to the preset speed threshold.

In other words, the first type of UE is UE whose speed is less than the preset speed threshold, and the second type of UE is UE whose speed is greater than or equal to the preset speed threshold. The first type of UE may be referred to as low speed UE or non-high speed UE, and the second type of UE may be referred to as high speed UE.

Optionally, in an example, a UE speed in the embodiments of the present disclosure may be an absolute speed, namely, a ground speed. A manner used by the UE to obtain a first absolute speed includes: determining the first absolute speed by using a GNSS mode; or if the UE is an OBU, obtaining corresponding speed information by using a corresponding module in a vehicle (such as an engine block, a gearbox module, or another module that electrically controls a speed); or obtaining the first absolute speed based on information indicated by a base station. Optionally, if the UE is a communications module at a physical layer, the first absolute speed may be obtained based on indication information from another layer.

Optionally, the preset speed threshold may be a predefined speed value. For example, the preset speed threshold is 250 km/h.

Optionally, a plurality of speed thresholds may be defined in the embodiments of the present disclosure, for example, including a first speed threshold, a second speed threshold, and a third speed threshold. Correspondingly, different speed grades may be set for speeds. In addition, the speed grades are related to the plurality of speed thresholds.

For example, it is assumed that the first speed threshold is represented as v1, the second speed threshold is represented as v2, and the third speed threshold is represented as v3, and v1<v2<v3. It is assumed that the UE speed is represented as v. In this case, a relationship between the speed grades and the plurality of speed thresholds may be shown in the following Table 1.

TABLE 1

| Speed grade | UE speed v |
|---|---|
| 0 | v < v1 |
| 1 | v1 ≤ v < v2 |
| 2 | v2 ≤ v < v3 |
| 3 | v ≥ v3 |

It can be understood that the preset speed threshold may be represented by using a speed grade. If the preset speed threshold is v2, UEs whose speed grades are 0 and 1 in Table 1 are the foregoing first type of UE, and UEs whose speed grades are 2 and 3 in Table 1 are the foregoing second type of UE. In other words, the first type of UE is UE whose speed grade is lower than a preset grade threshold, and the second type of UE is UE whose speed grade is higher than or equal to the preset grade threshold. For the case shown in Table 1, the preset grade threshold may be 1. In addition, according to Table 1, it can be understood that a maximum speed corresponding to the preset grade threshold is the preset speed threshold. The preset speed threshold may be one or may be more than one. This is not limited in the present disclosure.

In an example, v1=150 km/h, v2=200 km/h, and v3=250 km/h.

Optionally, in another example, a UE speed in the embodiments of the present disclosure may be a relative speed. For example, the speed may be a speed relative to another object (which may be another UE or a plurality of other UEs). For example, the another object may be peer UE capable of communicating with the UE by using a first link.

The UE speed may be a speed of the UE (for example, the UE 41 in FIG. 2) relative to another UE at a peer end (for example, the UE 42 in FIG. 2). Alternatively, the UE speed may be speeds of the UE (for example, the UE 41 in FIG. 2) relative to a plurality of other UEs at a peer end (for example, the UE 42 and the UE 43 in FIG. 2). A manner used by the UE to obtain the relative speed includes: first obtaining an absolute speed of the UE, and then obtaining speed and location information of another UE by measuring or parsing a data packet that is sent from the another UE. The UE obtains information about a speed relative to one or more UEs based on the information. Optionally, if the UE is a communications module at a physical layer, the relative speed may be obtained based on indication information from another layer.

The preset speed threshold may be represented by using a preset grade threshold. The first type of UE is UE whose speed grade is lower than the preset grade threshold, and the second type of UE is UE whose speed grade is higher than or equal to the preset grade threshold.

Using the UE 41 in FIG. 2 as an example, it is assumed that a relative speed of the UE 41 relative to the UE 42 is Δv2, and a relative speed of the UE 41 relative to the UE 43 is Δv3, and v2≤Δv2<v3, and v2≤Δv3<v3. In this case, by referring to Table 1, it can be learned that a speed grade of the UE 41 is 2.

In the embodiments of the present disclosure, the first type of UE may use a first transmission manner to send control information over the first link, and the second type of UE may use a second transmission manner to send control information over the first link.

The first transmission manner and the second transmission manner are different.

The transmission manner may include at least one of the following: a transmission resource used by the control information, a cyclic redundancy check (CRC) mask of the control information, a scrambling sequence of the control information, a demodulation reference signal (DMRS) used by a control channel carrying the control information, a size of a physical resource occupied for transmitting the control information, a modulation and coding scheme (MCS) used by the control information, a quantity of transmissions of the control information, and the like.

The quantity of transmissions of the control information may be a maximum quantity of transmissions of the control information.

That transmission manners are different means that at least one of the above listed items is different. In other words, that transmission manners are different means that at least one of the following is different: a transmission resource, a CRC mask, a scrambling sequence, a DMRS, a size of a physical resource, an MCS, a quantity of transmissions of the control information, and the like.

That transmission resources are different may mean: A transmission resource used by the first type of UE and a transmission resource used by the second type of UE are from different resource sets; or a transmission resource used by the first type of UE and a transmission resource used by the second type of UE are from a same resource set, but a resource or a resource subset used by the second type of UE is indicated by using information, or a resource subset used by the second type of UE is specified in a predefined manner.

A CRC mask is a sequence string defined by a sequence and is used to scramble a CRC part of to-be-transmitted information. For example, information carried on a control channel is x bits (for example, 50 bits), and before the information of the x bits is coded, a CRC parity bit in a length of N bits (for example, 16 bits) is added to the information of the x bits. A CRC mask is a predefined sequence string in a length of N bits, and is used to be added to corresponding CRC bits. For example, for CRC in a length of 16 bits, a CRC mask may be 1111000011110000, or may be 1111111100000000, or may be another predefined value. This is not enumerated herein. When control information is generated, after the CRC parity bit is obtained, a predefined mask needs to be added to the corresponding CRC parity bit. A receiver can complete a corresponding CRC check operation only after knowing these predefined masks. The first transmission manner and the second transmission manner are differentiated by using different CRC masks. In this way, UE transmitters or receivers using these two transmission manners can receive information corresponding to the two types of transmission manners by using corresponding processing methods, to improve processing efficiency.

That scrambling sequences are different means that sequence types for generating scrambling sequences are different, or generator polynomials for generating the scrambling sequence are different. Optionally, that scrambling sequences are different may include: Initial values for generating scrambling sequences are different.

That DMRSs are different may mean DMRS sequences are different, that is, at least one of the following is different: a root sequence number, a cyclic shift, and an orthogonal cover code (OCC). That DMRSs are different may mean: For symbols occupied by a plurality of different DMRSs used during a single transmission, DMRS sequences mapped onto different symbols are different. For example, there are four DMRS symbols during a single transmission, and DMRS sequences on some of the four DMRS symbols are different from DMRS sequences on the other DMRS symbols. Herein, the DMRS is a signal generated when a predefined sequence (DMRS sequence) is mapped, according to a rule, onto a symbol occupied by the DMRS.

That sizes of physical resources occupied for transmitting the control information are different may mean: A quantity of PRBs occupied for transmitting control information in the first transmission manner is different from that in the second transmission manner. For example, one PRB is occupied in the first transmission manner, and two, three, or four PRBs are occupied in the second transmission manner.

That MCSs are different means that different MCSs are used when different types of control channels are used for transmitting the control information. For example, an MCS in the first transmission manner is an MCS1, and an MCS in the second transmission manner is an MCS2. The MCS2 is lower than the MCS1, to ensure a transmission success rate of high speed UE.

That quantities of transmissions of the control information are different means that quantities of transmissions are different for different types. For example, a quantity of transmissions in the first transmission manner is N1, and a quantity of transmissions in the second transmission manner is N2, and N1<N2. A speed of the second type of UE is greater than a speed of the first type of UE, and therefore a quantity of transmissions in a transmission manner used by the second type of UE is greater than a quantity of transmissions in a transmission manner used by the first type of UE. This ensures a transmission success rate of the high speed UE.

Optionally, the transmission manner may alternatively be a field contained in the control information, or the like. For example, control information using the first transmission manner contains A1 fields, and control information using the second transmission manner contains A2 fields, and A1<A2.

Optionally, in an embodiment, control information transmitted by the first type of UE may be carried on a first control channel, and control information transmitted by the second type of UE may be carried on a second control channel. The first control channel may be a first PSCCH, and the second control channel may be a second PSCCH.

In other words, in the embodiments of the present disclosure, two different control channels: the first PSCCH and the second PSCCH, may be defined over the first link. Corresponding data channels (which may also be referred to as service channels) may include a first PSSCH and a second PSSCH, and the first PSSCH corresponds to the first PSCCH, and the second PSSCH corresponds to the second PSCCH. The first PSCCH is used for transmitting first-link data of the first type of UE, and the second PSCCH is used for transmitting first-link data of the second type of UE. The first PSCCH and the second PSCCH use different transmission manners. The first PSCCH and the second PSCCH may be the same or different. That the first PSCCH and the second PSCCH are different means that the transmission manners differ in one of the foregoing fields. If the first PSCCH and the second PSCCH are the same, all of the foregoing fields included in the two transmission manners are the same, and the first control channel and the second control channel include same fields, where values of some or all of the fields for the first control channel are different from that for the second control channel. For example, the first control channel and the second control channel include a same field indicating speed information. A value of the same field for the first control channel is different from that for the second control channel. For example, the first control channel includes one-bit speed indication information, and a value of the speed indication information is 0, which is corresponding to the first type of UE; and the first control channel includes one-bit speed indication information, and a value of the speed indication information is 1, which is corresponding to the second type of UE.

A speed of the first type of UE is less than a preset speed threshold, and a speed of the second type of UE is greater than or equal to the preset speed threshold. In other words, the first type of UE is UE whose speed is less than the preset speed threshold, and the second type of UE is UE whose speed is greater than or equal to the preset speed threshold. It can be understood that the first PSCCH is used in an average speed (also referred to as non-high speed) scenario, and the second PSCCH is used in a high speed scenario.

In addition, sizes of the first PSCCH and the second PSCCH may be the same or different. This is not limited in the present disclosure.

Optionally, in an implementation, the first transmission manner includes: The transmission resource used by the control information is a first transmission resource. The second transmission manner includes: The transmission resource used by the control information is a second transmission resource. Alternatively, it may be expressed as follows: The first transmission manner includes a first transmission resource, and the second transmission manner includes a second transmission resource.

The first transmission resource may be from a first resource set, and the second transmission resource may be from a second resource set. Alternatively, the first transmission resource may be from a first resource subset of a first resource set, and the second transmission resource may be from a second resource subset of a second resource set. Alternatively, the first transmission resource may be from a first resource set, and the second transmission resource may also be from the first resource set, and a resource occupied for second transmission is indicated by using information or a subset of the first resource set used by the second type of UE is specified in a predefined manner.

Optionally, in the embodiments of the present disclosure, the first resource set (and/or the first resource subset) and the second resource set (and/or the second resource subset) may be predefined, for example, may be preconfigured, or may be specified in advance in a protocol.

Optionally, in the embodiments of the present disclosure, the first resource set (and/or the first resource subset) and the second resource set (and/or the second resource subset) may be obtained from first indication information that is sent by a first base station. The first indication information is described in more detail in subsequent method embodiments.

Figure 3:
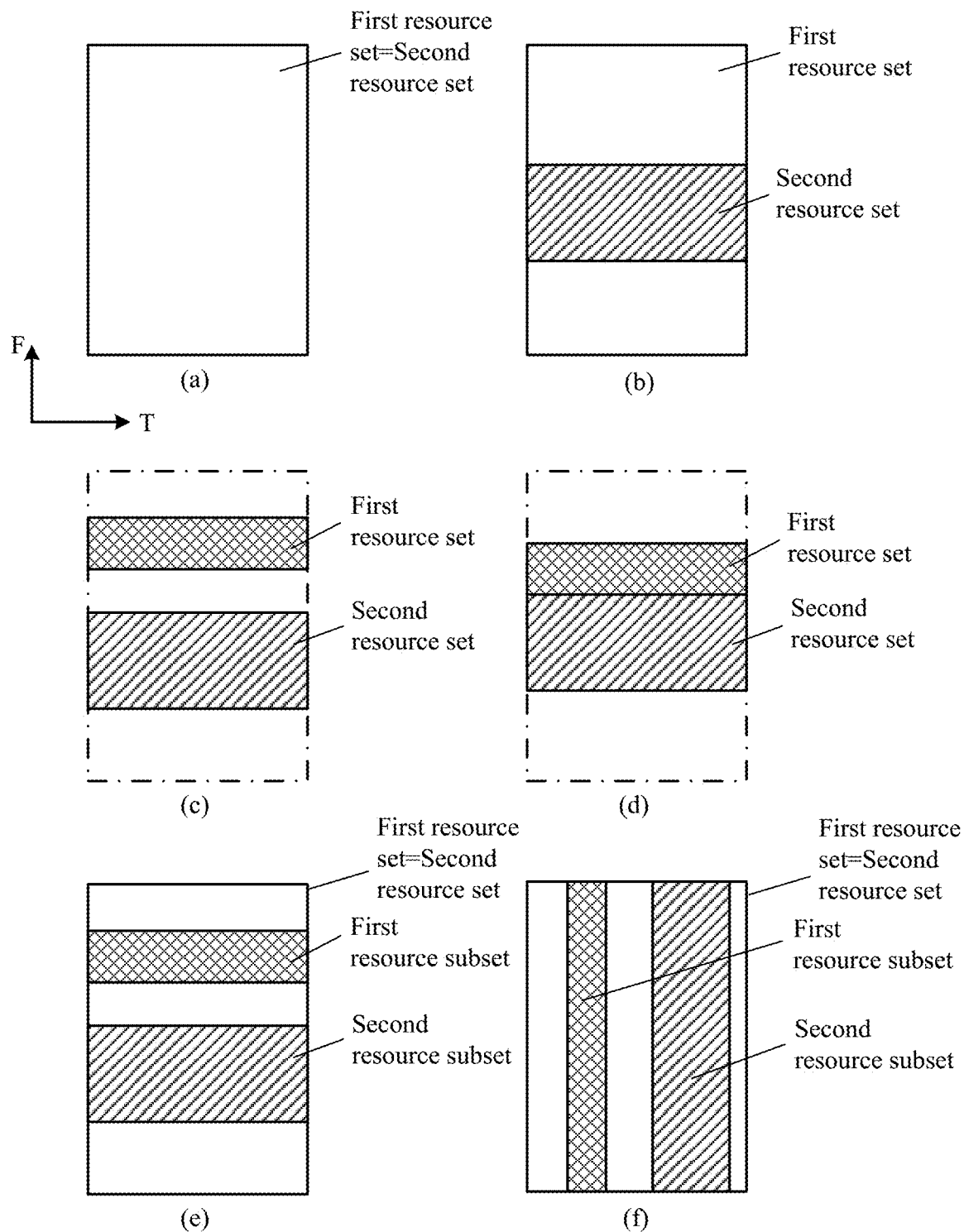
FIG. 3 is a schematic diagram of a first resource set and a second resource set according to an embodiment of the present disclosure.

In an example, the first resource set and the second resource set may be a same resource set, as shown in FIG. 3($a$). Assuming that the same resource set is referred to as a resource set, the first transmission resource and the second transmission resource may be determined from the resource set.

It is assumed that the first resource set includes N physical resource blocks (PRB), and the N PRBs may be represented as $\{0, 1, 2, \ldots, N-1\}$.

The first transmission resource and the second transmission resource each have N different candidate locations in a resource set including the N PRBs. In this case, UE performs blind detection on all possible candidate locations, causing relatively high complexity.

In another example, the second resource set is a subset of the first resource set, as shown in FIG. 3(b). In this case, the first transmission resource may be determined from the first resource set, and the second transmission resource may be determined from the second resource set.

In another example, the first resource set and the second resource set are different. The first resource set and the second resource set may be adjacent or not adjacent in frequency domain. FIG. 3(c) shows a first resource set and a second resource set that are not adjacent in frequency domain. FIG. 3(d) shows a first resource set and a second resource set that are adjacent in frequency domain. In this case, the first transmission resource may be determined from the first resource set, and the second transmission resource may be determined from the second resource set.

In another example, the first resource set and the second resource set are different. Therefore, the first transmission resource may be determined from the first resource subset of the first resource set, and the second transmission resource may be determined from the second resource subset of the second resource set. Alternatively, the first transmission resource is determined from the first resource set, and the second transmission resource is determined from the second resource subset of the second resource set. Alternatively, the first transmission resource is determined from the first resource subset of the first resource set, and the second transmission resource is determined from the second resource set.

In another example, the first resource set and the second resource set are a same resource set. Therefore, the first transmission resource may be determined from the first resource subset of the first resource set, and the second transmission resource may be determined from the second resource subset of the second resource set. Alternatively, the first transmission resource is determined from the first resource set, and the second transmission resource is determined from the second resource subset of the second resource set. Alternatively, the first transmission resource is determined from the first resource subset of the first resource set, and the second transmission resource is determined from the second resource set.

In the embodiments of the present disclosure, a case in which a resource subset is contained is described in more detail. It is assumed that the first resource set and the second resource set are a same resource set, as shown in FIG. 3(a), and the first resource subset is a subset of the first resource set, and the second resource subset is a subset of the second resource set, as shown in FIG. 3(e) and FIG. 3(f).

A time-frequency resource location of the first resource subset in the first resource set may be predefined or indicated by using signaling, and a time-frequency resource location of the second resource subset in the second resource set may also be predefined or indicated by using signaling.

The first resource set and the second resource set are a same resource set. In this case, both the first resource set and the second resource set may be referred to as a resource set. It is assumed that the resource set includes N physical resource blocks (PRB), and the N PRBs may be represented as {0, 1, 2, . . . , N−1}.

If a location of the first resource subset and/or a location of the second resource subset is specified in the resource set, for example, a time-frequency resource location in the resource set, UE can perform blind detection based on the determined location. This can reduce a quantity of blind detections and reduce complexity.

In an example, a frequency domain location of the first resource subset and/or the second resource subset may be specified in the resource set.

Only a frequency domain location or a time domain location of the second resource subset may be specified in the second resource set. In this case, the first transmission resource may be determined from the first resource set, and the second transmission resource may be determined from the second resource subset.

Only a frequency domain location or a time domain location of the first resource subset may be specified in the first resource set. In this case, the first transmission resource may be determined from the first resource subset, and the second transmission resource may be determined from the second resource set.

A frequency domain location or a time domain location of the first resource subset may be specified in the first resource set, and a frequency domain location or a time domain location of the second resource subset may be specified in the second resource set. In this case, the first transmission resource may be determined from the first resource subset, and the second transmission resource may be determined from the second resource subset.

FIG. 3(e) shows frequency domain locations occupied by the first resource subset and the second resource subset in the resource set, and the first resource subset and the second resource subset occupy different frequency domain locations.

In addition, the first resource subset and the second resource subset may be adjacent or not adjacent in frequency domain. This is not limited in the present disclosure.

It should be noted that FIG. 3(e) shows only an example, and the first resource subset and/or the second resource subset may occupy discontinuous frequency domain locations.

For example, as shown in FIG. 3(e), the first resource subset occupies continuous frequency domain locations, the second resource subset occupies continuous frequency domain locations, and the first resource subset and the second resource subset are not adjacent in frequency domain.

For another example, the second resource subset occupies the $i1^{th}$, the $(i1+M1)^{th}$, the $(i1+2*M1)^{th}$, . . . , and the $(i1+k1*M1)^{th}$ subcarriers of the resource set. Values of i1 and M1 may be predefined, or may be indicated by a base station by using signaling. Usually, $0 \leq i1 < M1$, and i1 and M1 are integers.

Optionally, it may be indicated that the first resource subset occupies the $i2^{th}$, the $(i2+M2)^{th}$, the $(i2+2*M2)^{th}$, and the $(i2+k2*M2)^{th}$ subcarriers of the resource set. Values of i2 and M2 may be predefined, or may be indicated by a base station by using signaling. Usually, $0 \leq i2 < M2$, and i2 and M2 are integers.

FIG. 3(f) shows time domain locations occupied by the first resource subset and the second resource subset in the resource set, and the first resource subset and the second resource subset occupy different time domain locations.

In addition, the first resource subset and the second resource subset may be adjacent or not adjacent in time domain. This is not limited in the present disclosure.

It should be noted that FIG. 3(f) shows only an example, and the first resource subset and/or the second resource subset may occupy discontinuous time domain locations.

For example, as shown in FIG. 3(e), the first resource subset occupies continuous time domain locations, the second resource subset occupies continuous time domain locations, and the first resource subset and the second resource subset are not adjacent in time domain.

For another example, the second resource subset occupies the i3th, the $(i3+1+M3)^{th}$, the $(i3+2*M3)^{th}$, ..., and the $(i3\pm k3*M3)^{th}$ symbols (or subframes) of the resource set. Values of i3 and M3 may be predefined, or may be indicated by a base station by using signaling. Usually, $0 \leq i3 < M3$, and i3 and M3 are integers.

Optionally, it may be indicated that the first resource subset occupies the i4th, the $(i4+M4)^{th}$, the $(i4+2*M4)^{th}$, ..., and the $(i4+k4*M4)^{th}$ symbols (or subframes) of the resource set. Values of i4 and M4 may be predefined, or may be indicated by a base station by using signaling. Usually, $0 \leq i4 < M4$, and i4 and M4 are integers.

For example, if i1 and M1 are used to specify the frequency domain location of the second resource subset in the second resource set, the first transmission resource may be determined from the first resource set, and the second transmission resource may be determined from the second resource subset. It is assumed that i1=1 and M1=4. In this case, first UE may determine that sequence numbers of the subcarriers occupied by the second resource subset are {1, 5, 9, 13 ... }. It can be learned that in this case, a quantity of blind detections performed on the first resource set is N, a quantity of blind detections performed on the second resource subset is N/M1, and a total quantity of blind detections is N+N/M1. Therefore, a quantity of blind detections performed on the second resource subset declines to 1/M1 of an original quantity of blind detections performed on the second resource subset, greatly reducing blind detection complexity.

For example, if i1 and M1 are used to specify the frequency domain location of the second resource subset in the second resource set, and i2 and M2 are used to specify the frequency domain location of the first resource subset in the first resource set, the first transmission resource may be determined from the first resource subset, and the second transmission resource may be determined from the second resource subset. It is assumed that i1=1, M1=4, i2=0, and M2=4. In this case, first UE may determine that sequence numbers of the subcarriers occupied by the first resource subset are {0, 4, 8, 12 ... } and sequence numbers of the subcarriers occupied by the second resource subset are {1, 5, 9, 13 ... }. It can be learned that in this case, a quantity of blind detections performed on the first resource subset is N/M2, a quantity of blind detections performed on the second resource subset is N/M1, and a total quantity of blind detections is N/M2+N/M1. Therefore, a quantity of blind detections performed on the first resource subset declines to 1/M2 of an original quantity of blind detections performed on the first resource subset, and a quantity of blind detections performed on the second resource subset declines to 1/M1 of an original quantity of blind detections performed on the second resource subset, greatly reducing blind detection complexity. Further, it can be understood that, when M1=M2=2, the total quantity of blind detections is N, which is equal to a total quantity of blind detections performed when there is no second resource subset. In addition, it can be understood that, a larger quantity of limitations imposed on the first resource subset and the second resource subset indicate a smaller quantity of blind detections, but also fewer available resources. Therefore, a base station may perform optimization based on a quantity of blind detections and a quantity of available resources, to reduce the quantity of blind detections as much as possible while meeting a requirement for available resources.

It can be learned that in the embodiments of the present disclosure, a correspondence between a UE type and a transmission manner may be shown in Table 2. The correspondence may be predefined, or may be indicated by the base station by using signaling.

TABLE 2

| UE | Transmission manner |
| --- | --- |
| First type of UE | First transmission manner |
| Second type of UE | Second transmission manner |

Figure 4:
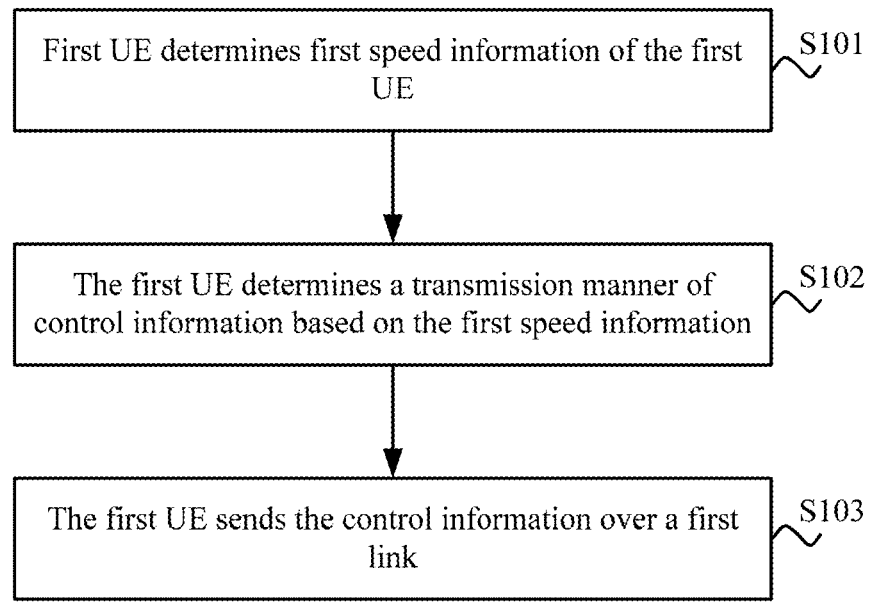
FIG. 4 is a flowchart of an information transmission method according to an embodiment of the present disclosure.

FIG. 4 is a flowchart of an information transmission method according to an embodiment of the present disclosure. The method shown in FIG. 4 may be executed by first UE. The first UE may be the UE 41 shown in FIG. 2. The method includes the following steps.

S101: The first UE determines first speed information of the first UE.

In this embodiment of the present disclosure, the first speed information may be used to indicate a speed of the first UE. Optionally, the first speed information may indicate the speed of the first UE in a form of a speed grade. Herein, the speed of the first UE may be an absolute speed, or may be a relative speed relative to another UE or a plurality of other UEs, or may be an acceleration of the first UE relative to the ground or an acceleration relative to another UE or a plurality of other UEs. This is not limited in the present disclosure.

In an embodiment, the first speed information is used to indicate the absolute speed of the first UE.

Optionally, the first UE may obtain the first speed information in a GNSS mode. Alternatively, the first UE may obtain the first speed information by using information indicated by a first base station.

Optionally, if the first UE is a communications module at a physical layer, the first UE may obtain the first speed information based on indication information from another layer.

Optionally, the first UE may determine the first speed information by using a corresponding speed measuring apparatus. For example, if the first UE is an OBU, the first UE may determine the first speed information by using a corresponding module in a car such as an engine module, a gearbox module, or another module that electrically controls a speed. For example, a current speed of the first UE measured is v, and a unit of the speed is km/h or miles/h.

In another embodiment, the first speed information is used to indicate the relative speed of the first UE relative to the another UE (for example, second UE).

Optionally, the first UE may first determine an absolute speed of the first UE itself (namely, the absolute speed of the first UE), and then obtain speed information and/or location information of the second UE by measuring or parsing a signal or a data packet that is sent from the second UE. The first UE may further determine information about a relative speed of the first UE relative to the second UE based on the information. Herein, the second UE may be one UE, or may be a plurality of different UEs. If the second UE is the plurality of different UEs, the relative speed is a weighted value of speeds relative to the plurality of UEs, for example, an arithmetic weighted average and a geometric weighted average.

Optionally, if the first UE is a communications module at a physical layer, the first UE may obtain the first speed information based on indication information from another layer.

S102: The first UE determines a transmission manner of control information based on the first speed information.

The first UE may determine a type of the first UE based on the first speed information of the first UE, that is, determine that the first UE is a first type of UE or a second type of UE.

Optionally, if the first speed information indicates that the speed of the first UE is less than a preset speed threshold, the first UE is the first type of UE. If the first speed information indicates that the speed of the first UE is greater than or equal to a preset speed threshold, the first UE is the second type of UE.

Alternatively, if the first speed information indicates that the relative speed of the first UE relative to the second UE is less than a preset speed threshold, the first UE is the first type of UE. If the first speed information indicates that the relative speed of the first UE relative to the second UE is greater than or equal to a preset speed threshold, the first UE is the second type of UE.

Optionally, if the first speed information indicates that a speed grade of the first UE is lower than a preset grade threshold, the first UE is the first type of UE. If the first speed information indicates that a speed grade of the first UE is higher than or equal to a preset grade threshold, the first UE is the second type of UE. The speed grade of the first UE is determined based on the speed of the first UE, and the speed of the first UE may be an absolute speed or a relative speed.

The speed threshold and/or the speed grade threshold may be predefined, or may be indicated by the first base station by using signaling. Herein, the first base station may be a serving base station of the first UE. For example, the first base station may be the eNB 10 shown in FIG. 2, or may be an RSU having a base station function. This is not limited in the present disclosure.

In an implementation, the control information in this embodiment of the present disclosure is carried on a third control channel. For example, the third control channel may be a PSCCH, or may be a physical sidelink broadcast channel (PSBCH).

If the third control channel is the PSBCH, before step S102, a transmission manner of control information carried on the PSBCH may be configured on the first UE, and correspondingly, in step S102, the first UE may obtain the preconfigured transmission manner. Optionally, the transmission manner of the control information that is determined in step S102 may include a third transmission resource.

Optionally, the third control channel carrying the control information may be used to indicate a service type. The service may include a security service and a non-security service. The security service may be, for example, a security service that is used for public safety or intelligent transportation systems (ITS), that is, ITS-safety. The non-security service may be, for example, a non-security service in the ITS, that is, non-ITS-safety, or may be a non-public safety service, that is, a common data transmission service. Correspondingly, the service type may be a security type or a non-security type.

For example, the service type may be indicated by the control information. In other words, the control information is used to indicate the service type, and the service type is a security type or a non-security type.

For example, the service type may be indicated by using a one-bit field, a predefined CRC mask, a predefined scrambling sequence, a predefined DMRS, a predefined transmission resource, or the like in the third control channel.

Specifically, "1" indicated in the one-bit field may be used to indicate the security service, and "0" to indicate the non-security service.

Alternatively, specifically, an all-"1" CRC mask may be used to indicate the security service, and an all-"0" CRC mask may be used to indicate the non-security service.

Alternatively, specifically, the predefined DMRS is used to indicate the security service. For example, a DMRS sequence that is sent in the control information is divided into two groups, one group is used to indicate the security service, and the other group is used to indicate the non-security service. The control information may be carried on a PSCCH, or may be carried on the PSBCH. The two groups of DMRSs may be two groups of DMRS sequences having different cyclic shifts, or may be two groups of DMRS sequences having different root sequence numbers, or may be two groups of DMRS sequences having different OCCs.

Alternatively, specifically, different resources are used to indicate the security service. Herein, the resources may be different time domain resources or different frequency domain resources, or may be transmission periods or intervals of the control information. Different transmission periods and different transmission intervals are corresponding to the security service and the non-security service.

Optionally, in this embodiment of the present disclosure, the method shown in FIG. 4 may further include: sending, by the first UE, a synchronization signal over a first link. The synchronization signal may be a sidelink synchronization signal (SLSS).

In this case, if the synchronization signal that is sent by the first UE is detected by the another UE (for example, the second UE), the second UE may select the first UE as a synchronization source of the second UE, and the second UE may complete synchronization with the first UE based on the synchronization signal that is sent by the first UE.

Optionally, the synchronization signal may be used to indicate the service type. The service type may be the security type or the non-security type.

For example, a synchronization signal transmission period or interval may be used to indicate the service type. For example, a period threshold may be set; when the transmission period of the synchronization signal is greater than the period threshold, the service type is the security type; and when the transmission period of the synchronization signal is less than or equal to the period threshold, the service type is the non-security type. For example, an interval threshold may be set; when the transmission interval of the synchronization signal is greater than the interval threshold, the service type is the security type; and when the transmission interval of the synchronization signal is less than or equal to the interval threshold, the service type is the non-security type. This is not limited in the present disclosure.

For example, a combination of different primary synchronization signals may be used to indicate the service type. Alternatively, a combination of different secondary synchronization signals may be used to indicate the service type. Alternatively, a combination of a primary synchronization signal and a secondary synchronization signal may be used to indicate the service type. For example, a combination of different sequences of two primary synchronization signals and/or a combination of different sequences of two different secondary synchronization signals are used to indicate a security service and a non-security service. For example, when the sequences of the two primary synchronization signals are the same, the service is the security service; and when the sequences of the two primary synchronization signals are different, the service is the non-security service. For another example, when the sequences of the two primary synchronization signals are the same, the service is the non-security service; and when the sequences of the two primary synchronization signals are different, the service is the security service. Similarly, an operation the same as that performed on the sequences of the primary synchronization signals may be performed on the sequences of the two secondary synchronization signals, for indication. No enumeration is further provided herein.

Optionally, different primary synchronization signal sequences may be used to respectively indicate a security service and a non-security service, and/or different secondary synchronization signal sequences may be used to respectively indicate a security service and a non-security service.

For example, two groups of primary synchronization signal sequences may be defined; and a first group of primary synchronization signal sequences and a second group of primary synchronization signal sequences are different, and are respectively used to indicate the security service and the non-security service. For example, the first group of primary synchronization signal sequences include Zadoff-Chu sequences whose root sequence numbers are 26 and 37; and the second group of primary synchronization signal sequences include one or more Zadoff-Chu sequences whose root sequence number is not 26 or 37.

For example, two groups of secondary synchronization signal sequences may be defined; and a first group of secondary synchronization signal sequences and a second group of secondary synchronization signal sequences are different, and are respectively used to indicate the security service and the non-security service. For example, a value range of identifiers of the first group of secondary synchronization signal sequences is [0, 83], and a value range of identifiers of the second group of secondary synchronization signal sequences is [84, 167]. For another example, a value range of identifiers of the first group of secondary synchronization signal sequences is [0, 167], and a value range of identifiers of the second group of secondary synchronization signal sequences is [168, 335].

Optionally, the third control channel carrying the control information may further indicate at least one of the following information: whether the first UE is a synchronization source, and an identifier of a synchronization source of the first UE.

If the synchronization source of the first UE is the first base station, the identifier of the synchronization source of the first UE is a physical cell identifier of the first base station; or if the synchronization source of the first UE is a GNSS, the identifier of the synchronization source of the first UE is a predefined identifier corresponding to the GNSS.

It can be understood that in this embodiment of the present disclosure, the predefined identifier corresponding to the GNSS may be set for the GNSS in advance, and may be, for example, a negative number such as −1; or may be, for example, a value greater than a service set identifier (SSID) of the existing first link such as 336 or 400; or may be, for example, a predefined identifier between 0 and 335. This is not limited in the present disclosure.

Whether the first UE may be used as the synchronization source may be explicitly or implicitly indicated. For example, whether the first UE may be used as the synchronization source may be indicated by the control information. In other words, the control information may be used to indicate whether the first UE is the synchronization source. For example, the identifier of the synchronization source of the first UE may be indicated by the control information. In other words, the control information may be used to indicate the identifier of the synchronization source of the first UE.

For another example, whether the first UE may be used as the synchronization source may be indicated by using a particular field in the third control channel. Assuming that the particular field is a field A, the field A may be set to 1, which indicates that the first UE may be used as the synchronization source. The field A may be set to 0, which indicates that the first UE cannot be used as the synchronization source.

The identifier of the synchronization source of the first UE may be indicated by using another particular field in the third control channel. Optionally, if the synchronization source of the first UE is the GNSS, the another particular field may be set to 1. If the synchronization source of the first UE is not the GNSS, the another particular field may be set to 0. Alternatively, optionally, if the synchronization source of the first UE is the first base station, the identifier of the synchronization source of the first UE is the physical cell identifier of the first base station. If the synchronization source of the first UE is the GNSS, the identifier of the synchronization source of the first UE is the predefined identifier corresponding to the GNSS. If the synchronization source of the first UE is another UE (for example, third UE or fourth UE), the identifier of the synchronization source of the first UE is an identifier of the another UE or a synchronization signal identifier of the another UE.

Assuming that the another particular field indicating the identifier of the synchronization source of the first UE is a field B, the field B may be set to −1, which indicates that the synchronization source of the first UE is the GNSS.

It can be understood that if the third control channel further indicates that the first UE may be used as the synchronization source, and the first UE sends a synchronization signal over the first link, another UE (for example, the second UE) that receives the control information and the synchronization signal may select the first UE as the synchronization source of the second UE based on the control information and the synchronization signal that is sent by the first UE.

If the third control channel indicates the identifier of the synchronization source of the first UE, it can be understood that before this, the method may further include: determining, by the first UE, the synchronization source of the first UE.

Specifically, the first UE may determine the synchronization source of the first UE based on the first speed information.

If the first UE determines, based on the first speed information, that the first UE is the first type of UE, the first UE may determine the synchronization source according to preconfigured information.

For example, if the preconfigured information indicates that a synchronization source of the first type of UE is a base station, the first UE determines that the synchronization source is the first base station. The first base station may be a serving base station of the first UE.

If the first UE is the first type of UE and the preconfigured information indicates that the synchronization source of the first UE is a base station, the first UE may complete synchronization with the first base station by using a prior-art method, and details are not described herein.

For example, if the preconfigured information indicates that the synchronization source of the first type of UE is a GNSS, the first UE preferentially determines that the synchronization source is the GNSS.

For example, if the preconfigured information indicates that the synchronization source of the first type of UE is an RSU, the first UE determines that the synchronization source is the RSU.

If the first UE determines, based on the first speed information, that the first UE is the second type of UE, the first UE may preferentially determine that the synchronization source is a GNSS. Alternatively, if the first UE determines, based on the first speed information, that the first UE is the first type of UE, and the preconfigured information indicates that the synchronization source is the GNSS, the first UE may preferentially determine that the synchronization source is the GNSS.

That the first UE preferentially determines that the synchronization source is the GNSS may include: If a GNSS signal is detected by the first UE, the first UE uses the GNSS as the synchronization source; if a GNSS signal is not detected by the first UE, the first UE determines that the synchronization source is the first base station or third UE. The first base station is a serving base station of the first UE, and the third UE is UE directly synchronized with the GNSS.

Specifically, if a GNSS signal is detected by the first UE, the first UE uses the GNSS as the synchronization source.

Optionally, that a GNSS signal is detected includes: A GNSS signal whose signal strength is greater than or equal to a preset signal strength threshold is detected.

Optionally, that a GNSS signal is detected may include: The GNSS signal is detected at a current moment.

Alternatively, that a GNSS signal is detected may include: When a GNSS signal is not detected, the first UE starts a timer and then the GNSS signal is detected within duration of the timer.

It can be learned that if a GNSS signal is not detected by the first UE, the first UE may re-attempt to detect the GNSS signal within the duration of the timer, so that the first UE can synchronize with the GNSS as much as possible.

If the first UE is the second type of UE, it is assumed that a receive end of a service channel that is transmitted by the first UE is the second UE. If the first UE and the second UE synchronize with two different base stations when the first UE transmits the service channel, when a relative vehicle speed between the first UE and the second UE is 500 km/h, a maximum frequency deviation value between the two UEs over the first link in 5.9 GHz is 7.4 kHz. If the first UE and the second UE synchronize with the GNSS when the first UE transmits the service channel, when a relative vehicle speed between the first UE and the second UE is 500 km/h, a maximum frequency deviation value between the two UEs over the first link in 5.9 GHz is 4.0 kHz. It can be learned that, for signal sending and reception by high speed UE, the high speed UE should be synchronized with the GNSS as much as possible. Therefore, when the first UE is the second type of UE, in this embodiment of the present disclosure, the synchronization source of the first UE is preferentially determined as the GNSS, so that the first UE can synchronize with the GNSS as much as possible. This can minimize frequency deviation of service transmission over the first link, ensure transmission performance of the first link, reduce a packet error rate, and expand a coverage area.

It should be noted that the timer in this embodiment of the present disclosure may be configured by the first base station, or may be predefined, or may be implemented inside the first UE. For example, the first UE may be locked to the GNSS for a period of time within duration of a timer that is generated based on an internal clock of the first UE. The duration of the timer may depend on precision of the internal clock of the UE, or may be indicated by using signaling configured by the base station, or may be predefined. For example, the duration is 10 minutes or 2 minutes.

Specifically, if a GNSS signal is not detected by the first UE, the first UE may use the first base station or the third UE as the synchronization source. The first base station is a serving base station of the first UE, and the third UE is UE directly synchronized with the GNSS. That is, a synchronization source of the third UE is the GNSS.

That the first UE uses the third UE as the synchronization source may include: The first UE receives a synchronization signal that is sent by the third UE, and performs timing based on the synchronization signal that is sent by the third UE. The synchronization signal that is sent by the third UE may be a sidelink synchronization signal (SLSS).

Optionally, that a GNSS signal is not detected may include: No GNSS signal is detected, or a GNSS signal whose signal strength is less than the preset signal strength threshold is detected.

Alternatively, that a GNSS signal is detected may include: When a GNSS signal is not detected, the first UE starts a timer and the GNSS signal is still not detected within duration of the timer.

In another understanding, in this embodiment of the present disclosure, if the first UE is the second type of UE, the first UE may determine the synchronization source according to a predefined order of priority.

The predefined order of priority may be: GNSS→first base station→third UE→fourth UE. Alternatively, the predefined order of priority may be: GNSS→third UE→first base station→fourth UE. Herein, the third UE is UE directly synchronized with the GNSS, and the fourth UE is UE not directly synchronized with the GNSS, or the fourth UE is UE indirectly synchronized with the GNSS. That is, the synchronization source of the third UE is the GNSS, and a synchronization source of the fourth UE is not the GNSS.

Specifically, if signal quality of an upper priority signal that is received by the first UE does not meet a performance requirement, a device of a next lower priority is used as the synchronization source. Alternatively, if signal quality of an upper priority signal that is received by the first UE does not meet a performance requirement, a timer is started; and if the signal quality still does not meet the performance requirement before the timer expires, a device of a next lower priority is used as the synchronization source after the timer expires.

It can be understood that duration that is set for timers of different priorities may be equal or not equal. This is not limited in the present disclosure. For example, a first timer may be used in a process of synchronizing with the GNSS, a second timer may be used in a process of synchronizing with the first base station, a third timer may be used in a process of synchronizing with the third UE, and a fourth timer may be used in a process of synchronizing with the fourth UE.

If the order of priority is GNSS→first base station→third UE→fourth UE, when a GNSS signal is not detected by the first UE, a process of determining the synchronization source may include the following.

The first UE attempts to use the first base station as the synchronization source. If the attempt of the first UE succeeds, the first UE uses the first base station as the synchronization source; if the attempt of the first UE fails, and a synchronization signal of the third UE is detected by the first UE, the first UE uses the third UE as the synchronization source; and if the attempt of the first UE fails, and a synchronization signal of the third UE is not detected by the first UE, the first UE uses the fourth UE as the synchronization source.

If the order of priority is GNSS→third UE→first base station→fourth UE, when a GNSS signal is not detected by the first UE, a process of determining the synchronization source may include the following.

If a synchronization signal of the third UE is detected by the first UE, the first UE uses the third UE as the synchronization source. If a synchronization signal of the third UE is not detected by the first UE, the first UE attempts to use the first base station as the synchronization source. If the attempt of the first UE succeeds, the first UE uses the first base station as the synchronization source; and if the attempt of the first UE fails, the first UE uses the fourth UE as the synchronization source.

In another implementation, the control information in this embodiment of the present disclosure is carried on a first control channel or a second control channel. That is, a control channel carrying the control information may be the first control channel or the second control channel. For example, the first control channel may be a first PSCCH, and the second control channel may be a second PSCCH.

If the first UE is the first type of UE, the control information is carried on the first control channel. If the first UE is the second type of UE, the control information is carried on the second control channel.

Specifically, if the first UE determines, based on the first speed information, that the first UE is the first type of UE, the first UE may determine that the transmission manner is a first transmission manner. If the first UE determines, based on the first speed information, that the first UE is the second type of UE, the first UE may determine that the transmission manner is a second transmission manner.

Optionally, in an embodiment, the first transmission manner and the second transmission manner may be predefined. For example, the first transmission manner and the second transmission manner may be preconfigured on the first UE, or the first transmission manner and the second transmission manner may be specified in a protocol in advance.

For example, a transmission resource in the first transmission manner may be preconfigured as a first transmission resource, and a transmission resource in the second transmission manner may be preconfigured as a second transmission resource.

The first transmission resource may be from a first resource set, and the second transmission resource may be from a second resource set. Alternatively, the first transmission resource may be from a first resource subset of a first resource set, and the second transmission resource may be from a second resource subset of a second resource set.

In this embodiment of the present disclosure, the first resource set and the second resource set may be predefined. Alternatively, the first resource subset and the second resource subset may be predefined. The first resource set and the second resource set may be predefined, and at the same time, a location of the first resource subset in the first resource set may be predefined, and a location of the second resource subset in the second resource set may be predefined.

Optionally, the first resource set and the second resource set may be two different resource sets; or the first resource set and the second resource set may be a same resource set; or the second resource set may be a subset of the first resource set.

For example, a scrambling sequence in the first transmission manner may be preconfigured as a first scrambling sequence, and a scrambling sequence in the second transmission manner may be preconfigured as a second scrambling sequence.

For example, a CRC mask in the first transmission manner may be preconfigured as a first CRC mask, and a CRC mask in the second transmission manner may be preconfigured as a second CRC mask.

In this way, in step S102, the first UE may obtain the predefined first transmission manner and second transmission manner, and determine, based on the first speed information, that the transmission manner of the control information is the first transmission manner or the second transmission manner.

Optionally, in another embodiment, the first transmission manner and the second transmission manner may be determined based on a signaling indication of the first base station. Herein, the first base station may be the eNB 10 shown in FIG. 2, or an RSU having a base station function. This is not limited in the present disclosure.

For example, the first transmission manner includes the first transmission resource, and the second transmission manner includes the second transmission resource. In this embodiment of the present disclosure, before step S102, the method may include: receiving, by the first UE, first indication information that is sent by the first base station, where the first indication information is used to indicate the first resource set and the second resource set. Further, in step S102, the first UE may determine the transmission manner of the control channel based on the first indication information and the first speed information.

Optionally, the first indication information may be sent by the first base station in a multicast manner or a broadcast manner. The first indication information may be sent by the first base station over the second link to some UEs or all UEs in a cell that is served by the first base station. Herein, the some UEs include the first UE.

Optionally, the first indication information may be sent by the first base station by using radio resource control (RRC) signaling or a system information block (SIB).

Optionally, the first indication information may be indicated by the first base station in downlink control information (DCI) by using dynamic signaling. For example, the DCI may be DCI in a physical downlink control channel (PDCCH) or may be dedicated DCI. For example, a particular field in the DCI is used to indicate that a preconfigured resource is used for high speed or low speed UE. Specifically, one bit in the DCI may be used to indicate that a transmission resource indicated by the DCI or a transmission resource indicated in the RRC signaling and/or the SIB is used for the high speed UE or the low speed UE.

In an example, the first transmission manner includes the first transmission resource, and the second transmission manner includes the second transmission resource. The first transmission resource is from the first resource set or the first resource subset of the first resource set. The second transmission resource is from the second resource set or the second resource subset of the second resource set. The first indication information in this embodiment of the present disclosure may be used to indicate the first resource set and the second resource set.

Correspondingly, step S102 includes: if the first UE is the first type of UE, determining, by the first UE, the first transmission resource from the first resource set or from the first resource subset of the first resource set based on the first indication information, so as to determine the first transmission manner; if the first UE is the second type of UE, determining, by the first UE, the second transmission resource from the second resource set or from the second resource subset of the second resource set based on the first indication information, so as to determine the second transmission manner.

Optionally, the first base station may determine, based on speed information of UE in the cell that is served by the first base station, when to send the first indication information, or when and how to send the first indication information.

It can be understood that in this embodiment of the present disclosure, before step S102, the method may include: sending, by the first UE, the first speed information to the first base station, and receiving the first indication information that is sent by the first base station. Further, in step S102, the first UE determines the transmission manner of the control channel based on the first speed information and the first indication information.

Specifically, the first UE may send the first speed information to the first base station over the second link.

Optionally, the first UE may periodically send the first speed information to the first base station over the second link. Alternatively, when the speed of the first UE changes (for example, changes from a low speed to a high speed, or changes from a high speed to a low speed), the first UE may send the first speed information to the first base station over the second link. Alternatively, after receiving, from the first base station, an instruction of reporting speed information of the first UE, the first UE may send the first speed information to the first base station over the second link.

In an example, the first UE may directly send speed information of the first UE to the first base station. Herein, the speed may be an absolute speed of the first UE, or may be a relative speed of the first UE relative to another UE. Specifically, the first UE may send the speed information of the first UE to the first base station over the second link.

In another example, the first UE may send speed grade information of the first UE to the first base station. Specifically, the first UE may send the speed grade information of the first UE to the first base station over the second link.

In another example, the first UE may send location information of the first UE to the first base station. Specifically, the first UE may send the location information of the first UE to the first base station over the second link. In this case, the first base station may determine speed information of the first UE based on location information that is reported by the first UE for at least two times, a time interval, and the like.

In another example, the first UE may send an acceleration of the first UE to the first base station. Specifically, the first UE may send acceleration information of the first UE to the first base station over the second link. In this case, the first base station may predict a speed of the first UE based on the acceleration.

It can be understood that another UE in a service range of the first base station may also perform the process of reporting a speed.

In this case, the first base station may determine, based on the received speed information, when to send the first indication information, or when and how to send the first indication information.

For example, if the first base station determines, based on reporting of the UE, that there are a plurality of UEs whose speeds are greater than or equal to the preset speed threshold (or greater than or equal to the preset grade threshold), and the plurality of UEs disperse in a cell (for example, some UEs are located at the center of the cell, and some UEs are located at the edge of the cell), the first base station may determine that the first indication information is sent in a broadcast manner.

For example, if the first base station receives only a report from the first UE, and the speed of the first UE is greater than or equal to the preset speed threshold (or greater than or equal to the preset grade threshold), the first base station may send the first indication information to the first UE by using the DCI in the physical downlink control channel (PDCCH).

It can be understood that in another implementation, for example, if the first base station determines, based on the report from the UE, that there is no UE whose speed is greater than or equal to the preset speed threshold (or greater than or equal to the preset grade threshold), that is, all UEs in the cell are low speed UEs (or non-high speed UEs), the first base station may not send the first indication information. The first base station may send indication information used to indicate that there is no high speed UE. Alternatively, the first base station may indicate only the first transmission manner.

In an explicit indication manner, a field is used for indication. For example, a one-bit field may be used for indication. For example, "1" indicates that there is high speed UE, and "0" indicates that there is no high speed UE.

Optionally, in this embodiment of the present disclosure, before step S102, if the first UE is the second type of UE, the first UE sends the first speed information to the first base station. Then, the first UE may receive the first indication information that is sent by the first base station. Further, in step S102, the first UE determines the transmission manner of the control information based on the first speed information and the first indication information.

If the control information is carried on the first control channel or the second control channel, the method shown in FIG. 4 may further include: determining, by the first UE, a synchronization source of the first UE. In addition, this step may be performed before or after step S102. This is not limited in the present disclosure.

Specifically, the first UE may determine the synchronization source of the first UE based on the first speed information.

If the first UE determines, based on the first speed information, that the first UE is the first type of UE, the first UE may determine the synchronization source according to preconfigured information. If the first UE determines, based on the first speed information, that the first UE is the second type of UE, the first UE may preferentially determine that the synchronization source is a GNSS.

In another understanding, in this embodiment of the present disclosure, if the first UE is the second type of UE, the first UE may determine the synchronization source according to a predefined order of priority.

Specifically, for a method for determining the synchronization source by the first UE, reference may be made to the description in the foregoing embodiment, and to avoid repetition, details are not described herein again.

S103: The first UE sends the control information over a first link.

Specifically, the first UE sends the control information over the first link in the transmission manner that is determined in step S102.

Optionally, in step S103, the first UE may send the control information to the second UE over the first link. A link between the first UE and the second UE is the first link. It can be understood that the first UE may be a transmit end device over the first link, and the second UE may be a receive end device over the first link.

If the first UE is the first type of UE, in step S103, the first UE may send the control information over the first link in the first transmission manner. If the first UE is the second type of UE, in step S103, the first UE may send the control information over the first link in the second transmission manner.

As described in step S102, in an implementation, the control information is carrier on a third control channel. For example, the third control channel is a PSBCH. Optionally, the control information that is sent in step S103 may be used to indicate whether the first UE is a synchronization source, and/or used to indicate an identifier of a synchronization source of the first UE.

In another implementation, the control information is carried on a first control channel or a second control channel. If the first UE is the first type of UE, the control information is carried on the first control channel. If the first UE is the second type of UE, the control information is carried on the second control channel. For example, the first control channel may be a first PSCCH, and the second control channel may be a second PSCCH.

In this embodiment of the present disclosure, the control information may include at least one of the following information:

1. Speed Indication Information of the First UE

In an example, a type of the first UE may be included, that is, the first UE is the first type of UE or the second type of UE. In other words, the control information may include indication information that the first UE is the first type of UE, or the control information may include indication information that the first UE is the second type of UE. For example, one bit being "1" may be used to indicate that the first UE is the second type of UE (that is, high speed UE), and one bit being "0" may be used to indicate that the first UE is the first type of UE (that is, non-high speed UE).

In another example, the speed indication information of the first UE includes the first speed information. This means that the control information includes the first speed information.

For example, a speed of the first UE may be included. Herein, the speed may be an absolute speed, or may be a relative speed.

For example, speed grade information of the first UE may be included. For example, two bits being "10" may be used to indicate speed grade information, that is, a speed grade is 2. Two bits being "11" may be used to indicate that a speed grade is 3.

Optionally, when the first UE is the second type of UE, the control information may include the first speed information.

It can be understood that in step S103, the method may include: sending, by the first UE, the first speed information to the second UE by using the first link. After receiving the first speed information, the second UE performs corresponding processing. For example, in the control information, one bit may be used to indicate whether the first UE is high speed UE. If the first UE is the high speed UE, a resource that is selected and reserved for the first UE has a higher priority. After the second UE receives the control information that is sent by the first UE, when selecting and re-selecting a resource, the second UE should avoid as much as possible selecting the resource that is selected and/or reserved by the first UE. This ensures that resources are preferentially used by the high speed UE (the first UE).

2. A Quantity of Transmissions of Data Scheduled Based on the Control Information and a Time-Frequency Resource Used for Each Transmission The control information may be an SA. For example, in an autonomous mode-based resource selection and indication process, the first UE may indicate, by using the SA, a time-frequency resource of the data scheduled.

In this embodiment of the present disclosure, the quantity of transmissions of the data may be predefined. For example, the quantity of transmissions of the data is preconfigured on the first UE, or a quantity of transmissions of data of the high speed UE is pre-specified in a protocol. Alternatively, the quantity of transmissions of the data may be obtained by the first UE from information that is sent by a serving base station of the second UE. Alternatively, the quantity of transmissions of the data is determined by the first UE based on at least one of the following information: the first speed information of the first UE, geographical location information of the first UE and/or the second UE, signal quality of the first UE, signal quality of data and/or a signal that is sent by the second UE, and the like. This is not limited in the present disclosure.

Optionally, in an embodiment, the first UE may determine the quantity of transmissions of the data based on the first speed information of the first UE. For example, if the first UE determines that the first UE is the first type of UE, the first UE may determine that the quantity of transmissions of the data is N1; and if the first UE determines that the first UE is the second type of UE, the first UE may determine that the quantity of transmissions of the data is N2. Values of N1 and N2 may be preconfigured, or may be specified in the protocol, or may be indicated by the first base station by using signaling, or the like. This is not limited in the present disclosure. Optionally, the values of N1 and N2 may satisfy N1<N2.

In this embodiment of the present disclosure, the control information may be sent once or a plurality of times. If in this embodiment of the present disclosure, the first UE sends the control information to the second UE over the first link, that is, the second UE is a receive end device of the control information, the second UE probably receives control information that is sent a plurality of times. If a plurality of pieces of control information is detected by the second UE within a predefined time segment, and content included in the plurality of pieces of control information (that is, quantities of transmissions of data scheduled and time-frequency resources used for each transmission) is the same, the second UE may determine that the plurality of received pieces of control information indicate a same data transmission.

If the control information is transmitted a plurality of times, the control information may further include indication information of a current quantity of transmissions. Optionally, the control information may include a field indicating the current quantity of transmissions. For example, if a quantity of transmissions of the control information is two, a one-bit field may be used in the control information to indicate the current quantity of transmissions. Specifically, the one-bit field being "0" indicates that a current transmission is the first transmission of the control information, and the one-bit field being "1" indicates that a current transmission is the second transmission of the control information. Correspondingly, for the second UE, control information received by the second UE during either of the two transmissions is valid. If the second UE can receive the control information during both of the two transmissions, and fields indicating a quantity of transmissions are 0 and 1, respectively, and indicated locations of time-frequency resources of data scheduled are exactly the same, it may be considered that a same piece of control information is received during the two transmissions.

Optionally, the control information may include indication information of the quantity of transmissions of the data scheduled based on the control information. The control information may include the indication information of the quantity of transmissions of the data in an explicit or implicit manner. For example, the control information may include a field indicating the quantity of transmissions of the data scheduled based on the control information, for example, a two-bit field is used to indicate one, two, three, or four transmissions.

Optionally, if the quantity of transmissions of the data is N, the control information may include 2*N+1 values, indicating the quantity of transmissions, and time domain resources and frequency domain resources of the N transmissions, respectively.

Optionally, if the quantity of transmissions of the data is more than one, and a same frequency domain resource is used for each transmission of the data, the control information may include the same frequency domain resource and indication information of a plurality of time domain resources that are in a one-to-one correspondence with the more than one transmission of the data. For example, assuming that the quantity of transmissions is N, the control information includes at least 2+N values, indicating the quantity of transmissions, a same frequency domain resource, and N time domain resources, respectively.

Optionally, if the quantity of transmissions of the data is N, the control information may include time-frequency resources used for M of the N transmissions, and indicate, in an explicit manner, time-frequency resources used for the other N–M transmissions. The receive end device of the control information may determine, based on the time-frequency resources used for the M transmissions included in the control information, the time-frequency resources used for the other N–M transmissions. For example, the receive end device of the control information may determine, based on the received control information and a predefined relationship, the time-frequency resources used for the other N–M transmissions, where M<N, and M and N are positive integers.

It should be noted that the foregoing "2*N+1 values" and "2+N values" cannot be simply understood as "2*N+1 numerical values" and "2+N numerical values". For example, a "value" indicating a frequency domain resource for a transmission may include a numeric value of a frequency domain starting location, a numeric value of a frequency domain end location, and the like.

In this embodiment of the present disclosure, when quantities of transmissions are different, transmission manners of the control information may be the same or different.

Optionally, a uniform transmission manner may be used for the control information. In an example, it is assumed that information included in the control information is numTx, t1, f1, t2, and f2.

Figure 5:
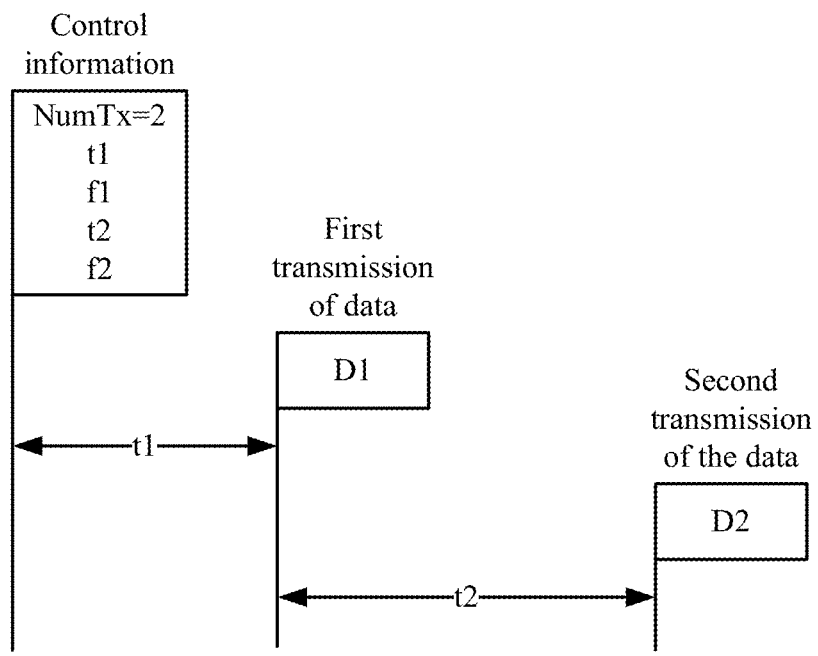
FIG. 5 is a schematic diagram of a control information indication according to an embodiment of the present disclosure.

If numTx=2, t1 and f1 may be used to indicate a time domain location in the first transmission and a frequency domain location in the first transmission, respectively, and t2 and f2 may be used to indicate a time domain location in the second transmission and a frequency domain location in the second transmission, respectively.

t1 may represent an absolute value of the time domain location, or may represent a relative value of the time domain location, for example, a relative value relative to a time domain in which the control information is currently transmitted. As shown in FIG. 5, the time domain location t1 of the data in the first transmission is a relative location relative to a time domain starting location in the control information.

t2 may represent an absolute value of the time domain location, or may represent a relative value of the time domain location, for example, a relative value relative to a time domain in which the control information is currently transmitted, or a relative value relative to a time domain in the first transmission. As shown in FIG. 5, the time domain location t2 of the data in the second transmission is a relative location relative to a time domain starting location of the data in the first transmission.

f1 may represent an absolute value of the frequency domain location, or may represent a relative value of the frequency domain location, for example, a relative value relative to a frequency domain in which the control information is currently transmitted.

f2 may represent an absolute value of the frequency domain location, or may represent a relative value of the frequency domain location, for example, a relative value relative to a frequency domain in which the control information is currently transmitted, or a relative value relative to a frequency domain in the first transmission.

f1 may include a frequency domain starting location and a frequency domain end location occupied during the first transmission of the data, and a location of each PRB occupied during the first transmission of the data. f2 may include a frequency domain starting location and a frequency domain end location occupied during the first transmission of the data, and a location of each PRB occupied during the first transmission of the data.

Figure 6:
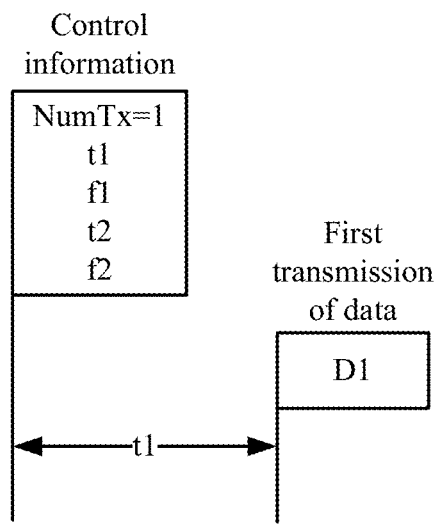
FIG. 6 is another schematic diagram of a control information indication according to an embodiment of the present disclosure.

If numTx=1, t1 and f1 may be used to indicate a time domain location and a frequency domain location in this transmission, respectively. In this case, it may be set as follows: t2=t1 and f2=f1. Alternatively, in this case, t2 and f2 may be set to predefined fixed values, and these predefined fixed values are meaningless values, for example, t2=f2=0. Alternatively, in this case, t2 and f2 may be set as reserved fields. Specifically, for a receiving device that receives the control information, when the receiving device obtains through parsing that numTx=1, the receiving device does not read the t2 and f2 fields. t1 and f1 may be relative values or absolute values. As shown in FIG. 6, t1 represents a relative value.

If numTx=4, t1 and f1 may be used to indicate a time domain location in the $i^{th}$ transmission of four transmissions and a frequency domain location in the $i^{th}$ transmission of the four transmissions, respectively, and t2 and f2 may be used to indicate a time domain location in the $j^{th}$ transmission of the four transmissions and a frequency domain location in the $i^{th}$ transmission of the four transmissions, respectively.

For example, i=1 and j=3. In this case, a time-frequency resource used for the second transmission may be determined based on a function of t1 and f1; or a time-frequency resource used for the second transmission may be determined based on a function of t2 and f2; or a time-frequency resource used for the second transmission may be determined based on a function of t1, f1, t2, and f2. Similarly, a time-frequency resource used for the fourth transmission may be determined based on a function of t1 and f1; or a time-frequency resource used for the fourth transmission may be determined based on a function of t2 and f2; or a time-frequency resource used for the fourth transmission may be determined based on a function of t1, f1, t2, and f2.

Figure 7:
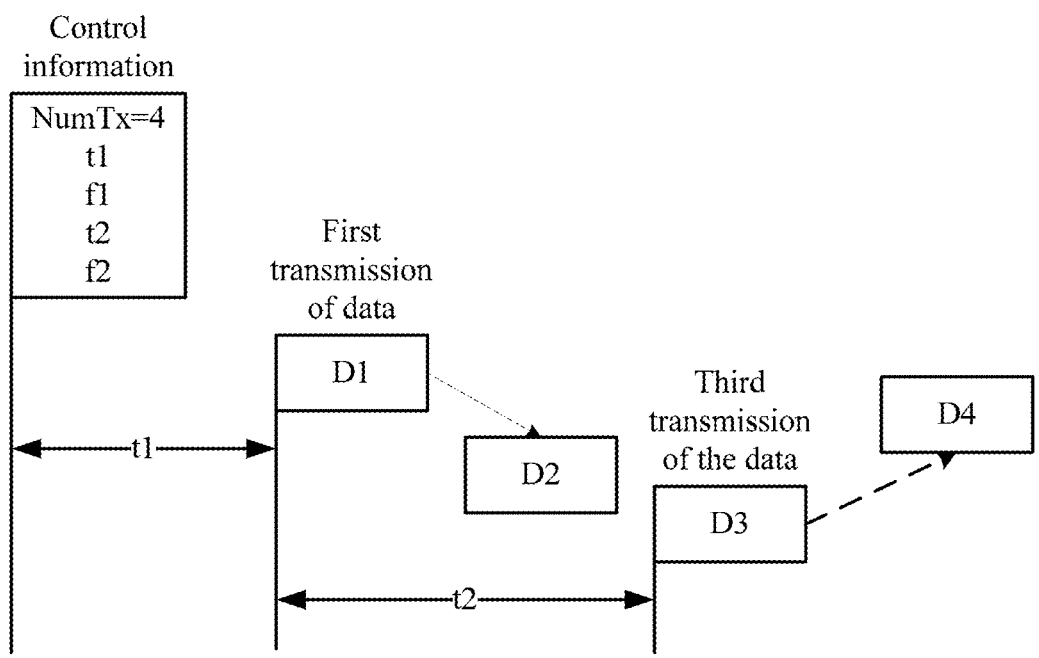
FIG. 7 is another schematic diagram of a control information indication according to an embodiment of the present disclosure.

As shown in FIG. 7, the time-frequency resource used for the second transmission is determined based on a time-frequency resource used for the first transmission, and the time-frequency resource used for the fourth transmission is determined based on a time-frequency resource used for the third transmission.

For example, it may be determined that a time domain location in the second transmission is an adjacent subframe after a time domain location in the first transmission, and it may be determined that a frequency domain location in the second transmission is the same as a frequency domain location in the first transmission. For example, it may be determined that a time domain location in the fourth transmission is an adjacent subframe after a time domain location in the third transmission, and it may be determined that a frequency domain location in the fourth transmission is the same as a frequency domain location in the third transmission.

For example, it may be determined that the time domain location in the second transmission is obtained by shifting the time domain location in the first transmission by a preconfigured first shift value, and it may be determined that the frequency domain location in the second transmission is obtained by shifting the frequency domain location in the first transmission by a preconfigured second shift value. For example, it may be determined that the time domain location in the fourth transmission is obtained by shifting the time domain location in the third transmission by a preconfigured third shift value, and it may be determined that the frequency domain location in the fourth transmission is obtained by shifting the frequency domain location in the third transmission by a preconfigured fourth shift value.

For example, a function may be set to determine that the time domain location in the second transmission is $g1(t1, f1, SA_{ID})$, determine that the frequency domain location in the second transmission is $g2(t1, f1, SA_{ID})$; and determine that the time domain location in the fourth transmission is $g3(t1, f1, SA_{ID})$, and the frequency domain location in the fourth transmission is $g4(t1, f1, SA_{ID})$. $g1$, $g2$, $g3$, and $g4$ are functions, and $SA_{ID}$ represents an ID of the control information.

For ease of understanding, a particular example may be given herein: The time domain location in the second transmission is $(t1+SA_{ID})$ mod A, and the frequency domain location in the second transmission is $(f1+SA_{ID})$ mod B; and the time domain location in the fourth transmission is $(t2+SA_{ID})$ mod A, and the frequency domain location in the fourth transmission is $(f2+SA_{ID})$ mod B. mod represents a modulo operation. A and B are parameters that may be predefined. The predefined parameters A and B may be fixed values, or may be related to a resource pool.

Herein, in this embodiment, a control information uniform transmission manner is used, to ensure indication of time-frequency resources for different quantities of transmissions, and reduce complexity of blind detection by a receiver. Herein, the receiver is the receiving device that receives the control information.

Optionally, for different quantities of transmissions, different transmission manners may be used for the control information. Correspondingly, in this embodiment of the present disclosure, step S102 may include: determining, by the first UE based on the first speed information, a quantity of transmissions of data scheduled based on the control information, and determining the transmission manner of the control information based on the quantity of transmissions of the data.

If the quantity of transmissions is one, the control information may include t1 and f1.

If the quantity of transmissions is two, the control information may include t1, f1, t2, and f2. If f1=f2, when the quantity of transmissions is two, the control information may include f, t1, and t2.

If the quantity of transmissions is four, the control information may include t1, f1, t2, f2, t3, f3, t4, and f4. If f1=f2=f3=f4, when the quantity of transmissions is four, the control information may include f, t1, t2, t3, and t4.

It can be learned that when different transmission manners are used, a location of a time-frequency resource used each time may be indicated by using explicit signaling, ensuring resource scheduling flexibility. Correspondingly, for the receiving device that receives the control information, the time-frequency resource used for each transmission can be obtained rapidly, with no need to perform complex calculation processing.

It should be noted that f, f1-f4, and t1-t4 in the foregoing embodiment may be absolute values or relative values. This is not limited in the present disclosure.

For the second UE that receives the control information, the second UE receives, over the first link, the control information that is sent by the first UE, the second UE may obtain the indication information of the quantity of transmissions of the data scheduled based on the control information, and further, the second UE may obtain the time-frequency resource used for each transmission, from a field corresponding to each transmission in the control information. After this, the second UE may receive, over the first link based on the control information, data that is sent by the first UE.

Optionally, in an example, when the quantity of transmissions of the data is one, a time-frequency resource used for this transmission is obtained from a first field in the control information. When the quantity of transmissions of the data is two, a time-frequency resource used for the first transmission of the two transmissions is obtained from a first field in the control information, and a time-frequency resource used for the second transmission of the two transmissions is obtained from a second field in the control information. When the quantity of transmissions of the data is four, a time-frequency resource used for the first transmission of the four transmissions is obtained from a first field in the control information, a time-frequency resource used for the second transmission of the four transmissions is obtained from a second field in the control information, a time-frequency resource used for the third transmission of the four transmissions is obtained from a third field in the control information, and a time-frequency resource used for the fourth transmission of the four transmissions is obtained from a fourth field in the control information.

Optionally, in another example, the quantity of transmissions of the data is more than one, a same frequency domain resource is used for each transmission of the data, and the control information includes the same frequency domain resource and indication information of a plurality of time domain resources that are in a one-to-one correspondence with the more than one transmission of the data. Correspondingly, the second UE may obtain the same frequency domain resource from a frequency domain field in the control information, and obtain time domain resources used for a plurality of transmissions, fields that are in a one-to-one correspondence with the transmissions.

Optionally, in another example, when the quantity of transmissions of the data is four, time-frequency resources used for two of the four transmissions are obtained from a first field in the control information and a second field in the control information; and time-frequency resources used for the other two of the four transmissions are determined based on the time-frequency resources used for the two of the four transmissions.

For example, the control information may include a time-frequency resource used for the first transmission and a time-frequency resource used for the third transmission. In this case, the second UE may determine, based on the control information and a predefined shift or function, a time-frequency resource used for the second transmission and a time-frequency resource used for the fourth transmission.

As described above, for different quantities of transmissions, transmission manners of the control information may be different. Therefore, the second UE may determine the transmission manner of the control information based on the quantity of transmissions of the data, where the transmission manner is one of at least two predefined transmission manners; and may further obtain a time-frequency resource used for each transmission based on the determined transmission manner.

Further, after step S103, the method may further include: sending, by the first UE, data over the first link.

The data is carried on a service channel (also referred to as a data channel). Specifically, if the first UE is the first type of UE, the data may be carried on a first service channel. If the first UE is the second type of UE, the data may be carried on a second service channel. Herein, the first service channel may be a first PSSCH, and the second service channel may be a second PSSCH.

Specifically, the first UE may send the data over the first link by using a fourth transmission resource.

Optionally, the fourth transmission resource may be selected from a resource pool, and the resource pool may be configured by a base station. Optionally, the fourth transmission resource may be indicated by the control information.

In this embodiment of the present disclosure, a plurality of transmission modes may be defined for the service channel. To transmit the data, one transmission mode may be selected from the plurality of transmission modes.

Figure 8:
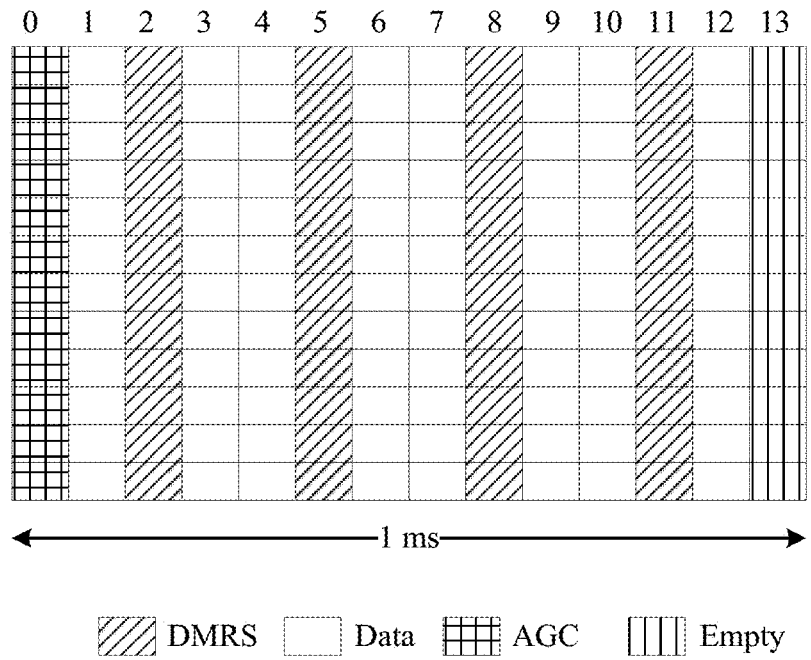
FIG. 8 is a schematic diagram of resources occupied for transmitting data according to an embodiment of the present disclosure.

Optionally, one transmission mode may be shown in FIG. 8, that is, a transmission mode used in the prior art. As shown in FIG. 8, DMRSs are transmitted on symbols whose sequence numbers are 2, 5, 8, and 11, and data is transmitted on symbols whose sequence numbers are 1, 3, 4, 6, 7, 9, 10, and 12. In addition, data is transmitted in each subcarrier of the symbols 1, 3, 4, 6, 7, 9, 10, and 12.

Optionally, in another transmission mode, every K consecutive subcarriers located on a same symbol include a subcarrier used for transmitting the data, where K is a positive integer greater than or equal to 2. For example, K=2.

Figure 9:
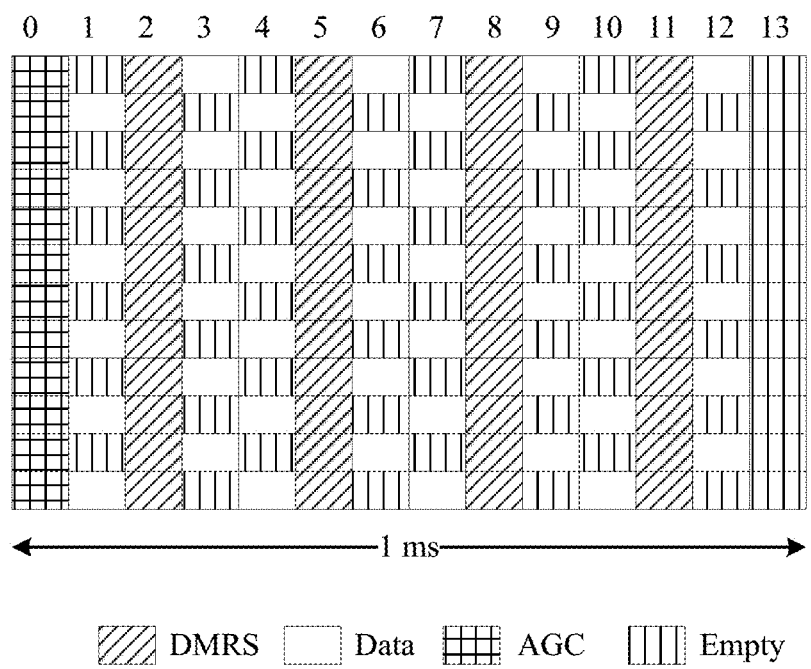
FIG. 9 is another schematic diagram of resources occupied for transmitting data according to an embodiment of the present disclosure.

As shown in FIG. 9, DMRSs are transmitted on symbols 2, 5, 8, and 11. On each of symbols 1, 3, 4, 6, 7, 9, 10, and 12, only one of every two adjacent subcarriers is used for transmitting data. In addition, on two adjacent symbols used for transmitting data (such as symbols 1 and 3, or symbols 3 and 4), subcarriers used for transmitting data stagger.

Figure 10:
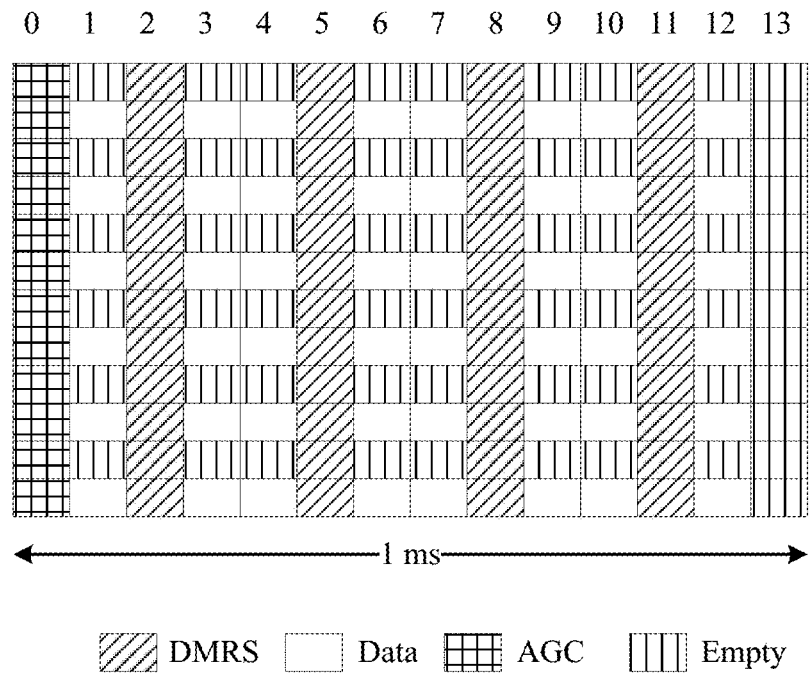
FIG. 10 is another schematic diagram of resources occupied for transmitting data according to an embodiment of the present disclosure.

As shown in FIG. 10, DMRSs are transmitted on symbols 2, 5, 8, and 11. On each of symbols 1, 3, 4, 6, 7, 9, 10, and 12, only one of every two adjacent subcarriers is used for transmitting data. In addition, no symbol of one of any two adjacent subcarriers is used for transmitting data. Alternatively, in other words, on two adjacent symbols used for transmitting data (such as symbols 1 and 3, or symbols 3 and 4), sequence numbers of subcarriers used for transmitting the data are the same.

It can be learned that on data symbols (such as the foregoing symbols 1, 3, 4, 6, 7, 9, 10, and 12), subcarriers for transmitting data may be at an equal spacing. In the embodiments shown in FIG. 9 and FIG. 10, the space is 2. In two adjacent subcarriers that are located on a same data symbol, one subcarrier is used for transmitting data, and the other subcarrier is empty without sending data.

It should be noted that the transmission modes described in FIG. 8 to FIG. 10 are merely several examples of the embodiments of the present disclosure. There may be other transmission modes, which are not enumerated herein.

In this embodiment of the present disclosure, the first UE may use any transmission mode to send the data. Alternatively, when the first UE is the first type of UE, the first UE use the transmission mode shown in FIG. 8 to send the data. When the first UE is the second type of UE, the first UE use the transmission mode shown in FIG. 9 or FIG. 10 to send the data.

Alternatively, before this, the first UE may receive an indication of the first base station, and use a transmission mode according to the indication of the first base station.

For example, if the first base station instructs the first UE to use the transmission mode shown in FIG. 9 to send the data, the first UE uses, according to an indication of the first base station, the transmission mode shown in FIG. 9 to transmit the data. Correspondingly, a receive end of the data (for example, the second UE) may also receive the data in the transmission mode indicated by the indication of the first base station.

Optionally, in this embodiment of the present disclosure, when sending the data, the first UE may add indication information of the transmission mode to the service channel. For example, a two-bit field may be used to indicate a transmission mode to be used. For example, "00" may be used to indicate the transmission mode shown in FIG. 8, "01" may be used to indicate the transmission mode shown in FIG. 9, and "10" may be used to indicate the transmission mode shown in FIG. 10. In this case, the receive end of the data (for example, the second UE) may determine the transmission mode according to the indication, and further receive the data in the transmission mode.

In an embodiment, in this embodiment of the present disclosure, the first UE may send a first sequence together with the data over the first link.

Specifically, the first UE may send the data and the first sequence over the first link by using the fourth transmission resource.

Optionally, the fourth transmission resource may be selected from a resource pool, and the resource pool may be configured by a base station. Optionally, the fourth transmission resource may be indicated by the control information.

The first sequence may be a DMRS sequence shown in FIG. 8 to FIG. 10. The first sequence may be determined by removing a predefined second sequence from a ZC sequence (that is, a Zadoff-Chu sequence) set of a predefined length. The predefined length is a bandwidth occupied by a DMRS, and also is a bandwidth occupied by the data in frequency domain during a single transmission.

Optionally, if the first UE is the first type of UE, the first UE may send the data and the ZC sequence over the first link. If the first UE is the second type of UE, the first UE may send the data and the first sequence over the first link.

It can be learned that a set of sequences used by the second type of UE is less than a set of sequences used by the first type of UE.

It is assumed that a set of first sequences is represented as Z, a set of ZC sequences is represented as Z1, and a set of second sequences is represented as Z0, the following relationship may exist: Z=Z1−Z0. Therefore, the first UE may determine the first sequence from Z.

In an example, in an existing D2D technology, an ID included in a PSCCH may be used to obtain a ZC root sequence number. The set Z1 of ZC sequences may be {0, 1, 2, . . . , 29}, and the set Z0 of second sequences may be {0, 20}, and therefore Z={1, 2, . . . , 19, 21, . . . , 29}. The first sequence may be selected from Z. For example, calculation and selection may be performed based on the ID included in the PSCCH. For example, 21 is selected.

In another example, an existing formula for determining a DMRS sequence number may be directly modified into: $n_{ID}^{SA}$ mod L.

Herein, a value of L is a size of the set Z. As shown in the foregoing example, Z={1, 2, . . . , 19, 21, . . . , 29}, and therefore L=28, and then corresponding root sequences are obtained according to a mapping relationship obtained after removing the sequences in Z0. In the foregoing example, the new mapping relationship may be shown in Table 3.

TABLE 3

| | $n_{ID}^{SA}$ mod L | | | | | | | |
|---|---|---|---|---|---|---|---|---|
| | 0 | 1 | 2 | ... | 18 | 19 | 20 | ... | 27 |
| Root sequence number | 1 | 2 | 3 | ... | 19 | 21 | 22 | ... | 29 |

In this embodiment of the present disclosure, the first UE sends the data to the second UE over the first link. When the first UE is the second type of UE, the first UE may send the data to the second UE over a second link with the assistance of a base station.

Specifically, if serving base stations of the first UE and the second UE are both the first base station, the first UE may send data of the first link to the first base station over the second link. Further, the first base station may send the data to the second UE over the second link.

Before this, the first UE may send resource request information to the first base station, and further the first UE receives indication information of a fifth transmission resource that is sent by the first base station. In this case, the first UE may use the fifth transmission resource to send the data to the first base station over the second link. The resource request information may be a speed-related scheduling request (SR) or buffer status report (BSR). The speed-related information may be: speed indication information included in the SR or the BSR, or speed indication information of the first UE sent together with the SR or the BSR by the first UE. Optionally, the speed indication information may be a specific speed value of the first UE, or may be indication information indicating whether the first UE is in a high speed state. After receiving the speed-related SR or BSR, the first base station may determine that the first UE is high speed UE, and then the first base station may determine a higher priority for the first UE. Further, the first base station allocates an uplink sending resource to the first UE. Herein, the uplink sending resource may be the fifth transmission resource.

Optionally, if the first UE is in a connected mode, the first UE directly sends the speed-related SR or BSR. If the first UE is in an idle mode, the first UE sends the speed-related SR or BSR after entering a connected mode.

Figure 11:
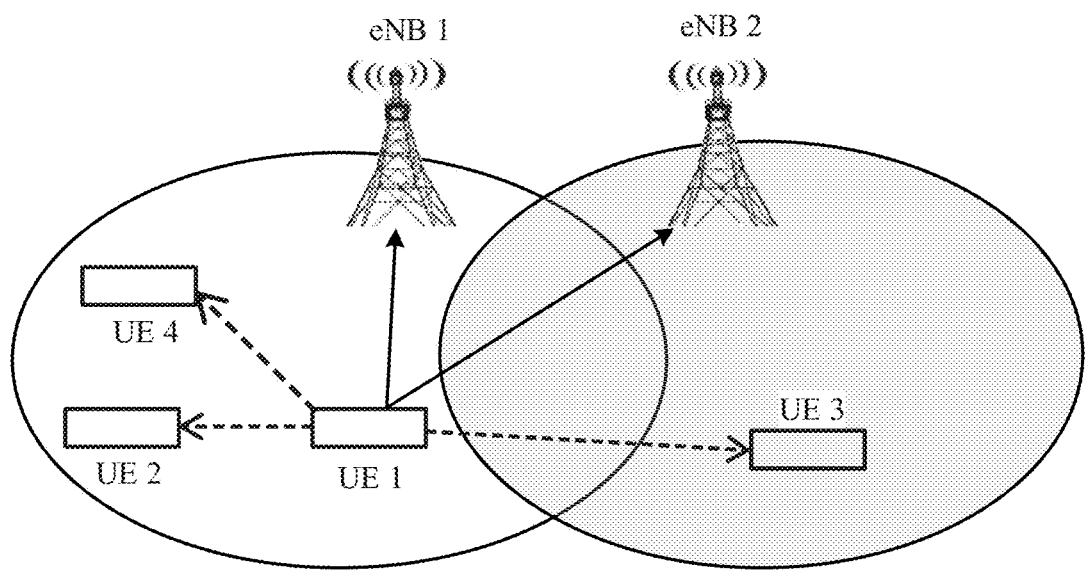
FIG. 11 is another schematic scenario diagram according to an embodiment of the present disclosure.

For example, it is assumed that the first UE is UE 1 in FIG. 11, and the second UE is UE 2 in FIG. 11. Serving base stations of the UE 1 and the UE 2 are both an eNB 1. In this case, the UE 1 may send data to the eNB 1 over a second link between the UE 1 and the eNB 1, and then the eNB 1 sends the data to the UE 2 over a second link between the eNB 1 and the UE 2.

Specifically, if a serving base station of the first UE is the first base station, and a serving base station of the second UE is a second base station, the first UE may send data of the first link to the second base station over the second link. Further, the second base station may send the data to the second UE over the second link.

Before this, the first UE may send resource request information to the second base station, and further the first UE receives indication information of a fifth transmission resource that is sent by the second base station. In this case, the first UE may use the fifth transmission resource to send the data to the second base station over the second link. The resource request information may be a speed-related SR or BSR.

For example, it is assumed that the first UE is UE 1 in FIG. 11, and the second UE is UE 3 in FIG. 11. A serving base station of the UE 1 is an eNB 1, and a serving base station of the UE 3 is an eNB 2. In this case, the UE 1 may send data to the eNB 2 over a second link between the UE 1 and the eNB 2, and then the eNB 2 sends the data to the UE 3 over a second link between the eNB 2 and the UE 3.

Specifically, if a serving base station of the first UE is the first base station, and a serving base station of the second UE is a second base station, the first UE may send data of the first link to the first base station over the second link, and the first base station sends the data to the second base station. Further, the second base station may send the data to the second UE over the second link.

Before this, the first UE may send resource request information to the first base station, and further the first UE receives indication information of a fifth transmission resource that is sent by the first base station. In this case, the first UE may use the fifth transmission resource to send the data to the first base station over the second link. The resource request information may be a speed-related SR or BSR.

For example, it is assumed that the first UE is UE 1 in FIG. 11, and the second UE is UE 3 in FIG. 11. A serving base station of the UE 1 is an eNB 1, and a serving base station of the UE 3 is an eNB 2. In this case, the UE 1 may send data to the eNB 1 over a second link between the UE 1 and the eNB 1, the eNB 1 may send the data to the eNB 2 by using an S1 interface between the eNB 1 and the eNB 2, and then the eNB 2 sends the data to the UE 3 over a second link between the eNB 2 and the UE 3.

In this embodiment of the present disclosure, the first UE sends the data to a plurality of UEs over the first link, for example, the first UE may send the data over the first link in a broadcast manner. When the first UE is the second type of UE, the first UE may send the data to the plurality of UEs over the second link with the assistance of serving base stations of the plurality of UEs.

Specifically, if serving base stations of the first UE and the plurality of UEs are both the first base station, the first UE may send data of the first link to the first base station over the second link. Further, the first base station may send the data to the plurality of UEs over the second link. The first base station may send the data to the plurality of UEs in a broadcast manner or a multicast manner.

Before this, the first UE may send resource request information to the first base station, and further the first UE receives indication information of a fifth transmission resource that is sent by the first base station. In this case, the first UE may use the fifth transmission resource to send the data to the first base station over the second link. The resource request information may be a speed-related SR or BSR. After receiving the speed-related SR or BSR, the first base station may determine that the first UE is high speed UE, and then the first base station may determine a higher priority for the first UE. Further, the first base station allocates an uplink sending resource to the first UE. Herein, the uplink sending resource may be the fifth transmission resource.

For example, it is assumed that the first UE is UE 1 in FIG. 11, and the plurality of UEs are UE 2 and UE 4 in FIG. 11. Serving base stations of the UE 1, the UE 2, and the UE 4 are both an eNB 1. In this case, the UE 1 may send data to the eNB 1 over a second link between the UE 1 and the eNB 1, and then the eNB 1 sends the data to the UE 2 and the UE 4 over a second link. For example, the eNB 1 may send the data to the plurality of UEs over a cellular link in a broadcast manner or a multicast manner.

Specifically, if a serving base station of the first UE is the first base station, and the plurality of UEs are not in a same cell, that is, there are two UEs among the plurality of UEs whose serving base stations are different. The first UE may send data of the first link to serving base stations of the plurality of UEs over the second link. Further, the serving base stations of the plurality of UEs may send the data to corresponding UEs of the plurality of UEs over the second link.

Before this, the first UE may send resource request information to the serving base stations of the plurality of UEs, and further the first UE receives indication information of a fifth transmission resource that is sent by the serving base stations of the plurality of UEs. The fifth transmission resource may be a public uplink transmission resource. In this case, the first UE may use the fifth transmission resource to send the data to the serving base stations of the plurality of UEs over the second link. The resource request information may be sent by using an SR or BSR. Specifically, the resource request information may be a speed-related SR or BSR.

For example, it is assumed that the first UE is UE 1 in FIG. 11, and the plurality of UEs are UE 2 and UE 3 in FIG. 11. Serving base stations of the UE 1 and the UE 4 are both an eNB 1, and a serving base station of the UE 3 is an eNB 2. In this case, the UE 1 may send data to the eNB 1 over a second link between the UE 1 and the eNB 1, and send the data to the eNB 2 over a second link between the UE 1 and the eNB 2; then the eNB 1 sends the data to the UE 4 over a second link between the eNB 1 and the UE 4, and the eNB 2 sends the data to the UE 3 over a second link between the eNB 2 and the UE 3. The UE 1 may use the fifth transmission resource to send the data to both the eNB 1 and the eNB 2.

Optionally, the fifth transmission resource may be a public uplink sending resource allocated to the first UE. For example, a predefined manner may be used to allocate a common uplink sending resource to the first UE, or the eNB 1 may negotiate with the eNB 2 to allocate a common uplink sending resource to the first UE.

Therefore, in this embodiment of the present disclosure, the second link may be used to transmit the data of the first link, to improve transmission reliability and a coverage area for sending data by the first UE (high speed UE).

It can be learned that the first UE may send the control information over the first link, and may send the data over the first link. The control information may be carried on a control channel, and the data may be carried on a service channel.

It should be noted that in this embodiment of the present disclosure, the first UE may use a manner similar to the foregoing control information sending manner to send the data over the first link. For example, the first UE may determine a transmission manner of the data by using a similar method, and then send the data in the determined transmission manner over the first link.

Optionally, the control channel may be a PSCCH (for example, a second PSCCH), and the service channel may be a PSSCH (for example, a PSSCH).

In this embodiment of the present disclosure, the PSCCH and the PSSCH may be transmitted in different subframes, or may be transmitted in a same subframe. That is, in this embodiment of the present disclosure, the control information and the data may be located in different subframes, or the control information and the data may be located in a same subframe.

Optionally, when the control information and the data are located in a same subframe for transmission, a transmit power of the control information and a transmit power of the data may be determined in the following manner.

A first transmit power of the control information and a second transmit power of the data are determined according to an open loop power. It is assumed that the first transmit power of the control information is $P_{PSCCH\_O}$; and the second transmit power of the data is $P_{SSCH\_O}$. The first transmit power and the second transmit power may be expressed as linear values, logarithmic values, or other values. This is not limited in the present disclosure. If a value of the first transmit power of the control information is a linear value, the first transmit power is expressed as $\hat{P}_{PSCCH\_O}$; and if a value of the second transmit power of the data is a linear value, the second transmit power is expressed as $\hat{P}_{PSSCH\_O}$.

Methods for determining the first transmit power and the second transmit power according to the open loop power are:

$$P_{PSCCH\_O} = 10 \log_{10}(M_{PSCCH}) + P_{O\_PSCCH,1} + \alpha_{PSCCH,1} \cdot PL, \text{ and}$$

$$P_{PSCCH\_O} = 10 \log_{10}(M_{PSSCH}) + P_{O\_PSSCH,1} + \alpha_{PSSCH,1} \cdot PL.$$

Herein, the obtained first transmit power $P_{PSCCH\_O}$ and second transmit power $P_{PSSCH\_O}$ may be logarithmic power values.

$M_{PSCCH}$ indicates a transmission bandwidth of the PSCCH, and $M_{PSSCH}$ indicates a transmission bandwidth of the PSSCH. PL indicates a path loss value of the second link between the first UE and the serving base station (for example, the first base station). $\alpha_{PSCCH,1}$ and $\alpha_{PSSCH,1}$ indicate a path loss compensation coefficient of the PSCCH and a path loss compensation coefficient of the PSSCH, respectively. $P_{O\_PSCCH,1}$ and $P_{O\_PSSCH,1}$ are two power values that are configured by the serving base station or predefined.

PL may be determined by the serving base station and then notified to the first UE in a form of signaling, or may be determined by the first UE. For a method for calculating the path loss value, reference may be made to the prior art, and details are not described herein.

$\alpha_{PSCCH,1}$, $\alpha_{PSSCH,1}$, $P_{O\_PSCCH,1}$, and $P_{O\_PSSCH,1}$ may be notified to the first UE by the serving base station in a form of signaling, or may be predefined. For example, before the method shown in FIG. 4, the serving base station may send configuration information, and the configuration information may include values of $\alpha_{PSCCH,1}$, $\alpha_{PSSCH,1}$, $P_{O\_PSCCH,1}$, and $P_{O\_PSSCH,1}$.

In an implementation, if a sum of the first transmit power and the second transmit power is not greater than a maximum transmit power of the first UE over the first link, it may be determined that an actual transmit power of the control information is the first transmit power and an actual transmit power of the data is the second transmit power.

In another implementation, if a sum of the first transmit power and the second transmit power is greater than a maximum transmit power of the first UE over the first link, the first transmit power and the second transmit power may be scaled, so that a sum of the first transmit power and the second transmit power obtained after the scaling is not greater than the maximum transmit power of the first UE over the first link.

In an example, the first transmit power and the second transmit power may be scaled at a same ratio w, and need to meet the following after the scaling:

$$\{w \cdot (\hat{P}_{PSCCH\_O} + \hat{P}_{PSSCH\_O})\} \leq P_{CMAX,c}.$$

Therefore, it may be determined that an actual transmit power of the control information is a value obtained by multiplying the first transmit power by the scaling ratio, that is, $\hat{P}_{PSCCH} = w \cdot P_{PSCCH\_O}$. An actual transmit power of the data is a value obtained by multiplying the second transmit power by the scaling ratio, that is, $\hat{P}_{PSSCH} = w \cdot \hat{P}_{PSSCH\_O}$.

In another example, the first transmit power and the second transmit power may be scaled at different ratios $w_1$ and $w_2$ respectively, and need to meet the following after the scaling:

$$(w_1 \cdot \hat{P}_{PSCCH\_O} + w_2 \cdot \hat{P}_{PSSCH\_O}) \leq P_{CMAX,c}.$$

Therefore, it may be determined that an actual transmit power of the control information is a value obtained by multiplying the first transmit power by the scaling ratio $w_1$, that is, $\hat{P}_{PSCCH} = w_1 \cdot P_{PSCCH\_O}$. An actual transmit power of the data is a value obtained by multiplying the second transmit power by the scaling ratio $w_2$, that is, $\hat{P}_{PSSCH} = w_2 \cdot \hat{P}_{PSSCH\_O}$.

It can be learned that in this embodiment of the present disclosure, in a case in which the control information and the data are located in a same subframe, if it is determined that the sum of the first transmit power of the control channel and the second transmit power of the data channel is greater than the maximum transmit power, a value obtained by multiplying the first transmit power by a first scaling ratio may be used as a first power, and a value obtained by multiplying the second transmit power by a second scaling ratio may be used as a second power, so that a sum of the first power and the second power is not greater than the maximum transmit power. Further, the first power may be used to send the control information over the first link and the second power may be used to send the data channel over the first link.

In another implementation, if the first base station indicates, by using signaling, that the first UE needs to transmit the PSCCH and the PSSCH in a same subframe, or the first UE determines that the PSCCH and the PSSCH need to be transmitted in a same subframe, and a sum of a third transmit power of the PSCCH and a fourth transmit power of the PSSCH is greater than a maximum transmit power of the first UE over the first link, any one of the following manners may be used to allocate transmit powers to the PSCCH and the PSSCH, or to determine transmission manners of the PSCCH and the PSSCH:

Manner 1: The first UE may discard the PSSCH and transmit only the PSCCH in a current subframe.

Manner 2: The first UE may transmit the PSCCH and the PSSCH in different subframes.

Manner 3: The first UE may increase a quantity of transmissions, and during some of a plurality of transmissions, transmit the PSCCH and the PSSCH in a same subframe, and during some of the plurality of transmissions, transmit the PSCCH and the PSSCH in different subframes.

Herein, the third transmit power may be the first transmit power, and the fourth transmit power may be the second transmit power; or the third transmit power and the fourth transmit power may be transmit powers indicated by the first base station, or the third transmit power and the fourth transmit power may be determined by the first UE according to a predefined rule.

The first UE may determine that the quantity of transmissions is N, during M of the N transmissions, the PSCCH and the PSSCH are located in a same subframe, and during the remaining N−M transmissions, the PSCCH and the PSSCH are located in different subframes. During the M transmissions, an actual transmit power of the PSCCH and an actual transmit power of the PSSCH may be first determined, where the PSCCH and the PSSCH are located in a same subframe.

Figure 12:
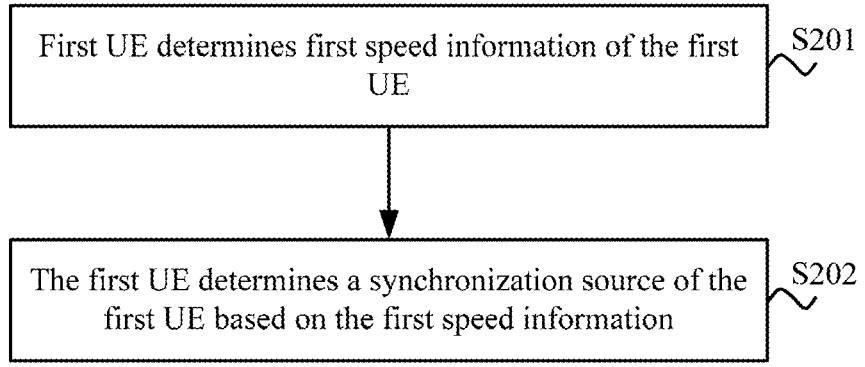
FIG. 12 is a flowchart of an information transmission method according to another embodiment of the present disclosure.

FIG. 12 is a flowchart of an information transmission method according to another embodiment of the present disclosure. The method shown in FIG. 12 includes the following steps.

S201: First UE determines first speed information of the first UE.

In this embodiment of the present disclosure, the first speed information may be used to indicate a speed of the first UE. Optionally, the first speed information may indicate the speed of the first UE in a form of a speed grade. Herein, the speed of the first UE may be an absolute speed, or may be a relative speed relative to another UE or a plurality of other UEs, or may be an acceleration of the first UE relative to the ground or an acceleration relative to another UE or a plurality of other UEs. This is not limited in the present disclosure.

In an embodiment, the first speed information is used to indicate the absolute speed of the first UE.

Optionally, the first UE may obtain the first speed information in a GNSS mode. Alternatively, the first UE may obtain the first speed information by using information indicated by a first base station.

Optionally, if the first UE is a communications module at a physical layer, the first UE may obtain the first speed information based on indication information from another layer.

Optionally, the first UE may determine the first speed information by using a corresponding speed measuring apparatus. For example, if the first UE is an OBU, the first UE may determine the first speed information by using a corresponding module in a car such as an engine module, a gearbox module, or another module that electrically controls a speed. For example, a current speed of the first UE measured is v, and a unit of the speed is km/h or miles/h. This is not limited in the present disclosure.

In another embodiment, the first speed information is used to indicate the relative speed of the first UE relative to the another UE (for example, second UE).

Optionally, the first UE may first determine an absolute speed of the first UE itself (namely, the absolute speed of the first UE), and then obtain speed information and/or location information of the second UE by measuring or parsing a signal or a data packet that is sent from the second UE. The first UE may further determine information about a relative speed of the first UE relative to the second UE based on the information. Herein, the second UE may be one UE, or may be a plurality of different UEs. If the second UE is the plurality of different UEs, the relative speed is a weighted value of speeds relative to the plurality of UEs, for example, an arithmetic weighted average and a geometric weighted average.

Optionally, if the first UE is a communications module at a physical layer, the first UE may obtain the first speed information based on indication information from another layer.

S202: The first UE determines a synchronization source of the first UE based on the first speed information.

If the first UE determines, based on the first speed information, that the first UE is a first type of UE, the first UE may determine the synchronization source according to preconfigured information.

For example, if the preconfigured information indicates that a synchronization source of the first type of UE is a base station, the first UE determines that the synchronization source is the first base station. Optionally, the first base station is a serving base station of the first UE. If the first UE is the first type of UE and the preconfigured information indicates that the synchronization source of the first UE is a base station, the first UE may complete synchronization with the first base station by using a prior-art method, and details are not described herein.

For example, if the preconfigured information indicates that a synchronization source of the first type of UE is a GNSS, the first UE preferentially determines that the synchronization source is the GNSS.

For example, if the preconfigured information indicates that the synchronization source of the first type of UE is an RSU, the first UE determines that the synchronization source is the RSU.

If the first UE determines, based on the first speed information, that the first UE is a second type of UE, the first UE may preferentially determine that the synchronization source is a GNSS. Alternatively, if the first UE determines, based on the first speed information, that the first UE is the first type of UE, and the preconfigured information indicates that the synchronization source is the GNSS, the first UE may preferentially determine that the synchronization source is the GNSS.

That the first UE preferentially determines that the synchronization source is the GNSS may include: If a GNSS signal is detected by the first UE, the first UE uses the GNSS as the synchronization source; if a GNSS signal is not detected by the first UE, the first UE determines that the synchronization source is the first base station or third UE. The first base station is a serving base station of the first UE, and the third UE is UE directly synchronized with the GNSS.

Specifically, if a GNSS signal is detected the first UE, the first UE uses the GNSS as the synchronization source.

Optionally, that a GNSS signal is detected includes: A GNSS signal whose signal strength is greater than or equal to a preset signal strength threshold is detected. In other words, if a valid GNSS signal is detected by the first UE, the first UE uses the GNSS as the synchronization source.

Herein, the valid signal may mean that the signal strength is greater than or equal to the preset signal strength threshold.

Optionally, that a GNSS signal is detected may include: The GNSS signal is detected at a current moment. Alternatively, that a GNSS signal is detected may include: When a GNSS signal is not detected, a timer is started and then the GNSS signal is detected within duration of the timer.

It can be learned that if a GNSS signal is not detected by the first UE, the first UE may re-attempt to detect the GNSS signal within the duration of the timer, so that the first UE can synchronize with the GNSS as much as possible.

If the first UE is the second type of UE, it is assumed that a receive end of a service channel that is transmitted by the first UE is the second UE. If the first UE and the second UE synchronize with two different base stations when the first UE transmits the service channel, when a relative vehicle speed between the first UE and the second UE is 500 km/h, a maximum frequency deviation value between the two UEs over a first link in 5.9 GHz is 7.4 kHz. If the first UE and the second UE synchronize with the GNSS when the first UE transmits the service channel, when a relative vehicle speed between the first UE and the second UE is 500 km/h, a maximum frequency deviation value between the two UEs over a first link in 5.9 GHz is 4.0 kHz. It can be learned that, for signal sending and reception by high speed UE, the high speed UE should be synchronized with the GNSS as much as possible. Therefore, when the first UE is the second type of UE, in this embodiment of the present disclosure, the synchronization source of the first UE is preferentially determined as the GNSS, so that the first UE can synchronize with the GNSS as much as possible. This can minimize frequency deviation of service transmission over the first link, ensure transmission performance of the first link, reduce a packet error rate, and expand coverage.

It should be noted that the timer in this embodiment of the present disclosure may be configured by the first base station, or may be predefined, or may be implemented inside the first UE. For example, the first UE may be locked to the GNSS for a period of time within duration of a timer that is generated based on an internal clock of the first UE. The duration of the timer may be predefined, or may depend on precision of the internal clock of the UE, or may depend on a signaling indication configured by the base station. For example, the duration is 10 minutes or 2 minutes.

Specifically, if a GNSS signal is not detected by the first UE, the first UE may use the first base station or the third UE as the synchronization source. The first base station is a serving base station of the first UE, and the third UE is UE directly synchronized with the GNSS. That is, a synchronization source of the third UE is the GNSS.

That the first UE uses the third UE as the synchronization source may include: The first UE receives a synchronization signal that is sent by the third UE, and performs timing based on the synchronization signal that is sent by the third UE. The synchronization signal that is sent by the third UE may be an SLSS.

Optionally, that a GNSS signal is not detected may include: No GNSS signal is detected, or a GNSS signal whose signal strength is less than the preset signal strength threshold is detected.

Alternatively, that a GNSS signal is not detected may include: When a GNSS signal is not detected, a timer is started and the GNSS signal is still not detected within duration of the timer.

In another understanding, in this embodiment of the present disclosure, if the first UE is the second type of UE, the first UE may determine the synchronization source according to a predefined order of priority.

The predefined order of priority may be: GNSS→first base station→third UE→fourth UE. Alternatively, the predefined order of priority may be: GNSS→third UE→first base station→fourth UE. Herein, the third UE is UE directly synchronized with the GNSS, and the fourth UE is UE not directly synchronized with the GNSS. That is, the synchronization source of the third UE is the GNSS, and a synchronization source of the fourth UE is not the GNSS.

Specifically, if signal quality of an upper priority signal that is received by the first UE does not meet a performance requirement, a device of a next lower priority is used as the synchronization source. Alternatively, if signal quality of an upper priority signal that is received by the first UE does not meet a performance requirement, a timer is started; and if the signal quality still does not meet the performance requirement before the timer expires, a device of a next lower priority is used as the synchronization source after the timer expires.

It can be understood that duration that is set for timers of different priorities may be equal or not equal. This is not limited in the present disclosure. For example, a first timer may be used in a process of synchronizing with the GNSS, a second timer may be used in a process of synchronizing with the first base station, a third timer may be used in a process of synchronizing with the third UE, and a fourth timer may be used in a process of synchronizing with the fourth UE.

If the order of priority is GNSS→first base station→third UE→fourth UE, when a GNSS signal is not detected by the first UE, a process of determining the synchronization source may include the following.

The first UE attempts to use the first base station as the synchronization source. If the attempt of the first UE succeeds, the first UE uses the first base station as the synchronization source; if the attempt of the first UE fails, and a synchronization signal of the third UE is detected by the first UE, the first UE uses the third UE as the synchronization source; and if the attempt of the first UE fails, and a synchronization signal of the third UE is not detected by the first UE, the first UE uses the fourth UE as the synchronization source.

If the order of priority is GNSS→third UE→first base station→fourth UE, when a GNSS signal is not detected by the first UE, a process of determining the synchronization source may include the following.

If a synchronization signal of the third UE is detected by the first UE, the first UE uses the third UE as the synchronization source. If a synchronization signal of the third UE is not detected by the first UE, the first UE attempts to use the first base station as the synchronization source. If the attempt of the first UE succeeds, the first UE uses the first base station as the synchronization source; and if the attempt of the first UE fails, the first UE uses the fourth UE as the synchronization source.

Further, after step S202, the method may include: sending, by the first UE, control information over the first link.

Optionally, in an embodiment, the control information may be used to indicate at least one of the following: a service type, the first speed information, whether the first UE is used as a synchronization source, and an identifier of a synchronization source of the first UE.

For example, the control information may be carried on a third control channel. For example, the third control channel is a PSCCH or a PSBCH. Optionally, the third control channel carrying the control information may be used to indicate at least one of the following: a service type, the first speed information, whether the first UE is used as a synchronization source, and an identifier of a synchronization source of the first UE.

The service may include a security service and a non-security service. Correspondingly, the service type may be a security type or a non-security type. The security service may be, for example, a security service that is used for public safety or intelligent transportation systems (ITS), that is, ITS-safety. The non-security service may be, for example, a non-security service in the ITS, that is, non-ITS-safety, or may be a non-public safety service, that is, a common data transmission service.

For example, the service type may be indicated by using a one-bit field, a predefined CRC mask, a predefined scrambling sequence, a predefined DMRS, a predefined transmission resource, or the like in the third control channel. Specifically, "1" indicated in the one-bit field may be used to indicate the security service, and "0" to indicate the non-security service. Alternatively, specifically, an all-"1" CRC mask may be used to indicate the security service, and an all-"0" CRC mask may be used to indicate the non-security service.

Alternatively, specifically, the predefined DMRS is used to indicate the security service. For example, a DMRS sequence that is sent in the control information is divided into two groups, one group is used to indicate the security service, and the other group is used to indicate the non-security service. The control information may be carried on a PSCCH, or may be carried on the PSBCH. The two groups of DMRSs may be two groups of DMRS sequences having different cyclic shifts, or may be two groups of DMRS sequences having different root sequence numbers, or may be two groups of DMRS sequences having different OCCs.

Alternatively, specifically, different resources are used to indicate the security service. Herein, the resources may be different time domain resources, different frequency domain resources, or different code domain resources, or may be transmission periods or intervals of the third control channel. Different transmission periods and different transmission intervals are corresponding to the security service and the non-security service.

The first speed information may include a speed of the first UE or speed grade information of the first UE.

Whether the first UE may be used as the synchronization source may be explicitly or implicitly indicated.

For example, whether the first UE may be used as the synchronization source may be indicated by using a particular field in the third control channel. Assuming that the particular field is a field A, the field A may be set to 1, which indicates that the first UE may be used as the synchronization source. The field A may be set to 0, which indicates that the first UE cannot be used as the synchronization source.

The identifier of the synchronization source of the first UE may be explicitly or implicitly indicated.

For example, the identifier of the synchronization source of the first UE may be indicated by using another particular field in the third control channel. Optionally, if the synchronization source of the first UE is the GNSS, the another particular field may be set to 1. If the synchronization source of the first UE is not the GNSS, the another particular field may be set to 0. Alternatively, optionally, if the synchronization source of the first UE is the first base station, the identifier of the synchronization source of the first UE is a physical cell identifier of the first base station. If the synchronization source of the first UE is the GNSS, the identifier of the synchronization source of the first UE is a predefined identifier corresponding to the GNSS. If the synchronization source of the first UE is another UE (for example, the third UE or the fourth UE), the identifier of the synchronization source of the first UE is an identifier of the another UE or a synchronization signal identifier of the another UE.

It can be understood that in this embodiment of the present disclosure, the predefined identifier corresponding to the GNSS may be set for the GNSS in advance, and may be, for example, a negative number such as −1; or may be, for example, a value greater than a service set identifier (SSID) of the existing first link such as 336 or 400; or may be, for example, a predefined identifier between 0 and 335. This is not limited in the present disclosure.

Assuming that the another particular field indicating the identifier of the synchronization source of the first UE is a field B, the field B may be set to −1, which indicates that the synchronization source of the first UE is the GNSS.

Further, the method shown in FIG. 12 further includes: sending, by the first UE, a synchronization signal over the first link. The synchronization signal may be an SLSS.

Optionally, the synchronization signal may be used to indicate the service type. The service type may be the security type or the non-security type.

For example, a synchronization signal transmission period or interval may be used to indicate the service type. For example, a period threshold may be set; when the transmission period of the synchronization signal is greater than the period threshold, the service type is the security type; and when the transmission period of the synchronization signal is less than or equal to the period threshold, the service type is the non-security type. For example, an interval threshold may be set; when the transmission interval of the synchronization signal is greater than the interval threshold, the service type is the security type; and when the transmission interval of the synchronization signal is less than or equal to the interval threshold, the service type is the non-security type. This is not limited in the present disclosure.

For example, a combination of different primary synchronization signals may be used to indicate the service type. Alternatively, a combination of different secondary synchronization signals may be used to indicate the service type. Alternatively, a combination of a primary synchronization signal and a secondary synchronization signal may be used to indicate the service type. For example, a combination of different sequences of two primary synchronization signals and/or a combination of different sequences of two different secondary synchronization signals are used to indicate a security service and a non-security service. For example, when the sequences of the two primary synchronization signals are the same, the service is the security service; and when the sequences of the two primary synchronization signals are different, the service is the non-security service. For another example, when the sequences of the two primary synchronization signals are the same, the service is the non-security service; and when the sequences of the two primary synchronization signals are different, the service is the security service. Similarly, an operation the same as that performed on the sequences of the primary synchronization signals may be performed on the sequences of the two secondary synchronization signals, for indication. No enumeration is further provided herein.

Optionally, different primary synchronization signal sequences may be used to respectively indicate a security service and a non-security service, and/or different secondary synchronization signal sequences may be used to respectively indicate a security service and a non-security service.

For example, two groups of primary synchronization signal sequences may be defined; and a first group of primary synchronization signal sequences and a second group of primary synchronization signal sequences are different, and are respectively used to indicate the security service and the non-security service. For example, the first group of primary synchronization signal sequences include Zadoff-Chu sequences whose root sequence numbers are 26 and 37; and the second group of primary synchronization signal sequences include one or more Zadoff-Chu sequences whose root sequence number is not 26 or 37.

For example, two groups of secondary synchronization signal sequences may be defined; and a first group of secondary synchronization signal sequences and a second group of secondary synchronization signal sequences are different, and are respectively used to indicate the security service and the non-security service. For example, a value range of identifiers of the first group of secondary synchronization signal sequences is [0, 83], and a value range of identifiers of the second group of secondary synchronization signal sequences is [84, 167]. For another example, a value range of identifiers of the first group of secondary synchronization signal sequences is [0, 167], and a value range of identifiers of the second group of secondary synchronization signal sequences is [168, 335].

Herein, for the third control channel and the synchronization signal, reference may be made to related descriptions in the embodiment of FIG. 4, and to avoid repetition, details are not described herein again.

Optionally, in another embodiment, the control information may be used to indicate at least one of the following: the first speed information, a current quantity of transmissions of the control information, a quantity of transmissions of data scheduled based on the control information, and a time-frequency resource used for each transmission of the data.

For example, the control information is carried on a first control channel or a second control channel. If the first UE is the first type of UE, the control information is carried on the first control channel. If the first UE is the second type of UE, the control information is carried on the second control channel. Optionally, the control information may include speed indication information of the first UE.

Correspondingly, it can be understood that after this, the first UE may send data over the first link.

In an example, the first UE may send the data over the first link by using a fourth transmission resource. Alternatively, the first UE may send the data and a first sequence over the first link by using a fourth transmission resource. The fourth transmission resource may be indicated by the control information.

For example, when the first UE is the first type of UE, the first UE may send the data and a ZC sequence over the first link. When the first UE is the second type of UE, the first UE may send the data and the first sequence over the first link. For the first sequence, reference may be made to related descriptions in the foregoing embodiment, and to avoid repetition, details are not described herein again.

Optionally, the control information transmitted by the first UE over the first link and the data transmitted by the first UE over the first link may be located in different subframes, or the control information and the data may be located in a same subframe.

Optionally, if the control information and the data are located in a same subframe, after this method, the method may include: sending, by the first UE, the control information and the data over the first link.

Specifically, this may specifically include:

determining a first transmit power of the control information and a second transmit power of the data;

if a sum of the first transmit power and the second transmit power is greater than a maximum transmit power, using a value obtained by multiplying the first transmit power by a first scaling value as a first power, and using a value obtained by multiplying the second transmit power by a second scaling value as a second power, so that a sum of the first power and the second power is less than or equal to the maximum transmit power; and sending the control information over the first link by using the first power and sending the data over the first link by using the second power, where the first scaling value and the second scaling value are equal or not equal.

In another implementation, if the first base station indicates, by using signaling, that the first UE needs to transmit the PSCCH and a PSSCH in a same subframe, or the first UE determines that the PSCCH and a PSSCH need to be transmitted in a same subframe, and a sum of a third transmit power of the PSCCH and a fourth transmit power of the PSSCH is greater than a maximum transmit power of the first UE over the first link, any one of the following manners may be used to allocate transmit powers to the PSCCH and the PSSCH, or to determine transmission manners of the PSCCH and the PSSCH:

Manner 1: The first UE may discard the PSSCH and transmit only the PSCCH in a current subframe.

Manner 2: The first UE may transmit the PSCCH and the PSSCH in different subframes.

Manner 3: The first UE may increase a quantity of transmissions, and during some of a plurality of transmissions, transmit the PSCCH and the PSSCH in a same subframe, and during some of the plurality of transmissions, transmit the PSCCH and the PSSCH in different subframes.

Herein, the third transmit power may be the first transmit power, and the fourth transmit power may be the second transmit power; or the third transmit power and the fourth transmit power may be transmit powers indicated by the first base station, or the third transmit power and the fourth transmit power may be determined by the first UE according to a predefined rule.

Herein, for the control information and the data, reference may be made to related descriptions in the embodiment of FIG. 4, and to avoid repetition, details are not described herein again.

Figure 13:
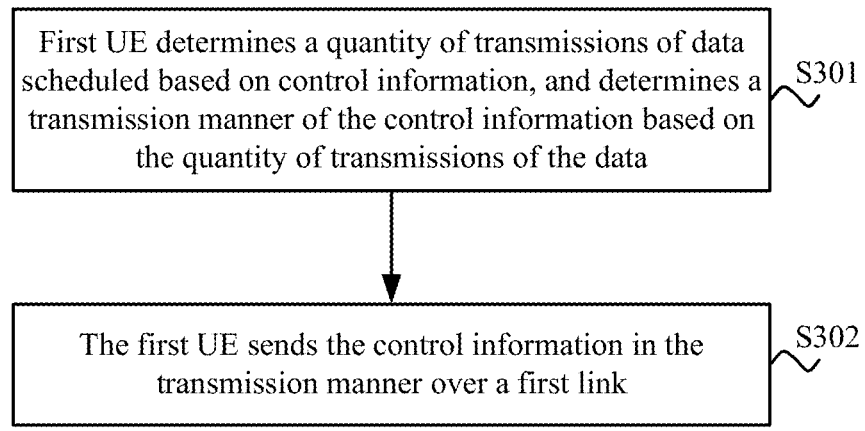
FIG. 13 is a flowchart of an information transmission method according to another embodiment of the present disclosure.

FIG. 13 is a flowchart of an information transmission method according to another embodiment of the present disclosure. The method shown in FIG. 13 includes the following steps.

S301: First UE determines a quantity of transmissions of data scheduled based on control information, and determines a transmission manner of the control information based on the quantity of transmissions of the data.

The first UE may use at least one of the following methods to determine the quantity of transmissions of the data scheduled based on the control information: The first UE determines the quantity of transmissions of the data based on speed information of the first UE; the first UE determines the quantity of transmissions of the data according to information indicated by a base station; the first UE determines the quantity of transmissions of the data according to predefined information; the first UE determines the quantity of transmissions of the data based on a transmission condition; and the first UE determines the quantity of transmissions of the data based on characteristics of a service.

Optionally, in step S301, the first UE may determine, based on first speed information of the first UE, the quantity of transmissions of the data scheduled based on the control information, and determine the transmission manner of the control information based on the quantity of transmissions of the data.

In this embodiment of the present disclosure, the first speed information may be used to indicate the speed of the first UE. Herein, the speed information includes an absolute speed, a relative speed, and an acceleration. For a method for determining, by the first UE, the first speed information, reference may be made to descriptions in steps S101 and S201 in the foregoing embodiments of the present disclosure, and details are not described herein again.

In this embodiment of the present disclosure, the quantity of transmissions of the data may be predefined. For example, the quantity of transmissions of the data is preconfigured on the first UE, or a quantity of transmissions of data of high speed UE is pre-specified in a protocol. Alternatively, the quantity of transmissions of the data may be obtained by the first UE from information that is sent by a serving base station of second UE. Alternatively, the quantity of transmissions of the data is determined by the first UE based on at least one of the following information: the first speed information of the first UE, and geographical location information of the first UE and/or the second UE. This is not limited in the present disclosure.

Optionally, in an embodiment, the first UE may determine the quantity of transmissions of the data based on the first speed information of the first UE. For example, if the first UE determines that the first UE is a first type of UE, the first UE may determine that the quantity of transmissions of the data is N1; and if the first UE determines that the first UE is a second type of UE, the first UE may determine that the quantity of transmissions of the data is N2. Values of N1 and N2 may be preconfigured, or may be specified in the protocol, or may be indicated by a first base station by using signaling, or the like. This is not limited in the present disclosure. Optionally, the values of N1 and N2 may satisfy N1<N2.

Optionally, the first UE determines the quantity of transmissions of the data according to the information indicated by the base station, and specifically, the base station indicates the quantity of transmissions of the data to the first UE by using signaling. For example, the base station indicates the quantity of transmissions of the data by using DCI signaling, an RRC message, and a SIB message. Specifically, when the RRC message or the SIB message is used for indication, the base station may indicate the quantity of transmissions by using a parameter related to a resource pool. In this method, the base station controls a quantity of data transmissions performed by the first UE, and the base station controls transmission resources and efficiency depending on a network status, so as to ensure transmission performance and efficiency of an entire system.

Optionally, the first UE determines the quantity of transmissions of the data according to the predefined information. Similar to that the quantity of transmissions of the data is determined based on the information indicated by the base station, when the first UE is outside network coverage, the quantity of transmissions of the data is indicated by the predefined information. The predefined information is preconfigured in UE. When the UE accesses a network, the predefined information may also be updated via the network.

Optionally, the first UE determines the quantity of transmissions of the data based on the transmission condition. The transmission condition includes: signal quality of data that is received by the first UE, channel quality detected by the first UE, an energy of an interference signal that is measured by the first UE in a resource pool used for transmitting data, and an energy for sending a signal by another UE that is detected by the first UE in the resource pool used for transmitting data. Generally, poorer signal quality indicates a larger quantity of transmissions. Alternatively, when the energy of the interference signal that is measured by the first UE in the resource pool used for transmitting data is higher, the quantity of transmissions is smaller, to reduce further mutual interference between UEs.

Optionally, the first UE determines the quantity of transmissions of the data based on the characteristics of the service. Herein, the characteristics of the service include: whether UE is a security service or a non-security service; a Quality of Service QoS requirement for a UE transmitted service; a priority of the UE transmitted service; and the like. When a service transmitted by the UE is a security service, the QoS requirement is higher, the priority is higher, and the quantity of transmissions performed is larger, to meet a requirement of transmission characteristics of the service.

Optionally, for different quantities of transmissions, transmission manners of the control information may be the same or different.

For example, when quantities of transmissions of the data are different, valid fields in the control information are different.

Optionally, the control information may further include indication information of a current quantity of transmissions of the control information, and/or include the first speed information of the first UE.

Optionally, the control information may include a field indicating the current quantity of transmissions. For example, if a quantity of transmissions of the control information is two, a one-bit field may be used in the control information to indicate the current quantity of transmissions. Specifically, the one-bit field being "0" indicates that a current transmission is the first transmission of the control information, and the one-bit field being "1" indicates that a current transmission is the second transmission of the control information.

Optionally, the control information may include a field indicating speed information of the first UE. For example, a one-bit field may be used in the control information to indicate the speed information of the first UE. Specifically, the one-bit field being "0" indicates that a speed of the first UE is less than a preset speed threshold, that is, the first UE is the first type of UE, and the one-bit field being "1" indicates that a speed of the first UE is greater than or equal to a preset speed threshold, that is, the first UE is the second type of UE.

Optionally, the control information may include indication information of the quantity of transmissions of the data scheduled based on the control information. The control information may include the indication information of the quantity of transmissions of the data in an explicit or implicit manner. For example, the control information may include a field indicating the quantity of transmissions of the data scheduled based on the control information, for example, a two-bit field is used to indicate one, two, three, or four transmissions.

Optionally, the control information may be carried on a control channel, and the control channel is a PSCCH.

Optionally, the quantity of transmissions of the data may be indicated by the control channel in an explicit or implicit manner. For example, the quantity of transmissions of the data may be indicated by particular indication information of the control channel. The particular indication information may be predefined, for example, may be specified in a protocol, or indicated by a base station by using signaling, or indicated in the control information, or indicated implicitly by using the control channel. This is not limited in the present disclosure. Indicating the quantity of transmissions of the data implicitly by using the control channel is, for example, indicating the quantity of transmissions of the data by using a CRC mask, a scrambling sequence of the control channel, a demodulation reference signal used by the control channel, a size of a physical resource occupied for transmitting the control channel, and a time-frequency resource occupied by the control channel (for example, different resource sets are used for different quantities of data transmissions).

In this embodiment of the present disclosure, for different quantities of transmissions of the data, transmission manners of the control information may be the same or different. For example, when quantities of transmissions of the data are different, valid fields in the control information are different.

In an example, when the quantity of transmissions of the data is four, a first field in the control information and a second field in the control information include time-frequency resources used for two of the four transmissions.

In another example, a same frequency domain resource is used for each transmission of the data. The control information includes the same frequency domain resource and indication information of a plurality of time domain resources that are in a one-to-one correspondence with the transmissions of the data.

In another example, the quantity of transmissions of the data is N, and the control information includes time-frequency resources used for M of the N transmissions, so that a receive end of the control information determines, based on the time-frequency resources used for the M transmissions that are included in the control information, time-frequency resources used for the N transmissions, where M<N, and M and N are positive integers.

Still further, for indication information of a time-frequency resource used for each transmission, reference may be made to related descriptions in FIG. 5 to FIG. 7, and to avoid repetition, details are not described herein again.

S302: The first UE sends the control information in the transmission manner over a first link.

Optionally, the control information in this embodiment of the present disclosure may further include the current quantity of transmissions of the control information, and/or may further include the first speed information of the first UE.

Optionally, the method may further include: sending, by the first UE, data over the first link. The data is the data scheduled based on the control information.

Alternatively, optionally, the method may include: sending, by the first UE, data and a first sequence over the first link. For the first sequence, reference may be made to related descriptions in the foregoing embodiment, and details are not described herein again.

Optionally, the control information is carried on a control channel, and the data is carried on a data channel (or referred to as a service channel). The control channel may be a PSCCH, and the data channel may be a PSSCH.

The control information and the data in this embodiment of the present disclosure may be located in different subframes, or the control information and the data in this embodiment of the present disclosure may be located in a same subframe.

Optionally, if the control information and the data are located in a same subframe, in step S302, the first UE sends the control information and the data over the first link in the transmission manner.

Further, that the first UE sends the control information and the data over the first link may include:

determining a first transmit power of the control information and a second transmit power of the data;

if a sum of the first transmit power and the second transmit power is greater than a maximum transmit power, using a value obtained by multiplying the first transmit power by a first scaling value as a first power, and using a value obtained by multiplying the second transmit power by a second scaling value as a second power, so that a sum of the first power and the second power is less than or equal to the maximum transmit power; and sending the control information over the first link by using the first power and sending the data over the first link by using the second power, where the first scaling value and the second scaling value are equal or not equal.

The first transmit power and the second transmit power may be determined by using an open loop power-based method. For details, reference may be made to the method for determining the first transmit power and the second transmit power in the foregoing embodiment, and to avoid repetition, details are not described herein again.

The transmission manner in this embodiment of the present disclosure may include at least one of the following: a transmission resource used by the control information; a cyclic redundancy check CRC mask of the control information; a scrambling sequence of the control information; a demodulation reference signal used by a control channel carrying the control information; a size of a physical resource occupied for transmitting the control information; a modulation and coding scheme MCS used by the control information; and a quantity of transmissions of the control information.

Figure 14:
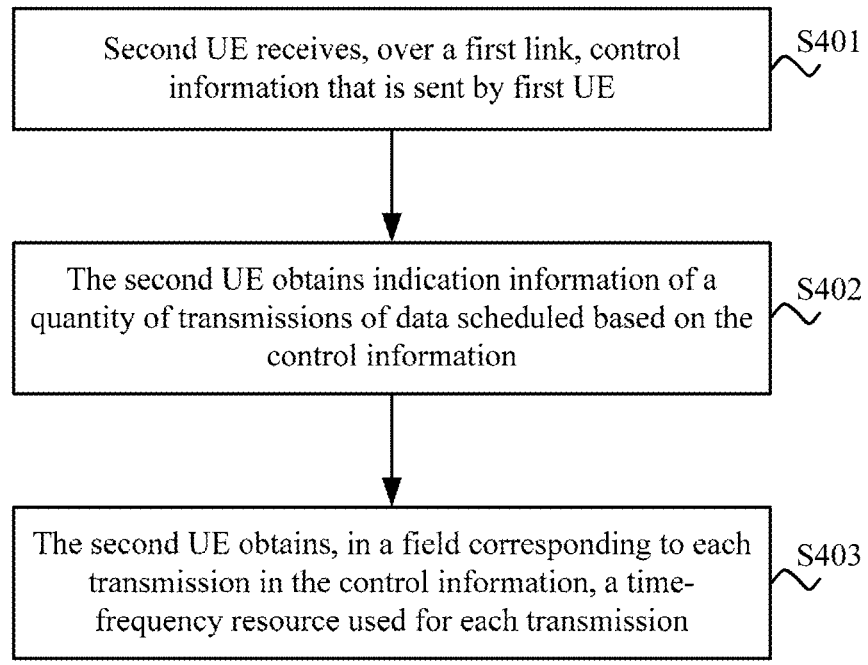
FIG. 14 is a flowchart of an information transmission method according to another embodiment of the present disclosure.

FIG. 14 is a flowchart of an information transmission method according to another embodiment of the present disclosure. The method shown in FIG. 14 includes the following steps.

S401: Second UE receives, over a first link, control information that is sent by first UE.

Specifically, the control information includes a quantity of transmissions of data scheduled based on the control information and indication information of a time-frequency resource used for each transmission.

In this embodiment of the present disclosure, the quantity of transmissions of the data may be predefined. For example, the quantity of transmissions of the data is preconfigured on the first UE, or a quantity of transmissions of data of high speed UE is pre-specified in a protocol. Alternatively, the quantity of transmissions of the data may be obtained by the first UE from information that is sent by a serving base station of the second UE. Alternatively, the quantity of transmissions of the data is determined by the first UE based on at least one of the following information: first speed information of the first UE, geographical location information of the first UE and/or the second UE, signal quality of the first UE, signal quality of data and/or a signal that is sent by the second UE, and the like. This is not limited in the present disclosure.

Optionally, the control information may include indication information of a current quantity of transmissions of the control information, and/or the control information may include speed indication information of the first UE.

Optionally, the control information may include a field indicating the current quantity of transmissions. For example, if a quantity of transmissions of the control information is two, a one-bit field may be used in the control information to indicate the current quantity of transmissions. Specifically, the one-bit field being "0" indicates that a current transmission is the first transmission of the control information, and the one-bit field being "1" indicates that a current transmission is the second transmission of the control information. Correspondingly, for the second UE, control information received by the second UE during either of the two transmissions is valid. If the second UE can receive the control information during both of the two transmissions, and fields indicating a quantity of transmissions are 0 and 1, respectively, and indicated locations of time-frequency resources of data scheduled are exactly the same, it may be considered that a same piece of control information is received during the two transmissions.

Optionally, the control information may include a field indicating speed information of the first UE. For example, a one-bit field may be used in the control information to indicate the speed information of the first UE. Specifically, the one-bit field being "0" indicates that a speed of the first UE is less than a preset speed threshold, that is, the first UE is a first type of UE, and the one-bit field being "1" indicates that a speed of the first UE is greater than or equal to a preset speed threshold, that is, the first UE is a second type of UE.

Optionally, the control information may include indication information of the quantity of transmissions of the data scheduled based on the control information. The control information may include the indication information of the quantity of transmissions of the data in an explicit or implicit manner. For example, the control information may include a field indicating the quantity of transmissions of the data scheduled based on the control information, for example, a two-bit field is used to indicate one, two, three, or four transmissions.

The control information in this embodiment of the present disclosure may be carried on a control channel. Optionally, the control channel may be a PSCCH.

S402: The second UE obtains indication information of a quantity of transmissions of data scheduled based on the control information.

The second UE may obtain the quantity of transmissions of the data in an explicit or implicit manner. For example, the second UE may obtain the quantity of transmissions of the data from particular indication information. The particular indication information may be predefined, for example, may be specified in a protocol, or indicated by a base station by using signaling, or indicated in the control information, or indicated implicitly by using the control channel carrying the control information. This is not limited in the present disclosure. Indicating the quantity of transmissions of the data implicitly by using the control channel carrying the control information is, for example, indicating the quantity of transmissions of the data by using a CRC mask, a scrambling sequence of the control channel, a demodulation reference signal used by the control channel, a size of a physical resource occupied for transmitting the control channel, and a time-frequency resource occupied by the control channel (for example, different resource sets are used for different quantities of data transmissions).

S403: The second UE obtains, in a field corresponding to each transmission in the control information, a time-frequency resource used for each transmission.

Optionally, if the quantity of transmissions of the data is more than one, a same frequency domain resource is used for each transmission of the data, and the control information may include the same frequency domain resource and indication information of a plurality of time domain resources that are in a one-to-one correspondence with the more than one transmission of the data. Correspondingly, the second UE may obtain the same frequency domain resource from the control information, and obtain time domain resources used for a plurality of transmissions, fields that are in a one-to-one correspondence with the transmissions.

Optionally, in an example, when the quantity of transmissions of the data is one, a time-frequency resource used for this transmission is obtained from a first field in the control information. When the quantity of transmissions of the data is two, a time-frequency resource used for the first transmission of the two transmissions is obtained from a first field in the control information, and a time-frequency resource used for the second transmission of the two transmissions is obtained from a second field in the control information. When the quantity of transmissions of the data is four, a time-frequency resource used for the first transmission of the four transmissions is obtained from a first field in the control information, a time-frequency resource used for the second transmission of the four transmissions is obtained from a second field in the control information, a time-frequency resource used for the third transmission of the four transmissions is obtained from a third field in the control information, and a time-frequency resource used for the fourth transmission of the four transmissions is obtained from a fourth field in the control information.

Optionally, in another example, when the quantity of transmissions of the data is four, time-frequency resources used for two of the four transmissions are obtained from a first field in the control information and a second field in the control information; and time-frequency resources used for the other two of the four transmissions are determined based on the time-frequency resources used for the two of the four transmissions. For example, a frequency domain resource used for the second transmission is the same as a frequency domain resource used for the first transmission, and a time domain resource used for the second transmission and a time domain resource used for the first transmission are adjacent in subframe or spaced by a predefined value. A frequency domain resource used for the fourth transmission is the same as a frequency domain resource used for the third transmission, and a time domain resource used for the fourth transmission and a time domain resource used for the third transmission are adjacent in subframe or spaced by a predefined value. The control information indicates only the time frequency resources used for the first transmission and the third transmission, and the time frequency resources used for the second transmission and the fourth transmission may be obtained in the predefined manner.

Optionally, in another example, when the quantity of transmissions of the data is N, time-frequency resources used for M of the N transmissions are obtained from a particular location in the control information, and time-frequency resources used for the N transmissions are further determined based on the time-frequency resources used for the M transmissions that are included in the control information where M<N, and M and N are positive integers. For example, time-frequency resources used for the remaining N−M transmissions may be determined according to a predefined method based on the time-frequency resources used for the M transmissions.

In this embodiment of the present disclosure, when quantities of transmissions of the data are different, transmission manners of the control information may be the same or different.

Optionally, a uniform transmission manner of the control information may be used. In this case, in step S403, the second UE may obtain, in the uniform transmission manner from the corresponding field in the control information, the time-frequency resource used for each transmission. In this embodiment, the uniform transmission manner of the control information is used, to ensure indication of time-frequency resources used for different quantities of transmissions, and reduce complexity of blind detection by the second UE.

Optionally, for different quantities of transmissions, different transmission manners may be used for the control information. That is, for different quantities of transmissions, transmission manners of the control channel carrying the control information are different.

In this case, step S403 may include: determining, by the second UE, a transmission manner of the control information based on the quantity of transmissions of the data, where the transmission manner is one of at least two predefined transmission manners, and obtaining, based on the transmission manner, the time-frequency resource used for each transmission.

If the quantity of transmissions is one, the control information may include t1 and f1.

If the quantity of transmissions is two, the control information may include t1, f1, t2, and f2. If f1=f2, when the quantity of transmissions is two, the control information may include f, t1, and t2.

If the quantity of transmissions is four, the control information may include t1, f1, t2, f2, t3, f3, t4, and f4. If f1=f2=f3=f4, when the quantity of transmissions is four, the control information may include f, t1, t2, t3, and t4.

It can be learned that when different transmission manners are used for different quantities of transmissions of the data, a location of a time-frequency resource used for each transmission may be indicated by using explicit signaling, to ensure flexibility of resource scheduling. Correspondingly, for the second UE, the time-frequency resource used for each transmission can be obtained rapidly, with no need to perform complex calculation processing.

It can be learned that the second UE only needs to detect control information of a transmission manner corresponding to a quantity of transmissions of the data, and does not need to detect control information corresponding to another transmission manner. This reduces complexity of detection. In addition, different transmission manners are designed for different quantities of transmissions of the data, to ensure transmission resource utilization of the control information, and improve resource usage efficiency during transmission.

It should be noted that f, f1-f4, and t1-t4 in the foregoing embodiment may be absolute values or relative values. This is not limited in the present disclosure.

The transmission manner may include at least one of the following: a transmission resource used by the control information; a cyclic redundancy check CRC mask of the control information; a scrambling sequence of the control information; a demodulation reference signal used by the control channel carrying the control information; a size of a physical resource occupied for transmitting the control information; a modulation and coding scheme MCS used by the control information; and a quantity of transmissions of the control information.

For the transmission manner of the control information, reference may be made to related descriptions in the embodiment of FIG. 4, and to avoid repetition, details are not described herein again.

Optionally, after step S403, the method may further include: receiving, by the second UE over the first link based on the control information, data that is sent by the first UE.

Specifically, the second UE may receive, over the first link by using the transmission resource indicated by the control information, the data that is sent by the first UE.

Alternatively, optionally, after step S403, the method may further include: receiving, by the second UE over the first link based on the control information, data and a first sequence that are sent by the first UE.

In an example, when the first UE is the first type of UE, the second UE receives, over the first link based on the control information, the data and a ZC sequence that are sent by the first UE. When the first UE is the second type of UE, the second UE receives, over the first link based on the control information, the data and the first sequence that are sent by the first UE. For the first sequence, reference may be made to related descriptions in the foregoing embodiment, and to avoid repetition, details are not described herein again.

Optionally, the data may be carried on a service channel. For example, the service channel is a PSSCH.

Figure 15:
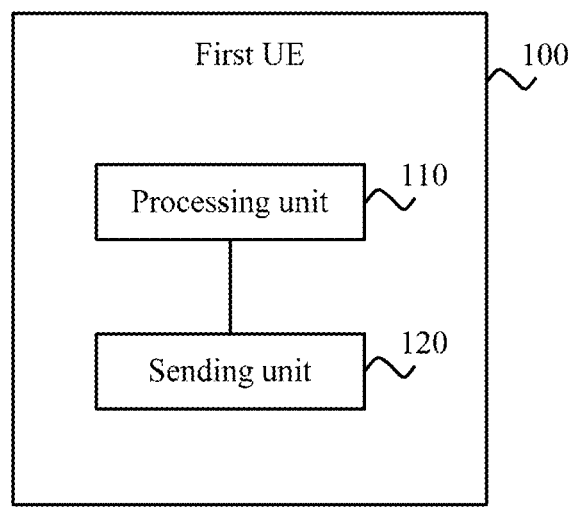
FIG. 15 is a structural block diagram of user equipment according to an embodiment of the present disclosure.

FIG. 15 is a structural block diagram of user equipment according to an embodiment of the present disclosure. The UE shown in FIG. 15 is first UE 100, including a processing unit 110 and a sending unit 120.

The processing unit 110 is configured to determine first speed information of the first UE.

The processing unit 110 is further configured to determine a transmission manner of control information based on the first speed information.

The sending unit 120 is configured to send, over a first link, the control information in the transmission manner determined by the processing unit 110.

In this embodiment of the present disclosure, the first speed information may be used to indicate a speed of the first UE 100. Optionally, the first speed information may indicate the speed of the first UE 100 in a form of a speed grade. Herein, the speed of the first UE 100 may be an absolute speed, or may be a relative speed relative to another UE or a plurality of other UEs, or may be an acceleration of the first UE relative to the ground or an acceleration relative to another UE or a plurality of other UEs. This is not limited in the present disclosure.

Optionally, if the first UE 100 is a communications module at a physical layer, the processor unit 110 may determine the first speed information based on indication information from another layer.

If the first speed information is used to indicate an absolute speed of the first UE 100, the processing unit 110 may obtain the first speed information in a GNSS mode. Alternatively, the processing unit 110 may obtain the first speed information by using information indicated by a first base station. Optionally, the first UE 100 may obtain the first speed information by using a corresponding speed measuring apparatus. For example, if the first UE 100 is an OBU, the processing unit 110 may obtain the first speed information by using a corresponding module in a car such as an engine module, a gearbox module, or another module that electrically controls a speed. For example, a current speed of the first UE measured is v, and a unit of the speed may be km/h or may be miles/h.

If the first speed information is used to indicate the relative speed of the first UE 100 relative to the another UE (for example, second UE), optionally, the processing unit 110 may first determine an absolute speed of the first UE 100, and then determine speed information and/or location information of the second UE by measuring or parsing a data packet that is sent from the second UE. The processing unit 110 may further determine information about the relative speed of the first UE 100 relative to the second UE based on the information. Herein, the second UE may be one UE, or may be a plurality of different UEs. If the second UE is the plurality of different UEs, the relative speed is a weighted value of speeds relative to the plurality of UEs, for example, an arithmetic weighted average and a geometric weighted average.

In this embodiment of the present disclosure, the transmission manner may include at least one of the following: a transmission resource used by the control information; a cyclic redundancy check CRC mask of the control information; a scrambling sequence of the control information; a demodulation reference signal used by a control channel carrying the control information; a size of a physical resource occupied for transmitting the control information; a modulation and coding scheme MCS used by the control information; and a quantity of transmissions of the control information.

Optionally, in an embodiment, if it is determined, based on the first speed information, that the first UE 100 is a first type of UE, the processing unit 110 may determine that the transmission manner is a first transmission manner; and if it is determined, based on the first speed information, that the first UE 100 is a second type of UE, the processing unit 110 may determine that the transmission manner is a second transmission manner. The first type of UE may be non-high speed UE, and the second type of UE may be high speed UE.

Optionally, in an example, the first transmission manner includes a first transmission resource, and the second transmission manner includes a second transmission resource. The first transmission resource may be from a first resource set or from a first resource subset of a first resource set, and the second transmission resource may be from a second resource set or from a second resource subset of a second resource set.

In this embodiment of the present disclosure, the first UE 100 may further include a receiving unit.

In an example, the receiving unit may be configured to obtain the first resource set and the second resource set. The first resource set and the second resource set may be predefined, for example, may be specified in a protocol.

In another example, the receiving unit may be configured to receive, over a second link, first indication information sent by the first base station, where the first indication information is used to indicate the first resource set and the second resource set.

Optionally, the sending unit 120 may be configured to send the first speed information to the first base station over the second link, where the first speed information includes the speed of the first UE 100 or speed grade information of the first UE 100. Further, the processing unit 110 may receive, over the second link, the first indication information sent by the first base station. That is, the first indication information may be indicated by the first base station after receiving the first speed information.

Optionally, the first indication information may be further used to indicate a location of the first resource subset in the first resource set, and/or used to indicate a location of the second resource subset in the second resource set.

The sending unit 120 may be specifically configured to: periodically send the first speed information to the first base station over the second link; or when the speed of the first UE 100 changes, send the first speed information to the first base station over the second link; or after the receiving unit receives, from the first base station, an instruction of reporting speed information of the first UE 100, send the first speed information to the first base station over the second link.

Optionally, the first resource set and the second resource set are a same resource set; or the second resource set is a subset of the first resource set.

Correspondingly, the processing unit 110 may be specifically configured to: if it is determined, based on the first speed information, that the first UE 100 is the first type of UE, determine the first transmission resource from the first resource set or from the first resource subset of the first resource set, where the first resource subset is predefined or preconfigured; or if it is determined, based on the first speed information, that the first UE 100 is the second type of UE, determine the second transmission resource from the second resource set or from the second resource subset of the second resource set, where the first resource subset is predefined or preconfigured.

Optionally, in an implementation, the control information is used to indicate a service type, and the service type is a security type or a non-security type.

In an example, the control information may further indicate whether the first UE 100 is a synchronization source, and/or the control information may further indicate an identifier of a synchronization source of the first UE 100.

If the synchronization source of the first UE 100 is the first base station, the identifier of the synchronization source of the first UE 100 is a physical cell identifier of the first base station; or if the synchronization source of the first UE 100 is a GNSS, the identifier of the synchronization source of the first UE 100 is a predefined identifier corresponding to the GNSS.

The control information may be carried on a third control channel. For example, the third control channel is a PSBCH.

In an example, the third control channel is used to indicate a service type, and the service type is a security type or a non-security type.

In another example, the sending unit 120 may be further configured to send a synchronization signal over the first link. Optionally, the synchronization signal is used to indicate a service type, and the service type is a security type or a non-security type.

Optionally, in another implementation, the control information may be used to indicate the first speed information, and/or the control information may be used to indicate a quantity of transmissions of data scheduled based on the control information and a time-frequency resource used for each transmission of the data.

In an example, the control information may be further used to indicate a current quantity of transmissions of the control information.

The control information may be carried on a first control channel or a second control channel. For example, the first control channel is a first PSCCH, and the second control channel is a second PSCCH.

If it is determined, based on the first speed information, that the first UE 100 is the first type of UE, the control information is carried on the first control channel; and if it is determined, based on the first speed information, that the first UE 100 is the second type of UE, the control information is carried on the second control channel.

Optionally, correspondingly, the sending unit 120 may be configured to send the first speed information to the second UE in the transmission manner over the first link.

In an embodiment, the processing unit 110 may be further configured to determine the synchronization source of the first UE 100.

The processing unit 110 is specifically configured to: if it is determined, based on the first speed information, that the first UE 100 is the first type of UE, determine the synchronization source based on preconfigured information.

For example, if the preconfigured information indicates that a synchronization source of the first type of UE is a base station, the first UE determines that the synchronization source is the first base station. The first base station may be a serving base station of the first UE.

If the first UE is the first type of UE and the preconfigured information indicates that the synchronization source of the first UE is a base station, the first UE may complete synchronization with the first base station by using a prior-art method, and details are not described herein.

For example, if the preconfigured information indicates that a synchronization source of the first type of UE is the GNSS, the first UE preferentially determines that the synchronization source is the GNSS.

For example, if the preconfigured information indicates that a synchronization source of the first type of UE is an RSU, the first UE determines that the synchronization source is the RSU.

If it is determined, based on the first speed information, that the first UE 100 is the second type of UE, the processing unit 110 preferentially determines that the synchronization source is the GNSS.

The processing unit 110 is specifically configured to: if a GNSS signal is detected, use the GNSS as the synchronization source; or if a GNSS signal is not detected, determine that the synchronization source is the first base station or third UE. Optionally, the first base station may be a serving base station of the first UE 100, and the third UE may be UE directly synchronized with the GNSS.

Optionally, that a GNSS signal is detected by the processing unit 110 may be: If a GNSS signal is not detected by the processing unit 110, the processing unit 110 starts a timer and then the GNSS signal is detected within duration of the timer. That a GNSS signal is not detected by the processing unit 110 may be: If a GNSS signal is not detected by the processing unit 110, the processing unit 110 starts a timer and the GNSS signal is still not detected within duration of the timer.

In this embodiment of the present disclosure, that a GNSS signal is detected by the processing unit 110 may be: A GNSS signal whose signal strength is greater than or equal to a preset signal strength threshold is detected by the processing unit 110. That a GNSS signal is not detected by the processing unit 110 may be: No GNSS signal is detected by the processing unit 110, or a GNSS signal whose signal strength is less than the preset signal strength threshold is detected.

Further, the sending unit 120 in this embodiment of the present disclosure may be further configured to send data over the first link by using a fourth transmission resource, where the fourth transmission resource is indicated by the control information carried on the control channel.

The sending unit 120 may first send the control information and then send the data. Alternatively, the sending unit 120 may simultaneously send the control information and the data.

Optionally, the control information and the data may be located in different subframes, or the control information and the data may be located in a same subframe. This is not limited in the present disclosure. The control information may be carried on the control channel, and the data may be carried on a service channel. The control channel may be a PSCCH, and the service channel may be a PSSCH.

Specifically, the sending unit 120 may send the data to the second UE over the first link by using the fourth transmission resource.

Every K consecutive subcarriers located on a same symbol may include a subcarrier used for transmitting the data, where K is a positive integer greater than or equal to 2. Reference may be made to the foregoing specific examples that K=2 shown in FIG. 9 and FIG. 10.

Optionally, the control information may be used to indicate a quantity of transmissions of the data and a time-frequency resource used for each transmission.

In an example, the quantity of transmissions of the data is more than one, a same frequency domain resource is used for each transmission of the data, and the fourth transmission resource may include the same frequency domain resource and a plurality of time domain resources that are in a one-to-one correspondence with the more than one transmission of the data.

In another example, the quantity of transmissions of the data is N, and the fourth transmission resource may include time-frequency resources used for M of the N transmissions, so that a receive end of the control channel determines, based on the time-frequency resources used for the M transmissions that are included in the control channel, time-frequency resources used for the N transmissions, where M<N, and M and N are positive integers.

Optionally, in an embodiment, the sending unit 120 is specifically configured to send the data and a first sequence over the first link by using the fourth transmission resource. The first sequence is determined by removing a predefined second sequence from a ZC sequence set of a predefined length.

Specifically, if the first UE 100 is the first type of UE, the sending unit 120 may send the data and a ZC sequence of a predefined length over the first link by using the fourth transmission resource. If the first UE 100 is the second type of UE, the sending unit 120 may send the data and the first sequence over the first link by using the fourth transmission resource. For the first sequence, reference may be made to related descriptions in the foregoing method embodiments, and to avoid repetition, details are not described herein again.

If the control information and the data are located in a same subframe, the processing unit 110 may be further configured to: determine a first transmit power of the control information and a second transmit power of the data; if a sum of the first transmit power and the second transmit power is greater than a maximum transmit power, determine that a first power is a value obtained by multiplying the first transmit power by a first scaling value, and determine that a second power is a value obtained by multiplying the second transmit power by a second scaling value, so that a sum of the first power and the second power is less than or equal to the maximum transmit power. Further, the sending unit 120 is specifically configured to send the control information over the first link by using the first power and send the data over the first link by using the second power. The first scaling value and the second scaling value are equal or not equal.

The first transmit power and the second transmit power may be open loop transmit powers. The first scaling value is represented as w1, and the second scaling value is represented as w2. w1=w2 or w1≠w2.

Alternatively, if the processing unit 110 determines that a sum of the first transmit power and the second transmit power is greater than a maximum transmit power, the sending unit 120 may send the control information in a current subframe and send the data in a subsequent subframe. That is, the control information and the data are sent in different subframes.

Optionally, in another embodiment, the sending unit 120 is further configured to: when the first UE 100 is the second type of UE, send data of the first link to a second base station over the second link by using a fifth transmission resource. The second base station is a serving base station of a receive end of the data.

The fifth transmission resource may be configured by the serving base station of the first UE 100 for the first UE 100. Optionally, the sending unit 120 may be further configured to send resource request information to the first base station; and the processing unit 110 may be further configured to receive indication information of the fifth transmission resource that is sent by the first base station. The resource request information may be a speed-related SR or BSR.

In an example, if the receive end of the data is the second UE, and a serving base station of the second UE is the first base station, the first base station and the second base station are a same base station.

In another example, if the receive end of the data includes the second UE and fourth UE, a serving base station of the second UE is the first base station, and a serving base station of the fourth UE is a third base station, the second base station includes the first base station and the third base station.

Figure 16:
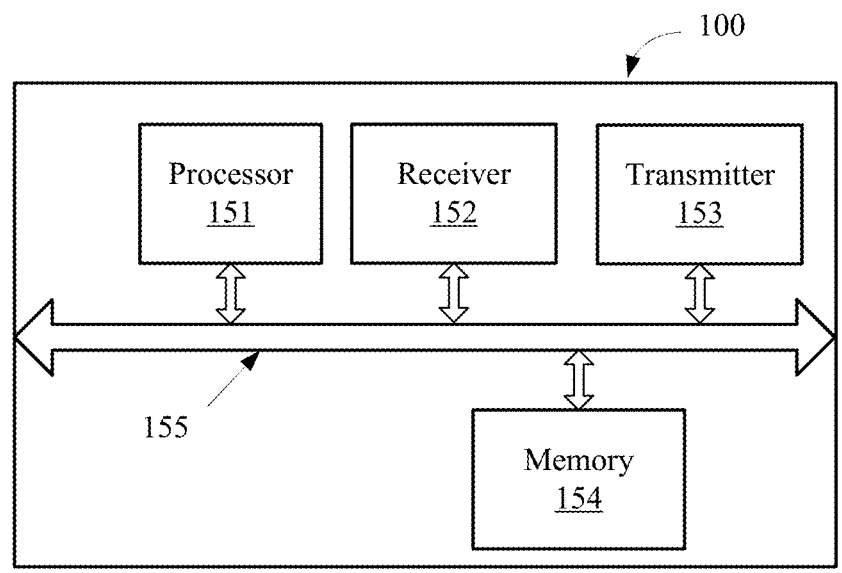
FIG. 16 is a structural block diagram of user equipment according to another embodiment of the present disclosure.

It should be noted that, in this embodiment of the present disclosure, the receiving unit may be implemented by a receiver, the processing unit 110 may be implemented by a processor, and the sending unit 120 may be implemented by a transmitter. As shown in FIG. 16, the first UE 100 may include a processor 151, a receiver 152, a transmitter 153, and a memory 154. The memory 154 may be configured to store a speed threshold, a speed grade threshold, and the like, and may be further configured to store code to be executed by the processor 151, and the like.

Components of the first UE 100 are coupled together by using a bus system 155. The bus system 155 includes a power bus, a control bus, and a status signal bus in addition to a data bus.

The first UE 100 shown in FIG. 15 or the first UE 100 shown in FIG. 16 can implement each process implemented by the first UE in the method embodiment of FIG. 4. To avoid repetition, details are not described herein again.

Figure 17:
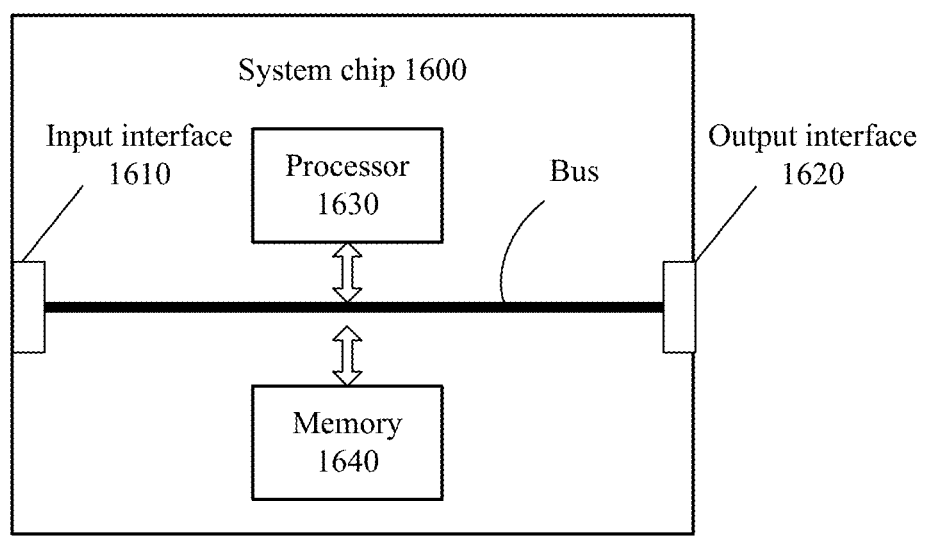
FIG. 17 is a schematic structural block diagram of a system chip according to an embodiment of the present disclosure.

FIG. 17 is a schematic structural diagram of a system chip according to an embodiment of the present disclosure. The system chip 1600 in FIG. 17 includes an input interface 1610, an output interface 1620, at least one processor 1630, and a memory 1640. The input interface 1610, the output interface 1620, the processor 1630, and the memory 1640 are connected by using a bus. The processor 1630 is configured to execute code in the memory 1640. When the code is executed, the processor 1630 implements the information transmission method executed by the first UE in FIG. 4.

Figure 18:
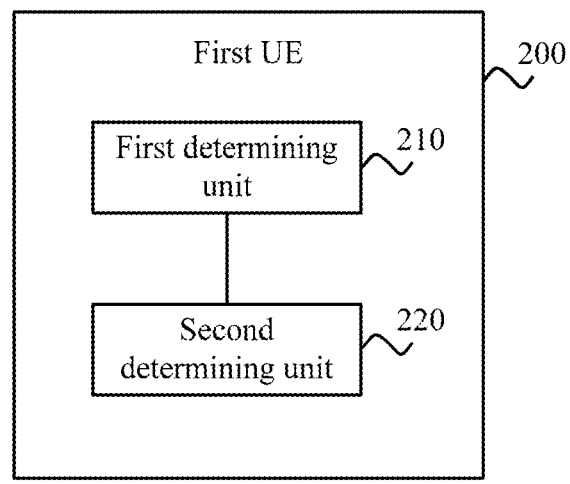
FIG. 18 is a structural block diagram of user equipment according to another embodiment of the present disclosure.

FIG. 18 is a structural block diagram of user equipment according to another embodiment of the present disclosure. First UE 200 shown in FIG. 18 includes a first determining unit 210 and a second determining unit 220.

The first determining unit 210 is configured to determine first speed information of the first UE.

The second determining unit 220 is configured to determine a synchronization source of the first UE based on the first speed information that is determined by the first determining unit 210.

In this embodiment of the present disclosure, the first speed information may be used to indicate a speed of the first UE 200. Optionally, the first speed information may indicate the speed of the first UE 200 in a form of a speed grade. Herein, the speed of the first UE 200 may be an absolute speed, or may be a relative speed relative to another UE or a plurality of other UEs, or may be an acceleration of the first UE relative to the ground or an acceleration relative to another UE or a plurality of other UEs. This is not limited in the present disclosure.

Optionally, if the first UE 200 is a communications module at a physical layer, the first determining unit 210 may determine the first speed information based on indication information from another layer.

If the first speed information is used to indicate an absolute speed of the first UE 210, the first determining unit 210 may obtain the first speed information in a GNSS mode. Alternatively, the first determining unit 210 may obtain the first speed information by using information indicated by a first base station. Optionally, the first UE 200 may obtain the first speed information by using a corresponding speed measuring apparatus. For example, if the first UE 200 is an OBU, the first determining unit 210 may obtain the first speed information by using a corresponding module in a car such as an engine module, a gearbox module, or another module that electrically controls a speed. For example, a current speed of the first UE measured is v, and a unit of the speed may be km/h or may be miles/h.

If the first speed information is used to indicate the relative speed of the first UE 200 relative to the another UE (for example, second UE), optionally, the first determining unit 210 may first determine an absolute speed of the first UE 200, and then determine speed information and/or location information of the second UE by measuring or parsing a data packet that is sent from the second UE. The first determining unit 210 may further determine information about a relative speed of the first UE 200 relative to the second UE based on the information. Herein, the second UE may be one UE, or may be a plurality of different UEs. If the second UE is the plurality of different UEs, the relative speed is a weighted value of speeds relative to the plurality of UEs, for example, an arithmetic weighted average and a geometric weighted average.

Optionally, the second determining unit 220 is specifically configured to: if it is determined, based on the first speed information, that the first UE 200 is a first type of UE, determine the synchronization source based on preconfigured information.

For example, if the preconfigured information indicates that a synchronization source of the first type of UE is a base station, the first UE determines that the synchronization source is the first base station. The first base station may be a serving base station of the first UE.

If the first UE is the first type of UE and the preconfigured information indicates that the synchronization source of the first UE is a base station, the first UE may complete synchronization with the first base station by using a prior-art method, and details are not described herein.

For example, if the preconfigured information indicates that a synchronization source of the first type of UE is a GNSS, the first UE determines that the synchronization source is the GNSS; and if the preconfigured information indicates that the synchronization source is the GNSS, the first UE preferentially determines that the synchronization source is the GNSS.

For example, if the preconfigured information indicates that a synchronization source of the first type of UE is an RSU, the first UE determines that the synchronization source is the RSU.

If it is determined, based on the first speed information, that the first UE 200 is a second type of UE, the second determining unit 220 preferentially determines that the synchronization source is the GNSS.

The second determining unit 220 is specifically configured to: if a GNSS signal is detected, use the GNSS as the synchronization source; or if a GNSS signal is not detected, determine that the synchronization source is the first base station or third UE. Optionally, the first base station may be a serving base station of the first UE 200, and the third UE may be UE directly synchronized with the GNSS.

Optionally, that a GNSS signal is detected by the second determining unit 220 may be: If a GNSS signal is not detected by the second determining unit 220, the second determining unit 220 starts a timer and then the GNSS signal is detected within duration of the timer. That a GNSS signal is not detected by the second determining unit 220 may be: If a GNSS signal is not detected by the second determining unit 220, the second determining unit 220 starts a timer and the GNSS signal is still not detected within duration of the timer.

In this embodiment of the present disclosure, that a GNSS signal is detected by the second determining unit 220 may be: A GNSS signal whose signal strength is greater than or equal to a preset signal strength threshold is detected by the second determining unit 220. That a GNSS signal is not detected by the second determining unit 220 may be: No GNSS signal is detected by the second determining unit 220, or a GNSS signal whose signal strength is less than the preset signal strength threshold is detected.

The signal strength threshold may be predefined, for example, may be preconfigured on the first UE. Alternatively, the signal strength threshold may be indicated by the first base station by using signaling. The first UE 200 may include a receiving unit, configured to receive a signaling indication of the first base station to obtain the signal strength threshold.

In addition, the first UE 200 shown in FIG. 18 may further include a sending unit, configured to: after completing timing with the synchronization source, send control information over a first link, or send control information and data over a first link.

Optionally, the sending unit may be configured to send the control information over the first link. In addition, the sending unit may be further configured to send the data (or send the data and a sequence) over the first link.

In an example, if the first UE 200 is the first type of UE, the sending unit may be configured to send the data and a ZC sequence of a predefined length over the first link. If the first UE 200 is the second type of UE, the sending unit may be configured to send the data and a first sequence over the first link. For the first sequence, reference may be made to related descriptions in the foregoing method embodiments, and to avoid repetition, details are not described herein again.

Figure 19:
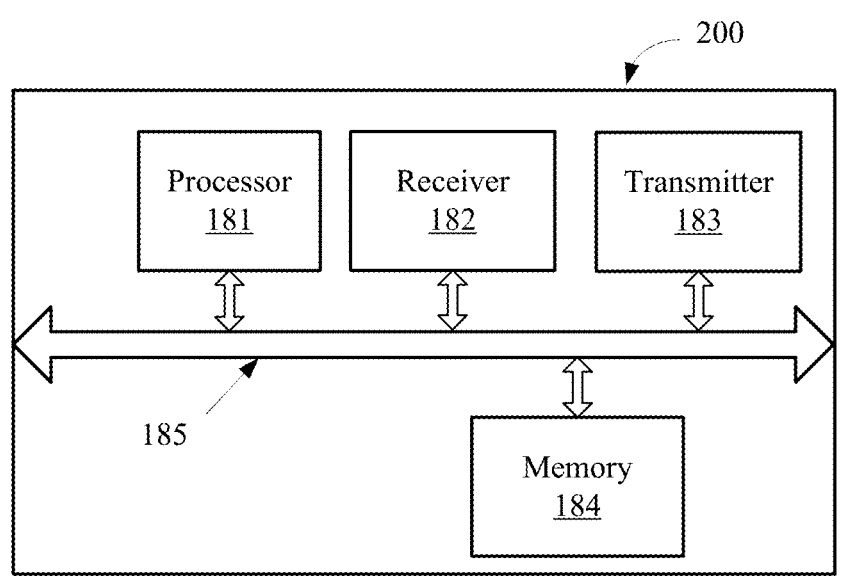
FIG. 19 is a structural block diagram of user equipment according to another embodiment of the present disclosure.

It should be noted that, in this embodiment of the present disclosure, the receiving unit may be implemented by a receiver, the first determining unit 210 and the second determining unit 220 may be implemented by a processor, and the sending unit may be implemented by a transmitter. As shown in FIG. 19, the first UE 200 may include a processor 181, a receiver 182, a transmitter 183, and a memory 184. The memory 184 may be configured to store a speed threshold, a speed grade threshold, and the like, and may be further configured to store code to be executed by the processor 181, and the like.

Components of the first UE 200 are coupled together by using a bus system 185. The bus system 185 includes a power bus, a control bus, and a status signal bus in addition to a data bus.

The first UE 200 shown in FIG. 18 or the first UE 200 shown in FIG. 19 can implement each process implemented by the first UE in the method embodiment of FIG. 12. To avoid repetition, details are not described herein again.

Figure 20:
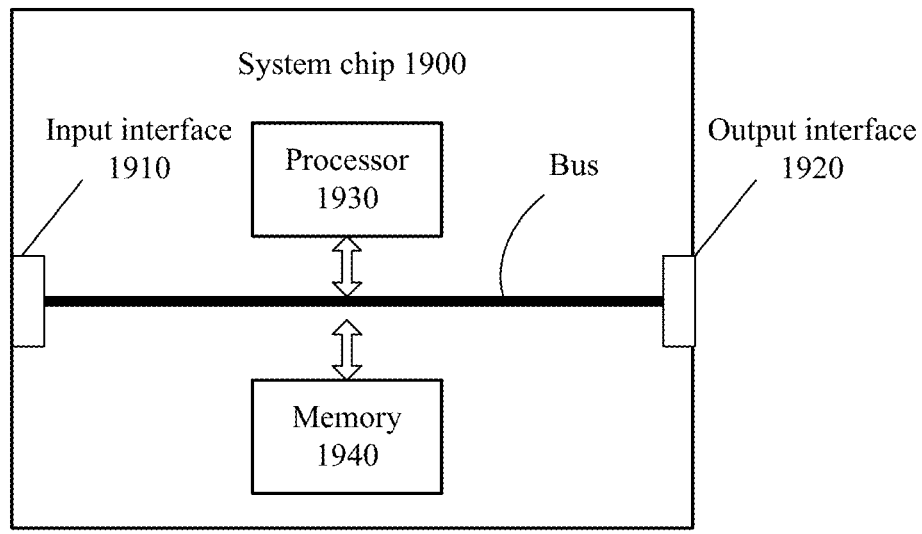
FIG. 20 is a schematic structural block diagram of a system chip according to another embodiment of the present disclosure.

FIG. 20 is a schematic structural diagram of a system chip according to an embodiment of the present disclosure. The system chip 1900 in FIG. 20 includes an input interface 1910, an output interface 1920, at least one processor 1930, and a memory 1940. The input interface 1910, the output interface 1920, the processor 1930, and the memory 1940 are connected by using a bus. The processor 1930 is configured to execute code in the memory 1940. When the code is executed, the processor 1930 implements the information transmission method executed by the first UE in FIG. 12.

Figure 21:
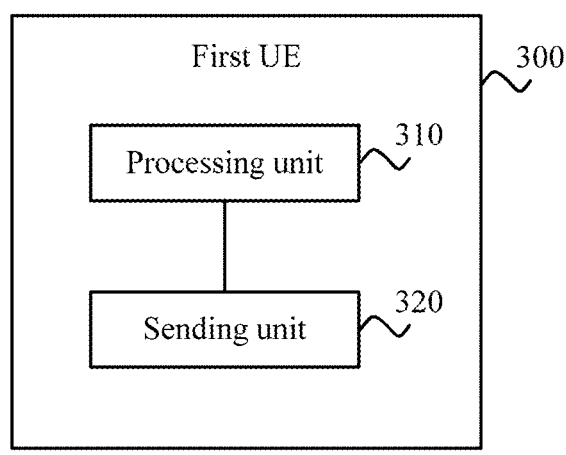
FIG. 21 is a structural block diagram of user equipment according to another embodiment of the present disclosure.

FIG. 21 is a structural block diagram of user equipment according to another embodiment of the present disclosure. First UE 300 shown in FIG. 21 includes a processing unit 310 and a sending unit 320.

The processing unit 310 is configured to determine a quantity of transmissions of data scheduled based on control information, and determine a transmission manner of the control information based on the quantity of transmissions of the data.

The sending unit 320 is configured to send the control information in the transmission manner over a first link.

Optionally, the processing unit 310 may determine the quantity of transmissions of the data based on speed information of the first UE. Optionally, the processing unit 310 may be configured to determine, based on first speed information of the first UE, the quantity of transmissions of the data scheduled based on the control information, and determine the transmission manner of the control information based on the quantity of transmissions of the data.

The first speed information may be used to indicate the speed of the first UE 300. For example, the first speed information may be represented in the form of an absolute speed, a relative speed, an acceleration, and the like.

For example, when the first UE 300 is a first type of UE, the quantity of transmissions is N1; and when the first UE 300 is a second type of UE, the quantity of transmissions is N2. Optionally, N1<N2.

In this embodiment of the present disclosure, the quantity of transmissions of the data may be predefined. For example, the quantity of transmissions of the data is preconfigured on the first UE, or a quantity of transmissions of data of high speed UE is pre-specified in a protocol. Alternatively, the quantity of transmissions of the data may be obtained by the first UE from information that is sent by a serving base station of the second UE. Alternatively, the quantity of transmissions of the data is determined by the first UE based on at least one of the following information: first speed information of the first UE, geographical location information of the first UE and/or the second UE, signal quality of the first UE, signal quality of data and/or a signal that is sent by the second UE, and the like. This is not limited in the present disclosure.

It can be understood that if the quantity of transmissions of the data is obtained by the first UE from the information that is sent by the serving base station of the second UE, the first UE may further include a receiving unit, configured to receive the information that is sent by the serving base station of the second UE.

Optionally, the transmission manner includes at least one of the following: a transmission resource used by the control information; a cyclic redundancy check CRC mask of the control information; a scrambling sequence of the control information; a demodulation reference signal used by a control channel carrying the control information; a size of a physical resource occupied for transmitting the control information; a modulation and coding scheme MCS used by the control information; and a quantity of transmissions of the control information.

Optionally, in an embodiment, when quantities of transmissions of the data are different, valid fields in the control information are different.

Optionally, in an embodiment, the control information includes the quantity of transmissions of the data and indication information of a time-frequency resource used for each transmission of the data.

Optionally, in another embodiment, the quantity of transmissions of the data is N, and the control information includes time-frequency resources used for M of the N transmissions, so that a receive end of the control information determines, based on the time-frequency resources used for the M transmissions that are included in the control information, time-frequency resources used for the N transmissions, where M<N, and M and N are positive integers.

For example, when the quantity of transmissions of the data is four, a first field in the control information and a second field in the control information include time-frequency resources used for two of the four transmissions.

Optionally, in another embodiment, the quantity of transmissions of the data is more than one, a same frequency domain resource is used for each transmission of the data, and the control information includes the same frequency domain resource and indication information of a plurality of time domain resources that are in a one-to-one correspondence with the more than one transmission of the data.

Optionally, in another embodiment, the control information may further include indication information of a current quantity of transmissions, and/or the control information may further include speed indication information of the first UE.

For example, the control information may include first speed information of the first UE 300.

Optionally, in another embodiment, the sending unit 320 may be further configured to send the data over the first link based on the control information.

Alternatively, the sending unit 320 may be further configured to send the data and a sequence over the first link based on the control information.

Specifically, the sending unit 320 may send the data (or send the data and the sequence) over the first link by using a transmission resource indicated by the control information.

For example, if the first UE 300 is the first type of UE, the sending unit 320 may be configured to send the data and a ZC sequence of a predefined length over the first link. If the first UE 300 is the second type of UE, the sending unit 320 may be configured to send the data and a first sequence over the first link. For the first sequence, reference may be made to related descriptions in the foregoing method embodiments, and to avoid repetition, details are not described herein again.

Optionally, the control information and the data may be located in different subframes, or the control information and the data may be located in a same subframe. Optionally, the control information may be carried on a PSCCH, and the data may be carried on a PSSCH.

If the control information and the data are located in a same subframe, the processing unit 310 may be further configured to: determine a first transmit power of the control information and a second transmit power of the data; if a sum of the first transmit power and the second transmit power is greater than a maximum transmit power, determine that a first power is a value obtained by multiplying the first transmit power by a first scaling value, and determine that a second power is a value obtained by multiplying the second transmit power by a second scaling value, so that a sum of the first power and the second power is less than or equal to the maximum transmit power. Further, the sending unit 320 is specifically configured to send the control information over the first link by using the first power and send the data over the first link by using the second power. The first scaling value and the second scaling value are equal or not equal.

The first transmit power and the second transmit power may be open loop transmit powers. The first scaling value is represented as w1, and the second scaling value is represented as w2. w1=w2 or w1≠w2.

Figure 22:
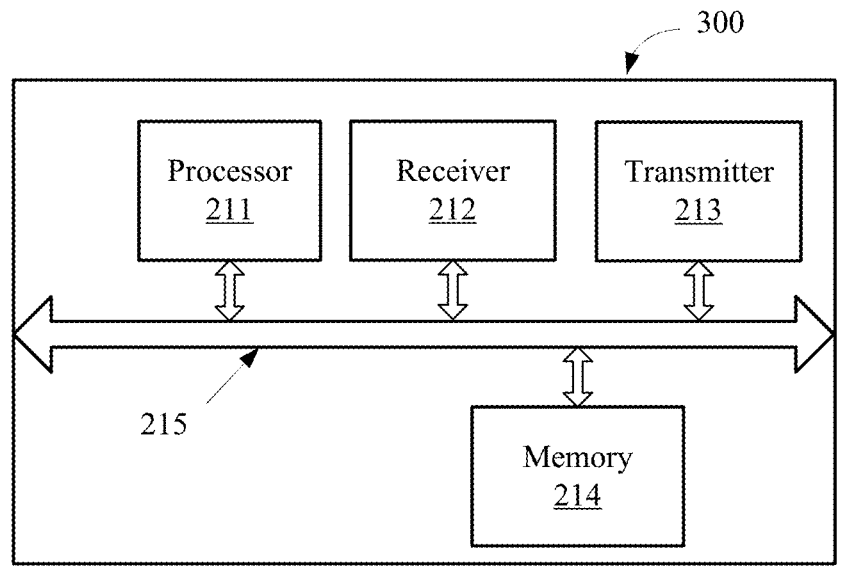
FIG. 22 is a structural block diagram of user equipment according to another embodiment of the present disclosure.

It should be noted that, in this embodiment of the present disclosure, the receiving unit may be implemented by a receiver, the processing unit 310 may be implemented by a processor, and the sending unit 320 may be implemented by a transmitter. As shown in FIG. 22, the second UE 300 may include a processor 211, a receiver 212, a transmitter 213, and a memory 214. The memory 214 may be configured to store code to be executed by the processor 211, and the like.

Components of the first UE 300 are coupled together by using a bus system 215. The bus system 215 includes a power bus, a control bus, and a status signal bus in addition to a data bus.

The first UE 300 shown in FIG. 21 or the first UE 300 shown in FIG. 22 can implement each process implemented by the first UE in the method embodiment of FIG. 13. To avoid repetition, details are not described herein again.

Figure 23:
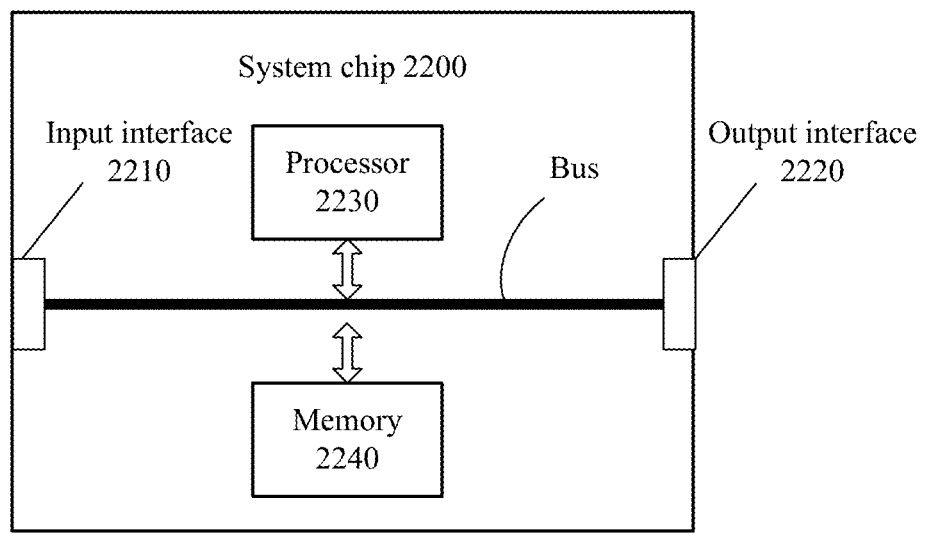
FIG. 23 is a schematic structural block diagram of a system chip according to another embodiment of the present disclosure.

FIG. 23 is a schematic structural diagram of a system chip according to an embodiment of the present disclosure. The system chip 2200 in FIG. 23 includes an input interface 2210, an output interface 2220, at least one processor 2230, and a memory 2240. The input interface 2210, the output interface 2220, the processor 2230, and the memory 2240 are connected by using a bus. The processor 2230 is configured to execute code in the memory 2240. When the code is executed, the processor 2230 implements the information transmission method executed by the first UE in FIG. 13.

Figure 24:
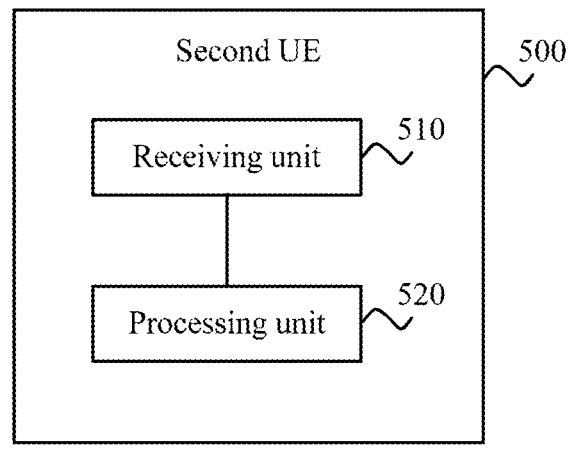
FIG. 24 is a structural block diagram of user equipment according to another embodiment of the present disclosure.

FIG. 24 is a structural block diagram of user equipment according to another embodiment of the present disclosure. Second UE 500 shown in FIG. 24 includes a receiving unit 510 and a processing unit 520.

The receiving unit 510 is configured to receive, over a first link, control information that is sent by first UE.

The processing unit 520 is configured to obtain indication information of a quantity of transmissions of data scheduled based on the control information that is received by the receiving unit 510, and is further configured to obtain a time-frequency resource used for each transmission, from a field corresponding to each transmission in the control information.

The control information may be used to indicate a quantity of transmissions of the data and the time-frequency resource used for each transmission. The quantity of transmissions of the data may be determined by the first UE based on speed information of the first UE. For example, the quantity of transmissions of the data may be determined by the first UE based on first speed information of the first UE.

Optionally, the control information may further include indication information of a current quantity of transmissions, and/or the control information may further include the first speed information of the first UE. The current quantity of transmissions is a current quantity of transmissions of the control information.

Optionally, if the quantity of transmissions of the data is more than one, a same frequency domain resource is used for each transmission of the data, and the control information may include the same frequency domain resource and indication information of a plurality of time domain resources that are in a one-to-one correspondence with the more than one transmission of the data.

In an example, the processing unit 520 is specifically configured to: when the quantity of transmissions of the data is one, obtain a time-frequency resource used for this transmission, from a first field in the control information; when the quantity of transmissions of the data is two, obtain a time-frequency resource used for the first transmission of the two transmissions, from a first field in the control information, and obtain a time-frequency resource used for the second transmission of the two transmissions, from a second field in the control information; and when the quantity of transmissions of the data is four, obtain a time-frequency resource used for the first transmission of the four transmissions, from a first field in the control information, obtain a time-frequency resource used for the second transmission of the four transmissions, from a second field in the control information, obtain a time-frequency resource used for the third transmission of the four transmissions, from a third field in the control information, and obtain a time-frequency resource used for the fourth transmission of the four transmissions, from a fourth field in the control information.

In another example, the processing unit 520 is specifically configured to: when the quantity of transmissions of the data is four, obtain time-frequency resources used for two of the four transmissions, from a first field in the control information and a second field in the control information; and determine time-frequency resources used for the other two of the four transmissions based on the time-frequency resources used for the two of the four transmissions.

In this embodiment of the present disclosure, for different quantities of transmissions, transmission manners of a control channel carrying the control information may be the same or different.

If the transmission manners of the control channel carrying the control information are different for the different quantities of transmissions, the processing unit 520 is specifically configured to: determine a transmission manner of the control information based on the quantity of transmissions of the data, where the transmission manner is one of at least two predefined transmission manners, and obtain, based on the transmission manner, the time-frequency resource used for each transmission.

In this embodiment of the present disclosure, the transmission manner may include at least one of the following: a transmission resource used by the control information; a cyclic redundancy check CRC mask of the control information; a scrambling sequence of the control information; a demodulation reference signal used by the control channel carrying the control information; a size of a physical resource occupied for transmitting the control information; a modulation and coding scheme MCS used by the control information; and a quantity of transmissions of the control information.

Further, the receiving unit 510 may be configured to receive the data over the first link based on the control information. Alternatively, the receiving unit 510 may be further configured to send the data and a sequence over the first link based on the control information.

In an example, when the first UE is a first type of UE, the receiving unit 510 receives, over the first link based on the control information, the data and a ZC sequence that are sent by the first UE. When the first UE is a second type of UE, the receiving unit 510 receives, over the first link based on the control information, the data and a first sequence that are sent by the first UE. For the first sequence, reference may be made to related descriptions in the foregoing embodiment, and to avoid repetition, details are not described herein again.

The control information may be carried on a control channel, and the data may be carried on a service channel. For example, the control channel may be a PSCCH, and the service channel may be a PSSCH.

In this embodiment of the present disclosure, the control information and the data may be located in different subframes, or the control information and the data may be located in a same subframe.

In addition, the second UE 500 shown in FIG. 24 may further include a sending unit that may be configured to send an acknowledgement message for the data to the first UE, for example, an ACK or a NACK.

Figure 25:
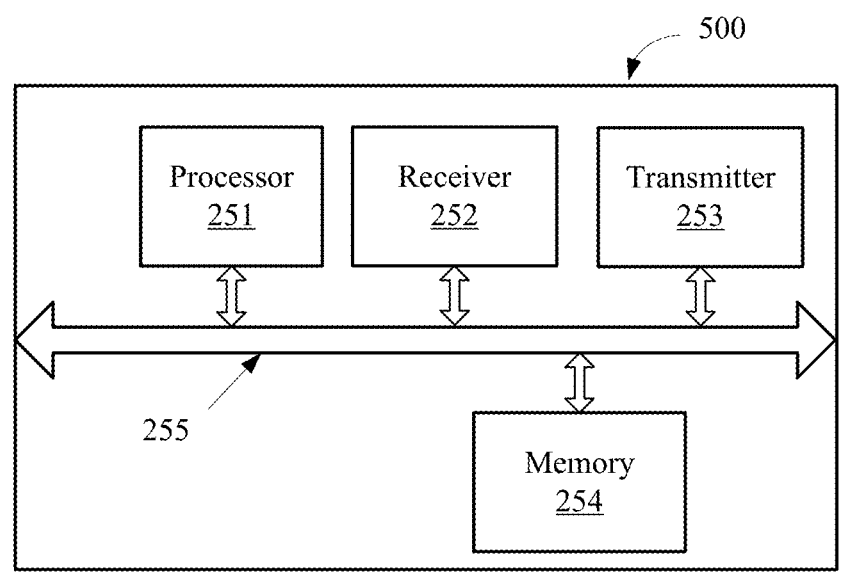
FIG. 25 is a structural block diagram of user equipment according to another embodiment of the present disclosure.

It should be noted that, in this embodiment of the present disclosure, the receiving unit 510 may be implemented by a receiver, the processing unit 520 may be implemented by a processor, and the sending unit may be implemented by a transmitter. As shown in FIG. 25, the second UE 500 may include a processor 251, a receiver 252, a transmitter 253, and a memory 254. The memory 254 may be configured to store code to be executed by the processor 251, and the like.

Components of the second UE 500 are coupled together by using a bus system 255. The bus system 215 includes a power bus, a control bus, and a status signal bus in addition to a data bus.

The second UE 500 shown in FIG. 24 or the second UE 500 shown in FIG. 25 can implement each process implemented by the second UE in the method embodiment of FIG. 14. To avoid repetition, details are not described herein again.

Figure 26:
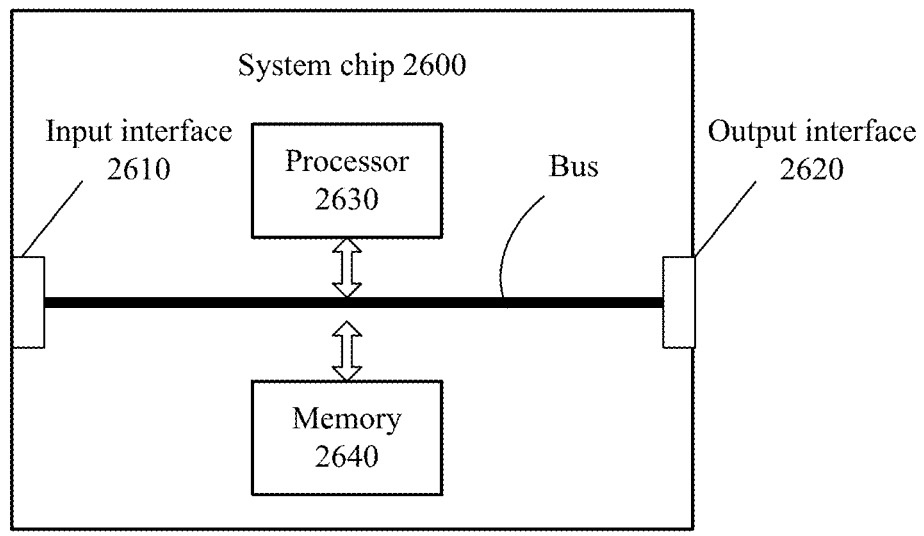
FIG. 26 is a schematic structural block diagram of a system chip according to another embodiment of the present disclosure.

FIG. 26 is a schematic structural diagram of a system chip according to an embodiment of the present disclosure. The system chip 2600 in FIG. 26 includes an input interface 2610, an output interface 2620, at least one processor 2630, and a memory 2640. The input interface 2610, the output interface 2620, the processor 2630, and the memory 2640 are connected by using a bus. The processor 2630 is configured to execute code in the memory 2640. When the code is executed, the processor 2630 implements the information transmission method executed by the second UE in FIG. 14.

Figure 27:
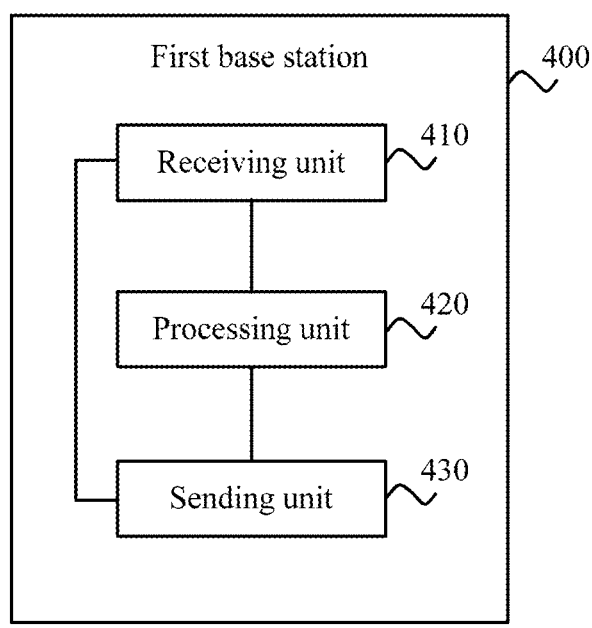
FIG. 27 is a structural block diagram of a base station according to an embodiment of the present disclosure.

FIG. 27 is a structural block diagram of a base station according to an embodiment of the present disclosure. A first base station 400 shown in FIG. 27 includes a receiving unit 410, a processing unit 420, and a sending unit 430.

The receiving unit 410 is configured to receive speed information that is sent by at least one UE.

The processing unit 420 is configured to determine a first resource set and a second resource set based on the speed information of the at least one UE that is received by the receiving unit 410.

The sending unit 430 is configured to send first indication information to the at least one UE over a second link, where the first indication information is used to indicate the first resource set and the second resource set.

Optionally, the sending unit 430 may send the first indication information over the second link in a broadcast or multicast manner.

The at least one UE includes first UE. The first indication information is used to indicate that the first resource set is used for a first type of UE, and the second resource set is used for a second type of UE. In this case, if the first UE is the first type of UE, the first UE determines a first transmission resource from the first resource set or from a first resource subset of the first resource set based on the first indication information. If the first UE is the second type of UE, the first UE determines a second transmission resource from the second resource set or from a second resource subset of the second resource set based on the first indication information.

Optionally, the first indication information may further indicate a location of the first resource subset in the first resource set. The location may be a time domain location or a frequency domain location or a time-frequency location. Optionally, the first indication information may further indicate a location of the second resource subset in the second resource set. The location may be a time domain location or a frequency domain location or a time-frequency location.

Optionally, the first resource set and the second resource set are a same resource set. Optionally, the second resource set is a subset of the first resource set. In this case, the first indication information may further indicate a location of the second resource subset in the first resource set. The location may be a time domain location or a frequency domain location or a time-frequency location.

Optionally, the first indication information may further indicate a preset speed threshold, so that the at least one UE determines whether the at least one UE is the first type of UE or the second type of UE.

Optionally, the receiving unit 410 may be further configured to receive resource request information that is sent by the first UE. The processing unit 420 allocates a resource to the first UE, and the sending unit 430 sends indication information of a fifth transmission resource to the first UE. The resource request information may be a speed-related SR or BSR.

Further, the receiving unit 410 may receive, over the second link, first-link data that is sent by the first UE by using the fifth transmission resource, and the sending unit 430 may send the first-link data to second UE. The second UE is a receive end of the first-link data.

Figure 28:
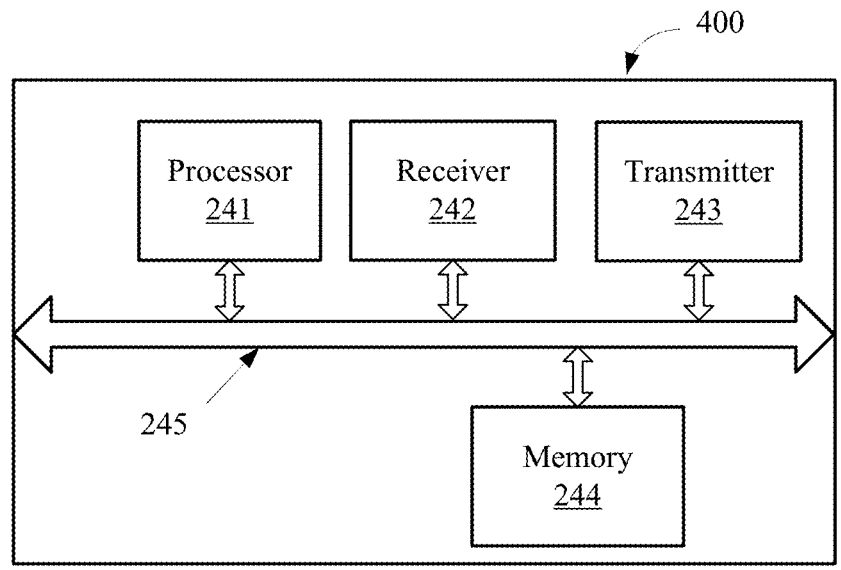
FIG. 28 is a structural block diagram of a base station according to another embodiment of the present disclosure.

It should be noted that, in this embodiment of the present disclosure, the receiving unit 410 may be implemented by a receiver, the processing unit 420 may be implemented by a processor, and the sending unit 430 may be implemented by a transmitter. As shown in FIG. 28, the first base station 400 may include a processor 241, a receiver 242, a transmitter 243, and a memory 244. The memory 244 may be configured to store a speed threshold, a speed grade threshold, and the like, and may be further configured to store code to be executed by the processor 241, and the like.

Components of the first base station 400 are coupled together by using a bus system 245. The bus system 245 includes a power bus, a control bus, and a status signal bus in addition to a data bus.

The first base station 400 shown in FIG. 27 or the first base station 400 shown in FIG. 28 can implement each process implemented by the first base station in the foregoing method embodiments. To avoid repetition, details are not described herein again.

Figure 29:
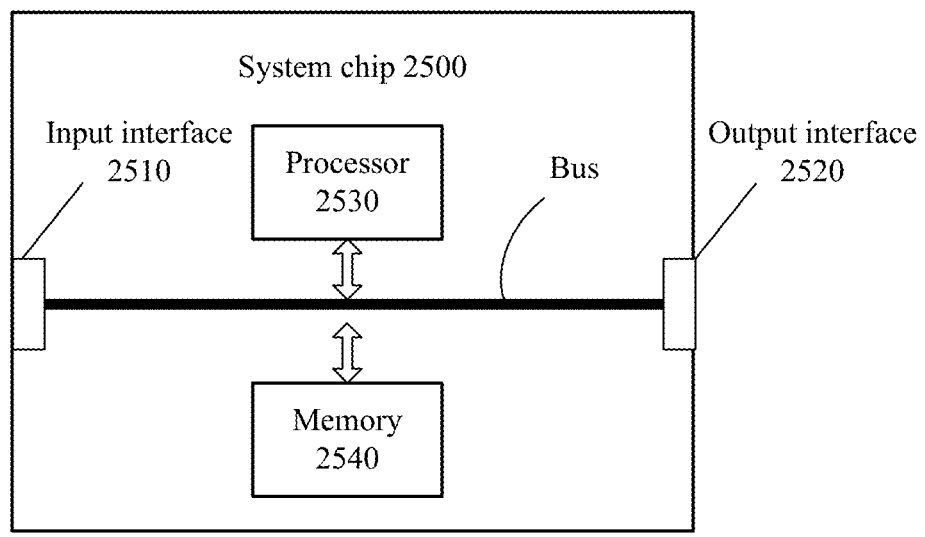
FIG. 29 is a schematic structural block diagram of a system chip according to another embodiment of the present disclosure.

FIG. 29 is a schematic structural diagram of a system chip according to an embodiment of the present disclosure. The system chip 2500 in FIG. 29 includes an input interface 2510, an output interface 2520, at least one processor 2530, and a memory 2540. The input interface 2510, the output interface 2520, the processor 2530, and the memory 2540 are connected by using a bus. The processor 2530 is configured to execute code in the memory 2540. When the code is executed, the processor 2530 implements the information transmission method executed by the first base station in the foregoing method embodiments.

It can be understood that the processor in the embodiments of the present disclosure may be an integrated circuit chip that has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments of the present disclosure. The general purpose processor may be a microprocessor or the processor may be any conventional processor, or the like. Steps of the methods disclosed with reference to the embodiments of the present disclosure may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in the embodiments of the present disclosure may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An information transmission method, comprising:
   determining, by a user equipment (UE), a quantity of transmissions of data scheduled by control information to be transmitted based on an absolute speed of the UE;
   determining, by the UE, a transmission manner of the control information based on the quantity of transmissions of the data; and
   sending, by the UE, the control information in the transmission manner on a first link;
   wherein the transmission manner comprises a quantity of Physical Resource Blocks (PRBs) for transmitting the control information and a maximum quantity of transmissions of the control information.

2. The method according to claim 1, wherein the transmission manner further comprises at least one of the following:
   a transmission resource used for sending the control information;
   a cyclic redundancy check (CRC) mask of the control information;
   a scrambling sequence of the control information;
   a demodulation reference signal used by a control channel carrying the control information; or
   a modulation and coding scheme (MCS) used by the control information.

3. The method according to claim 1, wherein valid fields in the control information are based on the quantity of transmissions of the data.

4. The method according to claim 1, wherein the quantity of transmissions of the data is N, and the control information comprises time-frequency resources used for M of the N transmissions, so that a receive end of the control information determines, based on the time-frequency resources used for the M transmissions that are comprised in the control information, time-frequency resources used for the N transmissions, wherein M<N, and M and N are positive integers.

5. The method according to claim 1, wherein the control information comprises indication information of a current quantity of transmissions.

6. The method according to claim 1, wherein the control information further comprises the quantity of transmissions of the data and indication information of a time-frequency resource used for each transmission of the data.

7. The method according to claim 1, wherein:
   in response to the absolute speed of the UE being less than a speed threshold, the transmission manner of the control information is a first transmission manner; and
   in response to the absolute speed of the UE being greater than or equal to the speed threshold, the transmission manner of the control information is a second transmission manner;
   wherein the speed threshold is received from a base station by signaling; and
   wherein the first transmission manner and the second transmission manner are different.

8. The method according to claim 7, wherein a plurality of speed thresholds are defined.

9. The method according to claim 7, wherein the speed threshold is 200 km/h.

10. A user equipment (UE), comprising:
    one or more processors;
    a computer-readable storage medium storing program instructions, wherein executing the program instructions by the one or more processors causes the apparatus to:
    determine a quantity of transmissions of data scheduled by control information to be transmitted based on an absolute speed of the UE; and
    determine a transmission manner of the control information based on the quantity of transmissions of the data; and
    a transmitter, configured to send the control information in the transmission manner on a first link wherein the transmission manner comprises a quantity of Physical Resource Blocks (PRBs) for transmitting the control information and a maximum quantity of transmissions of the control information.

11. The user equipment according to claim 10, wherein the transmission manner further comprises at least one of the following:
    a transmission resource used for sending the control information;
    a cyclic redundancy check (CRC) mask of the control information;
    a scrambling sequence of the control information;
    a demodulation reference signal used by a control channel carrying the control information; or
    a modulation and coding scheme (MCS) used by the control information.

12. The user equipment according to claim 10, wherein valid fields in the control information are based on the quantity of transmissions of the data.

13. The user equipment according to claim 10, wherein the quantity of transmissions of the data is N, and the control information comprises time-frequency resources used for M of the N transmissions, so that a receive end of the control information determines, based on the time-frequency resources used for the M transmissions that are comprised in the control information, time-frequency resources used for the N transmissions, wherein M<N, and M and N are positive integers.

14. The user equipment according to claim 10, wherein the control information comprises indication information of a current quantity of transmissions.

15. The user equipment according to claim 10, wherein the control information further comprises the quantity of transmissions of the data and indication information of a time-frequency resource used for each transmission of the data.

16. The user equipment according to claim 10, wherein:
    in response to the absolute speed of the UE being less than a speed threshold, the transmission manner of the control information is a first transmission manner; and
    in response to the absolute speed of the UE being greater than or equal to the speed threshold, the transmission manner of the control information is a second transmission manner;
    wherein the speed threshold is received from a base station by signaling; and
    wherein the first transmission manner and the second transmission manner are different.

17. The user equipment according to claim 16, wherein a plurality of speed thresholds are defined.

18. The user equipment according to claim 16, wherein the speed threshold is 200 km/h.

* * * * *